United States Patent
Kung

[11] Patent Number: 5,337,320
[45] Date of Patent: Aug. 9, 1994

[54] SEMI-AUTOMATIC MODE OF NETWORK DESIGN

[75] Inventor: Ching Y. Kung, Fort Lauderdale, Fla.

[73] Assignee: Racal-Datacom, Inc., Sunrise, Fla.

[21] Appl. No.: 141,371

[22] Filed: Oct. 28, 1993

Related U.S. Application Data

[62] Division of Ser. No. 802,113, Dec. 4, 1991, which is a division of Ser. No. 447,485, Dec. 6, 1989, Pat. No. 5,159,685.

[51] Int. Cl.$^5$ .............. G06F 11/00; G01R 31/28
[52] U.S. Cl. ............ 371/15.1; 364/276.3; 364/DIG. 1; 395/575; 395/909; 395/917
[58] Field of Search .......... 371/15.1; 364/276.3; 395/575, 911, 909, 916, 917

[56] References Cited

U.S. PATENT DOCUMENTS

| | | |
|---|---|---|
| 4,385,384 | 5/1983 | Rosbury et al. . |
| 4,388,715 | 6/1983 | Renaudin et al. ............ 370/13 |
| 4,591,983 | 5/1986 | Bennett et al. . |
| 4,642,782 | 2/1987 | Kemper et al. ............ 364/550 |
| 4,648,044 | 3/1987 | Hardy et al. . |
| 4,649,515 | 3/1987 | Thompson et al. . |
| 4,656,603 | 4/1987 | Dunn . |
| 4,658,370 | 4/1987 | Erman et al. . |
| 4,670,848 | 6/1987 | Schramm . |
| 4,675,829 | 6/1987 | Clemenson . |
| 4,704,695 | 11/1987 | Kimura et al. . |
| 4,713,775 | 12/1987 | Scott et al. . |
| 4,740,886 | 4/1988 | Tanifuji et al. . |
| 4,749,985 | 6/1988 | Corsberg ............ 340/517 |
| 4,752,889 | 6/1988 | Rappaport et al. ............ 364/513 |
| 4,752,890 | 6/1988 | Natarajan et al. . |
| 4,754,409 | 6/1988 | Ashford et al. . |
| 4,754,410 | 6/1988 | Leech et al. . |
| 4,763,277 | 8/1988 | Ashford et al. ............ 364/513 |
| 4,812,819 | 5/1989 | Corsberg ............ 340/517 |
| 4,816,994 | 3/1989 | Freiling et al. . |
| 4,817,092 | 3/1989 | Denny ............ 371/11 |
| 4,829,426 | 5/1989 | Burt . |
| 4,841,456 | 6/1989 | Hogan et al. ............ 364/550 |

(List continued on next page.)

FOREIGN PATENT DOCUMENTS 6252601 3/1987 Japan ............ G05B 9/02

(List continued on next page.)

OTHER PUBLICATIONS

Na et al., "The Design of an Object–Oriented Modular Expert System Shell," Proc. 1990 Symp. on Applied Computing, Apr. 1990, 109–118.

(List continued on next page.)

Primary Examiner—Charles E. Atkinson
Attorney, Agent, or Firm—William A. Newton

[57] ABSTRACT

An Expert System 10 for providing diagnostics to a data communications network 5. Alarms from a Network Manager 24 are received and queued by an Event Manager 117 and then filtered by an Alarm Filter 118 to remove redundant alarms. Alarms which are ready for processing are then posted to a queue referred to as a Bulletin Board 120. A Controller 112 determines which one of the posted goals has the highest priority by considering a priority number associated with the goal plus a time of arrival of the goal. An Inference Engine 122 uses information from an Expert Information Structure 111 to solve the highest priority goal by a process called instantiation. The process of solving the goal may be interrupted by a pause or suspension in order to perform tests under the direction of a Network Test Manager 124 or retrieve other information during which time other goals may be processed. Expert information is entered using a user friendly User Interface 104 which reduces need for the participation of a Knowledge Engineer. Configuration information about the network is maintained in a Network Structure Knowledge Base 109 by a Network Configuration Module 108. The Expert System 10 may operate in any of three modes: manual, wherein tests must be approved by or directed by an operator; automatic, where tests are run automatically without operator intervention; and semiautomatic, where operator approval is required for certain tests such as interruptive tests and other tests such as non-interruptive tests may proceed without operator intervention.

3 Claims, 33 Drawing Sheets

U.S. PATENT DOCUMENTS

| | | | |
|---|---|---|---|
| 4,873,687 | 10/1989 | Breu . | |
| 4,881,230 | 11/1989 | Clark et al. | 371/20.1 |
| 4,965,676 | 10/1990 | Ejiri et al. | 358/406 |
| 4,972,453 | 11/1990 | Daniel, III et al. | 371/15.1 |
| 4,977,390 | 12/1990 | Saylor et al. | 340/521 |
| 4,999,833 | 3/1991 | Lee | 370/94.1 |

FOREIGN PATENT DOCUMENTS

| | | | |
|---|---|---|---|
| 62-175060 | 7/1987 | Japan | H04M 3/26 |
| 6398441 | 4/1988 | Japan | G06F 9/44 |
| 63129148 | 5/1988 | Japan | G06F 12/00 |
| 01224845 | 9/1989 | Japan | G06F 9/94 |
| 2206713A | 1/1989 | United Kingdom . | |

OTHER PUBLICATIONS

Paysaye, *Expert Systems for Experts*, pp. 152–156.

Conar, "Expert Systems Solve Network Problems and Share the Information" *Data Communications*, May 1986, pp. 187–190.

Amelink et al., "Dispatcher Alarm and Message Processing", *IEEE Trans. on Power Systems*, V. PWRS-1, No. 3 Aug. 1986, pp. 188–194.

Schulte et al., "Artificial Intelligence Solutions to Power System Operating Problem" *IEEE Trans. on Power Systems*, vol. PWRS-2, No. 4, Nov. 1987 pp. 920–926.

Paula, "Expert System Manages Alarm Messages", *Electrical World*, Jul. 1989, pp. 47–48.

Konai et al., "Artificial Intelligence Method for Power System Fault Diagnosis", *2nd Internat. Conf. on Power Sys. Monitoring and Control*, 1986, pp. 355–360.

Fukui et al., "An Expert System for Fault Section Estimation Using Information From Protective Relays and Circuit Breakers", *IEEE Trans. on Power Delivery*, vol. PWRD-1, No. 4 Oct. 1983, pp. 83–90.

Wullenberg, "Feasibility Study for an Energy Management System Intelligent Alarm Processor", *IEEE Trans. on Power Systems*, vol. PUPS-1, No. 2, May 1986, pp. 241–247.

Gross, "Applications of Artificial Intelligence Technology in Communications Networks", *Bubble Systems*, Aug. 1988, vol. 5 No. 3, pp. 248–251.

Cynar, "Computers Design Networks by Imitating the Experts", *Data Communications*, Apr. 1986, pp. 137–193.

Miyazaki et al., "Dynamic Operation and Maintenance Systems for Switching Networks", *IEEE Communications Magazine*, Sep. 1990, pp. 34–35.

Wallenburg, "Feasibility Study for an Energy Management System Intelligent Alarm Processor", *IEEE Trans. on Power Systems*, vol. PWRS-1, No. 2, May 1986, pp. 241–247.

Gevarter, N. B., "The Nature and Evaluation of Commercial Expert System Building Tools, " Computer, May 1987, 24–41.

Johnson et al., Expert Systems Architectures, Kogan Page Limited, 6–27.

Slagle, J. R., "Applications of a Generalized Network-Based Expert System Shell", Proc. Symp. on the Engineering of Computer-Based Medical Systems.

Texas Instruments, "Procedure Consultant User's Guide", May 1988.

Texas Instruments and CGI-Test Bench "From Application Shell to Knowledge Acquisition System", Aug. 1987.

"The Taming of R1" by van de Brug et al., IEEE, Fall 1986.

"Representing Procedural Knowledge in Expert Systems: An Application To Process Control", M. Gallanti et al., pp. 345–352, Aug. 18–25, 198.

"The Knowledge-Based Expert System: A Tutorial", Frederick Hayes-Roth, *Computer*, Sep. 1984, pp. 11–28.

"Rule Based Systems", Frederick Hayes-Roth, *Communications of the ACM*, Sep. 1985, vol. 28, No. 9, pp. 921–932.

"Knowledge Acquisition in the Development of a Large Expert System", David S. Prerau, *AI Magazine*, Summer 1987, pp. 43–51.

"Anatomy of a Diagnostic System", Bonnie Merritt, *AI Expert*, Sep. 1987, pp. 52–63.

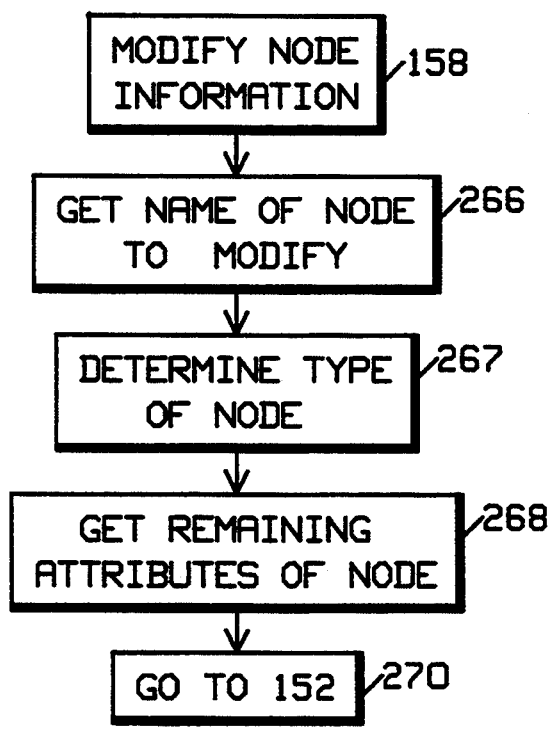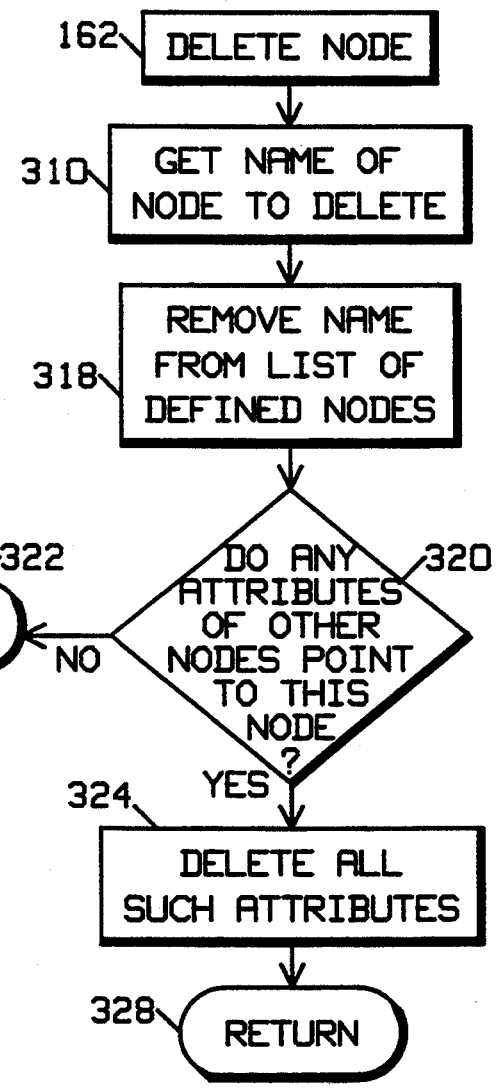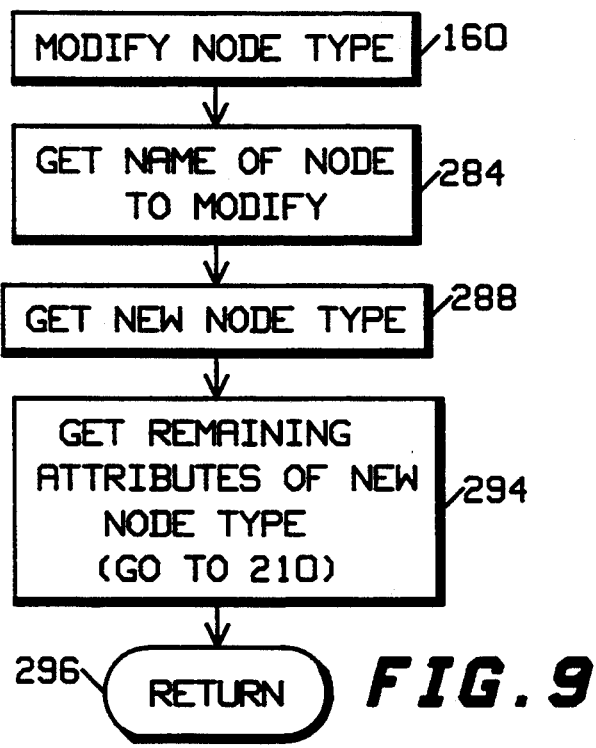

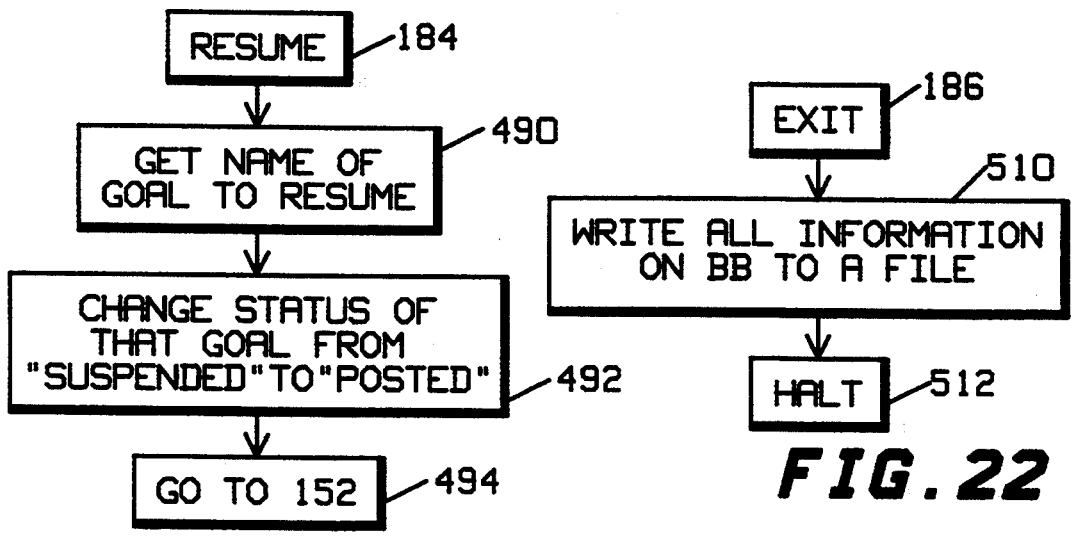
FIG. 21
FIG. 22
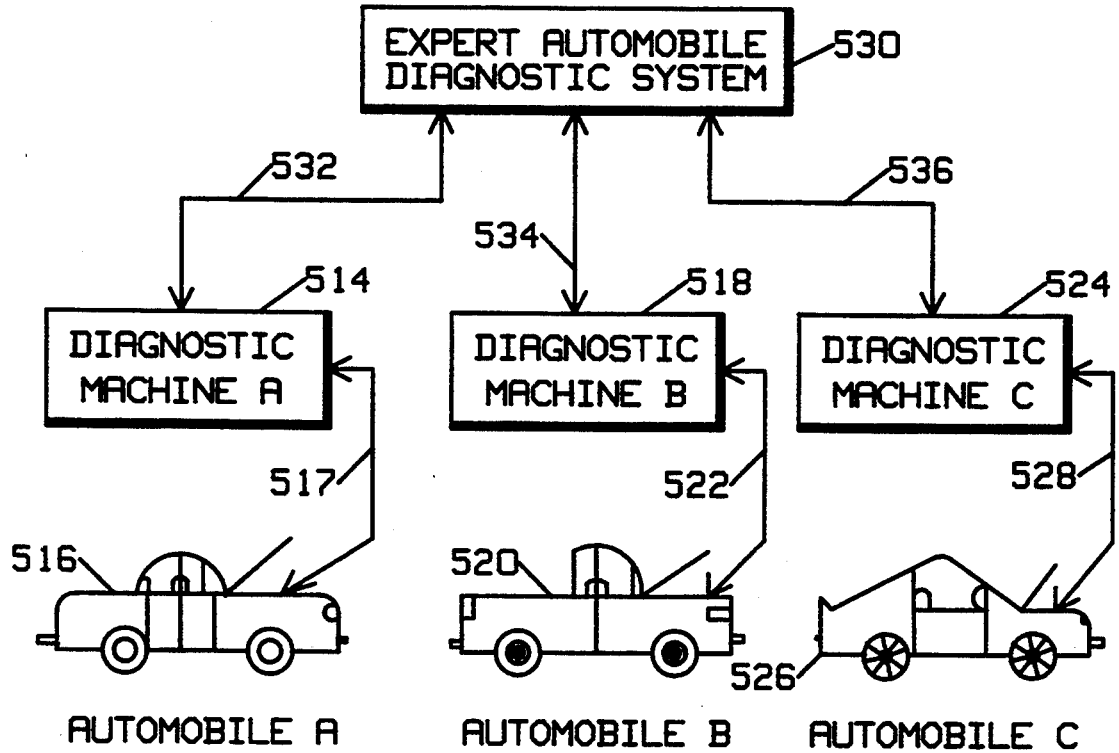
FIG. 23

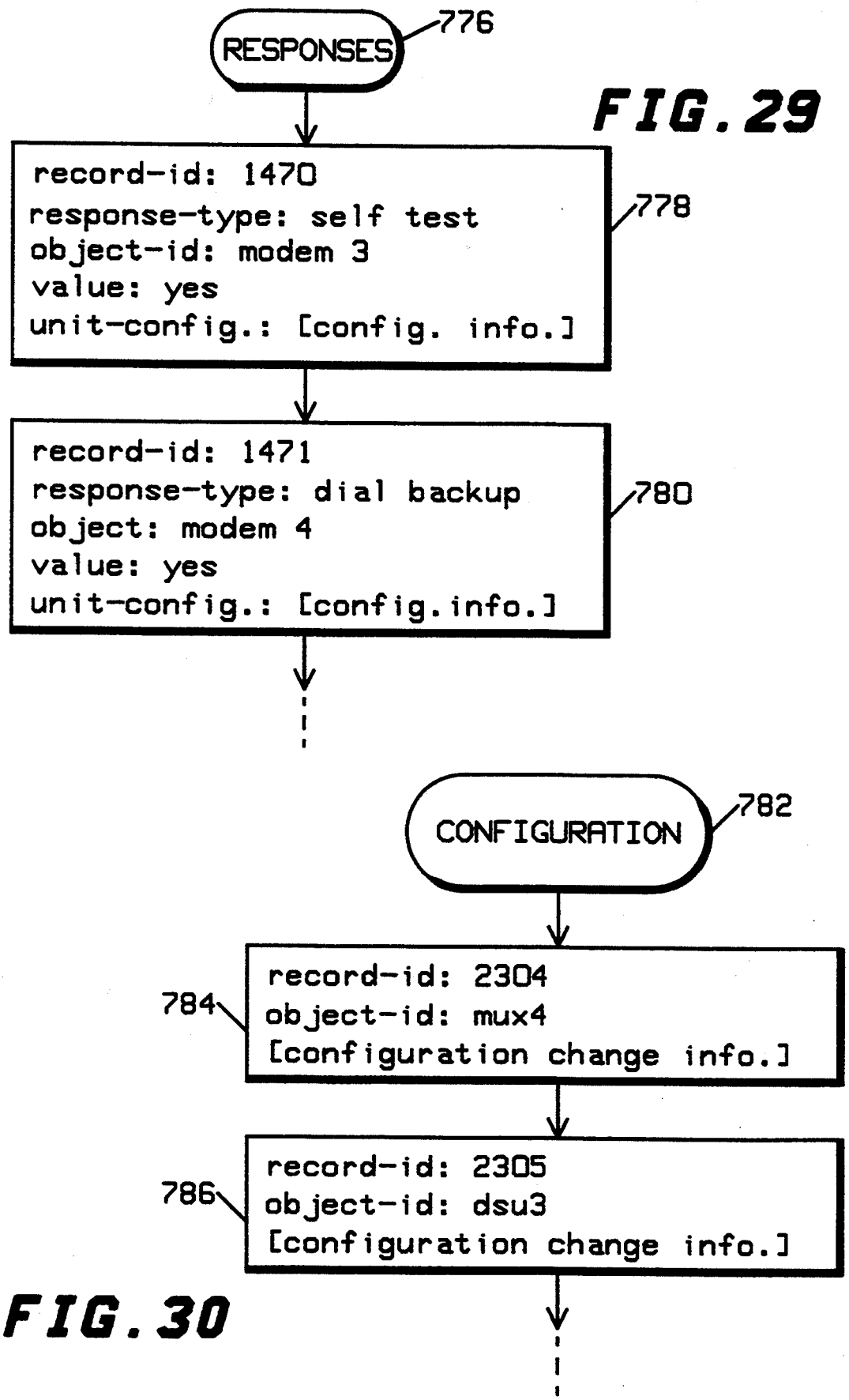

SEMI-AUTOMATIC MODE OF NETWORK DESIGN

This application is a division of copending application Ser. No. 07/802,113, filed Dec. 4, 1991, which is hereby incorporated by reference, which in turn is a division of Ser. No. 447,485, filed Dec. 6, 1989, now U.S. Pat. No. 5,159,685, granted Oct. 27, 1992, which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates generally to the field of artificial intelligence, and more particularly to an expert system interfaced to, or forming a part of, a data communications network management system which automates network alarm handling and assists the network operator in isolating network problems.

2. Background of the Invention

Traditionally, data communications network management systems have concentrated on providing a set of fault isolation and test functions that allow an operator to locate, diagnose and isolate network problems.

Network problems are often expressed by the target network devices or objects (e.g. modems, multiplexers, etc. in the data communication environment) in the form of alarms or other error messages. Alarms can generally be considered events reported by target network devices when abnormal conditions exist. In some networks, alarms are generated autonomously while in others the alarms are actually responses to queries (polls). Although perhaps the former is more appropriately referred to as an alarm, both will be referred to as alarms for purposes of this document. Upon receiving the alarms from the network, the network management system displays the alarms on the operator's console. One of the network operator's responsibilities is to interpret the alarm and then isolate and resolve the problem associated with the alarm in the shortest time span. The operator then uses a series of test procedures to determine the exact cause of the problem. Once found, he may take remedial actions (such as calling for repair or switching in redundant equipment) and then move on to the next alarm.

Sometimes the operator may have difficulty in keeping up with the alarms since a single problem may result in many alarms from affected target network devices (network objects). In such cases, often the operator either ignores them, or just waits until a complaint call arrives. Furthermore, due to the different levels of network operators' experience in dealing with network faults, the problem could get further complicated because of wrong decisions in attempting to diagnose the problem and more time than necessary may be taken to solve the original problem. Such delays can be costly in large networks which are heavily relied upon to quickly move vast amounts of data in short periods of time to carry out the normal course of business. For example, large financial institutions rely upon such systems to move large sums of money electronically. Loss of that ability even for a relatively short period of time may be very costly to the institution. Similarly, airlines rely upon such systems to track passenger reservations and loss of that ability can result in fight delays or cancellations and loss of customers.

In a typical network management environment, a heterogeneous array of switching and transmission equipment may produce hundreds of alarms each day. Moreover, alarms are sometimes spurious, transient, redundant, time correlated, or too numerous to be handled at the same time. This makes a network fault diagnosis task a complex problem where considerable experience is required to interpret and isolate network faults.

Some experienced (expert) network operators acquire or develop strategies and "rules of thumb" in diagnosing networks. It is desirable to encode such knowledge into a knowledge base and make the best expert assistant available at all times, and at all locations. Ultimately, the benefits of routine use of such a system (called an expert system) include reduced operational cost, less down time, increased network performance, more effective fault management in the network, and the ability to build and effectively manage bigger networks.

A major difficulty with typical expert systems is the bottleneck encountered in acquiring knowledge from the expert. The job of a knowledge engineer is to act as an agent, or go-between to help a domain expert build a knowledge-based system. This task usually involves time consuming interviews, lengthy documentation and refinement, and transformation of the acquired knowledge into Artificial Intelligence (AI) based languages or representations. Often, the knowledge engineer and domain expert must work together to debug, extend, and refine the system iteratively. This is usually attributable to the fact that the knowledge engineer has far less domain knowledge than the expert and the expert has far less knowledge about artificial intelligence than the knowledge engineer. Such communication gaps constantly impede the progress and the process of transferring domain expertise into a knowledge-based system. Ultimately, this may lead either to a long development cycle or a failing system. To further complicate the matter, providing expert information is a continuing need in data communications networks since the networks tend to expand and become larger and more complex while adding new and different equipment as time goes on. With this evolution of the network comes an evolution of the products connected to the network (e.g. analog modems to digital devices) and with it a change in the knowledge required to diagnose the network.

A second problem with typical expert systems is that as the complexity of the application domain increases, the classical rule-based system is not adequate. Knowledge management (knowledge acquisition, validation, and maintenance) is also a serious problem when the rule-based system evolves to a certain size. It has been claimed (see Buchanan and Short life, 1984, *Rule-Based Expert Systems*, Addison-Wesley Publishing Company; or Hayes-Roth Fredrick, 1985, "'Rule-Based System", Communications of ACM) that the benefit of the rule approach is the ease of modification and extension of the system because rules can be added independently at any time. However, more recent articles (see Brug, A. Bachant, J. McDermott, J., FALL 1986, "The Taming of R1", IEEE EXPERT; or Jackson, P. 1986, *Introduction to Expert Systems*, International Computer Science Series; or Rauch-Hindin, W. 1987, *Artificial Intelligence in Business, Science, and Industry*, Vol 1 & 2, Prentice-Hall) have proven in many cases that this is not true for medium to large systems such as large data communication networks.

For medium to large diagnostic systems, the rule-based approach has suffered from at least the following problems:
- lack of methodology;
- need for knowledge engineers to transfer knowledge into rules;
- difficult to control program behavior;
- limited generic processing;
- unanticipated rule interactions during rule updates; and
- systems with a large number of rules are difficult to manage, validate and maintain.

One alternative to the problems with traditional rule-based expert systems is flow-chart-based knowledge representation. In the flow-chart knowledge representation scheme, the domain knowledge base is simply represented as decision trees (or flow-charts), similar to the way that many repair manuals are designed. Each decision node in the flow-chart is represented by an object-schema (data structure plus its associated procedures with inheritance). Node objects represent tests, and arcs represent the outcomes of tests leading to the next node object. A separate Inference Engine is constructed to reason through and traverse among flow-chart nodes. This flow-chart approach is particularly attractive in its knowledge acquisition capability. The domain expert can enter his domain knowledge directly into the system by simply manipulating the flow-chart objects by filling in predefined schematic forms.

The following merits are experienced by using the flow-chart knowledge representation in capturing the domain knowledge:
- domain knowledge is transparent and explicit;
- knowledge acquisition is simplified;
- flow-chart browsing can be used to examine the relations among objects in a more systematic manner;
- flow-chart Inference Engine is completely separated from the flow-chart knowledge bases;
- inference processing is quick and effective due to its deterministic nature of the flow-chart representation;
- facilitates fast incremental knowledge acquisition and verification cycle; and
- reduced risk in knowledge maintenance.

However, with the pure flow-chart-based knowledge representation scheme, there are still some deficiencies that have been realized in the course of capturing domain knowledge, such as:
- lack of formal methodology and knowledge structuring;
- lack of goal (hypothesis) directed reasoning capability;
- lack of top-down problem decomposition methodology;
- state of the world is often not adequately represented;
- incomplete and unreliable heuristic knowledge cannot be fully captured and expressed; and
- monotonic reasoning is inadequate for large diagnostics systems.

The present invention ameliorates these difficulties in an expert system with advantages such as an enhanced User Interface, Inference Engine and knowledge representation as described below.

SUMMARY OF THE INVENTION

This invention provides an improved expert system with an enhanced ability to interface directly with the expert, largely bypassing the need for a knowledge engineer and speeding up the knowledge acquisition process. It does so by providing a user friendly interactive interface from which the domain expert can usually directly enter the knowledge into the knowledge base. Ultimately, the benefits of routine use of embodiments of such a system include reduced operational cost, less down time, increased network performance, more effective fault management in the network, and the ability to build and manage bigger networks. In addition, the invention provides a mechanism for filtering redundant alarms, providing several modes of operation, prioritizing goals, suspending or pausing operation as well as other features.

The following objects, features and advantages are met by one or more embodiments of the present invention.

It is an object of the present invention to provide a knowledge base which the domain expert can quickly and easily initialize, debug, display and maintain with minimal use of a knowledge engineer.

It is an advantage of the present invention to provide a knowledge based system to assist network operators in isolating network faults.

It is a further advantage of the present invention to be capable of preempting the current diagnostic process to deal with the more urgent ones, and then continue processing the original diagnosis from where it left off.

It is another advantage of some embodiments of the present invention to employ non-monotonic reasoning. Often in network diagnostics, there will only be enough information to hypothesize as to the problem. When more information becomes available, it is used to refine its hypotheses.

It is a further advantage of the present invention that the system is easily modified as expert knowledge and the underlying system under diagnostic changes.

It is a further advantage of the present invention that labor intensiveness of knowledge acquisition, documentation, verification, validation and maintenance is reduced.

These and other objects, features and advantages of the invention will become apparent to those skilled in the art upon consideration of the following description of the invention.

In a data communication network according to one embodiment of the invention, a method of processing alarms from network objects, includes the steps of: receiving a first alarm; determining whether or not the first alarm is a redundant alarm by comparing the first alarm previously received alarms; and placing the first alarm in a queue for processing by an inference engine if the first alarm is not a redundant alarm.

In another embodiment of the invention, a method of processing events in an expert system, includes the steps of: receiving a first event; determining whether or not the first event is a redundant event by comparing the first event with other events which have been received; and placing the first event in a queue for processing by an inference engine if the first event is not a redundant event.

A method for prioritizing events for processing by an inference engine according to an embodiment of the invention, includes the steps of: receiving an event; translating the event into a goal; classifying the goal as one of a plurality of goal types; assigning a priority number to the goal based upon the importance attributed to the goal type of the goal by a domain expert; tagging the goal with a time associated with occurrence of the event; and determining that the goal has a higher prioritization than another goal with the same priority number based upon the time.

An expert network diagnostic system for diagnosing problems in a communication network in a semi-automatic mode according to the present invention, includes a network manager for performing diagnostic tests on the network, the diagnostic tests including non-interruptive tests which do not significantly impact operation of the network and interruptive tests which require interfering with function a device in the network while the interruptive test is performed. An Expert System determines an appropriate one of the diagnostic tests to be performed to diagnose a problem with the network. It is determined whether the appropriate test is an interruptive or non-interruptive test and the appropriate test is invoked if the appropriate test is non-interruptive. Consent of an operator is obtained to perform the appropriate test if the appropriate test is interruptive.

An expert diagnostic system for providing diagnostics to a diagnostic target in a semi-automatic mode according to an embodiment of the present invention includes means for performing diagnostic tests. An appropriate one of the diagnostic tests to perform to diagnose a problem is selected. It is determined if the appropriate test meets a predetermined criteria. The appropriate test is invoked if the appropriate test meets the criteria. Consent of an operator is obtained to invoke the appropriate test if the appropriate test does not meet the predetermined criteria.

In an expert system according to an embodiment of the present invention, a method of applying expert knowledge to a goal, includes the steps of: posting the goal to a display; retrieving a knowledge tree corresponding to the goal; instantiating the knowledge tree; posting information from nodes of the knowledge tree to the display as each node is instantiated so that only information from instantiated nodes appear on the display.

In an expert system for providing diagnostic services for a communication network, a method according to an embodiment of the present invention for processing events reported from the network, includes the steps of: receiving a current event from the network; comparing the current event with other events previously received from the network to determine whether the current event corresponds to a previously received event in that both the current event and the previously received event serve to report a common problem in the network; and discarding the current event if the current event corresponds to the previously received event.

A method for applying expert knowledge to an alarm in a system to be diagnosed by an expert system residing on a computer in one embodiment of the present invention, includes in combination the steps of: receiving an alarm from the system; mapping the alarm to a corresponding expert knowledge source, the corresponding expert knowledge source being one of a plurality of available expert knowledge sources; retrieving the corresponding expert knowledge source; instantiating at least a portion of the corresponding expert knowledge source; and invoking an inference engine to find a solution to the alarm using the instantiated portion of corresponding expert knowledge source.

A method for entering expert information into an expert system residing on a computer, according to an embodiment of the present invention, includes the steps of: defining a hypothesis tree node by entering attributes of the hypothesis tree node into the expert system, the attributes including a first identifier for the hypothesis tree node and a second identifier for a node connected to the hypothesis tree node by a branch of the hypothesis tree; adding the first identifier to a list containing defined nodes; determining whether or not the second identifier is on the list of defined nodes; determining whether or not the second identifier is not a list of undefined nodes if the second identifier is not on the list of defined nodes; and adding the second identifier to the list of undefined nodes if the second identifier is not already on the list of undefined nodes.

In another embodiment of the present invention, an expert system for use on a computer, includes a mechanism for adding a node for entering expert information represented by nodes of a knowledge source by entering attributes of the nodes into a template. The knowledge source includes at least a hypothesis tree node terminating in a flow-chart node. The attributes of the node include a node identifier attribute which gives a name to a node being added, a node type attribute which describes fundamental characteristics of the node being added and which distinguishes between hypothesis tree type nodes and flow-chart type nodes, and a points-to attribute which gives the name of node branching from the node being added.

In an expert system according to the present invention, a method of applying expert knowledge to a goal, includes the steps of: posting the goal to a goal queue in a memory; retrieving a knowledge tree corresponding to the goal; instantiating the knowledge tree; posting information from nodes of the knowledge tree to the memory as each node is instantiated so that only information from instantiated nodes are posted to the memory.

In the preferred embodiment of the present invention, an Expert System 10 provides diagnostics to a data communications network 5. Alarms from a Network Manager 24 are received and queued by an Event Manager 117 and then filtered by an Alarm Filter 118 to remove redundant alarms. Alarms which are ready for processing are then posted to a queue referred to as a Bulletin Board 120. A Controller 112 determines which one of the posted goals has the highest priority by considering a priority number associated with the goal plus a time of arrival of the goal. An Inference Engine 122 uses information from an Expert Information Structure 111 to solve the highest priority goal by a process called instantiation. The process of solving the goal may be interrupted by a pause or suspension in order to perform tests under the direction of a Network Test Manager 124 or retrieve other information during which time other goals may be processed. Expert information is entered using a user friendly User Interface 104 which reduces need for the participation of a Knowledge Engineer. Configuration information about the network is maintained in a Network Structure Knowledge Base 109 by a Network Configuration Module 108. The Expert System 10 may operate in any of three modes:

manual, wherein tests must be approved by or directed by an operator; automatic, where tests are run automatically without operator intervention; and semiautomatic, where operator approval is required for certain tests such as interruptive tests and other tests such as non-interruptive tests may proceed without operator intervention.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

BRIEF DESCRIPTION OF THE DRAWING

FIG. 8 shows a flow-chart of the operation of procedure Modify Node Information.

FIG. 9 shows a flow-chart of the operation of procedure Modify Node Type.

FIG. 10 shows a flow-chart of the operation of procedure Delete Node.

FIG. 21 shows a flow-chart of the operation of procedure Resume which resumes operation on a paused Goal.

FIG. 22 shows a flow-chart of the operation of procedure Exit which exits the ENDS.

FIG. 23 shows a functional block diagram of a hypothetical automobile diagnostic system used to assist in explaining the present invention.

FIG. 29 shows a portion of the Response Queue 116.

FIG. 30 shows a portion of the Configuration Queue 113.

DETAILED DESCRIPTION OF THE INVENTION

The present invention has broad applications to diagnostic systems in general and may be readily adapted to a broad variety of problems. In particular, the present invention uses a representation of knowledge, referred to herein as "Expert Information Structure" or "Structured Flow Graph" knowledge representation, and a user interface and method of processing knowledge which greatly enhances the extraction of expert knowledge from a domain expert and facilitates the diagnosis of problems in a data communication network. The preferred implementation is a data communication network diagnostic environment as will be described below in greater detail. The invention itself, however, should not be so limited since it may be broadly applicable to many types of diagnostics systems.

Environment of the Preferred Embodiment

Figure 1:
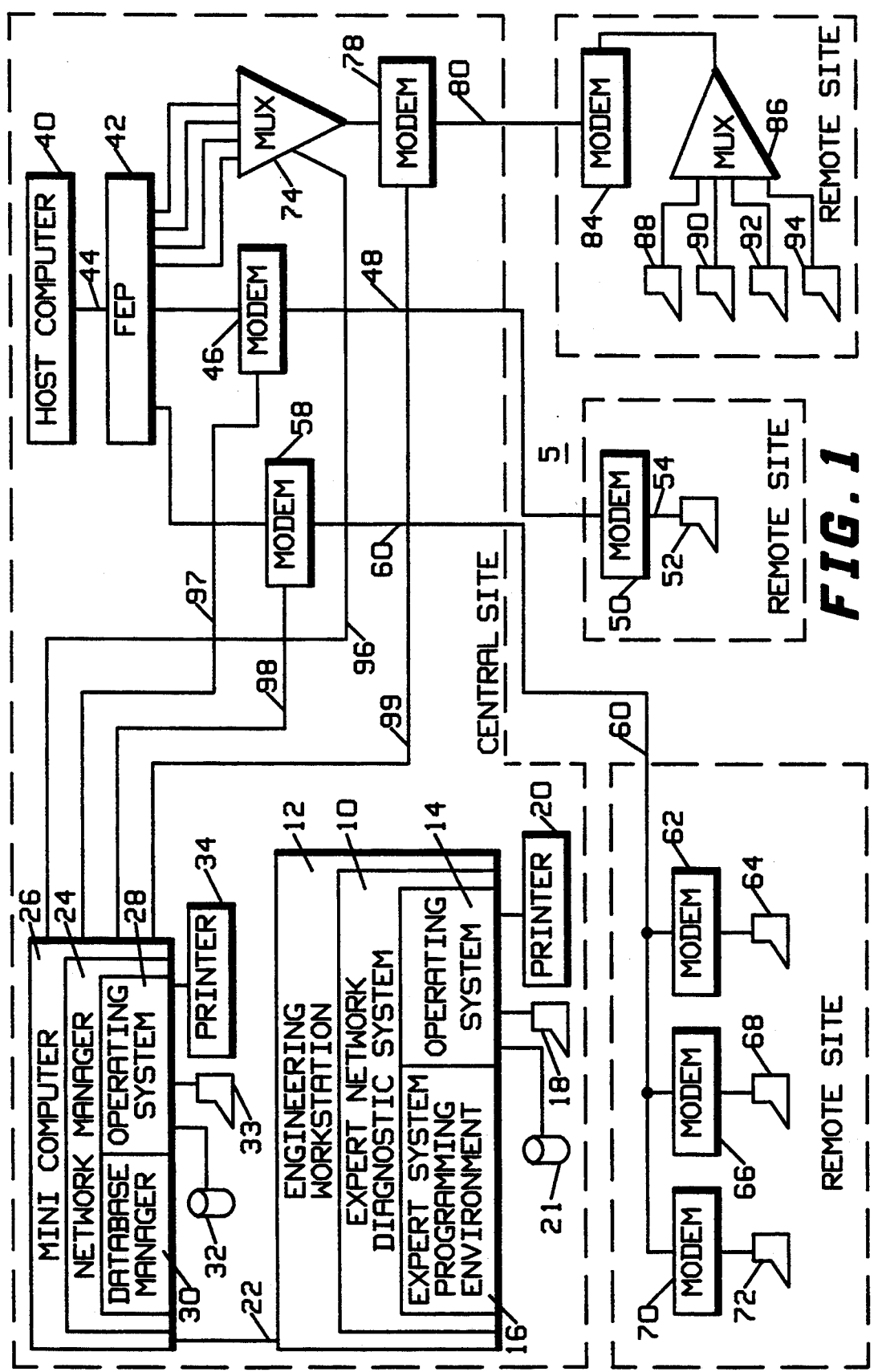
FIG. 1 is a block diagram of a network and network management system interconnected with the Expert System of the present invention.

Turning now to the drawings in which like reference numerals represent like or similar structures throughout the various figures, FIG. 1 illustrates an exemplary data communication network 5 interconnected with an Expert Network Diagnostic System (ENDS) 10 and a Network Manager 24. The Expert Network Diagnostic System 10 may be synonymously referred to herein as ENDS, Expert System and the like. The ENDS 10 performs diagnostics functions to the diagnostic target network 5 in the preferred embodiment, but the invention itself should not be so limited since other diagnostic targets can support a similar Expert System.

The ENDS 10 may be based on an engineering workstation 12 such as a Sun/3 TM workstation or other suitable host on which a multiprocessing operating system 14 such as the Unix TM operating system and an Expert System Programing Environment 16 such as Carnegie Group's Knowledge Craft TM software has been installed. Object-Oriented Programing (OOP) languages such as C++ can also be used to implement the present invention. By careful programming, such a system could be made efficient enough to operate on a personal computer or the like. The Operating System 14 manages the input and output of data to the ENDS 10 as well as the scheduling of ENDS 10 processes in a known manner. The Expert System Programing Environment 16 compiles, interprets and translates the code of the ENDS 10 processes. To facilitate input, output and storage to ENDS 10, a terminal 18 with built in display, printer 20 and disk drive 21 may be attached to the workstation 12.

The ENDS 10 communicates with Network Manager 24 via a connection 22 (for example, an RS 232 connection). Network Manager 24 may be similar to Network Management systems such as CMS ® series network management systems commercially available from Racal-Milgo, 1601 N. Harrison Parkway, Fort Lauderdale, Fla. Such network management systems are further disclosed in U.S. Pat. No. 4,385,384 to Rosbury, et al. which is hereby incorporated by reference. The Network Manager 24 is preferably based upon a minicomputer 26, such as a DEC Microvax II TM minicomputer, or engineering workstation on which a multiprocessing operating system 28 such as the Unix TM operating system and a database manager 30 such as the Oracle ® database manager by Oracle Corporation have been installed. Via connection 22, alarms are passed from the Network Manager 24 to ENDS 10. Similarly commands, much like those an expert operator would enter from the Network Manager 24's terminal 33 are sent via connection 22 from the ENDS 10 to the Network Manager 24. In other embodiments, the Network Manager 24 and ENDS 10 may be installed on a Microcomputer and other environments may occur to those skilled in the art. The operating system manages the input and output of data to the Network Manager as well as the scheduling of Network Management processes. The database manager 30 manages data describing the network configuration in a conventional manner. To facilitate input to and output from the Network Manager 24, a disk drive 32 terminal 33 and printer 34 are attached to the minicomputer.

In the present example the diagnostic target, a data communication network 5, includes a host computer (Host) 40 coupled to a Front End Processor (FEP) 42 via connection 44 which is further coupled to a network of objects in this example including data modems and multiplexers. In general, the network may also include other objects such as Digital Service Units (DSU's), encryption devices, restoral devices, switches, terminal adapters, Packet Assemblers and Disassemblers (PAD's) as well as other such devices. In general, the network 5 shown in FIG. 1 is very simple compared to real life data networks and is intended only for illustrative purposes.

In the example network 5, three distinct branches emerge from the FEP 42. A first branch is made up of a point to point analog connection in which a central modem 46 is connected to the FEP 40 to receive and send information thereto. The modem 46 is connected via an analog transmission line 48 to a remote modem 50. Remote modem 50 is in turn connected to a terminal 52 or other data terminal equipment (DTE) via connection 54.

A second branch of the network starts with central modem 58 which is coupled to the FEP 42. This modem 58 feeds a multidrop connection (a connection where more than one modem is directly served by the same transmission line) via a transmission line 60. The first drop on this multidrop transmission line 60 feeds a remote modem 62 which in turn is connected to a terminal 64. The second drop feeds a remote modem 66 which is connected to a terminal 68. Similarly, the third drop feeds a remote modem 70 which is connected to a terminal 72.

A third branch of the network, starts with a multiplexer 74 which is interconnected with the FEP 42 via four connections. The multiplexer 74 has its output driving a high speed modem 78. Modem 78 is coupled through a point-to-point analog transmission line 80 to a similar modem 84. Modem 84 is then coupled to a multiplexer 86 which is in turn coupled to terminals 88, 90, 92 and 94 (and/or other data terminal equipment (DTE) devices).

The Network Manager 24 communicates with the network objects via, for example, RS232 connections 96, 97, 98 and 99 to central cite objects such as multiplexer 74 and modems 46, 58 and 78 respectively. These objects communicate with the remaining network objects via a multiplexed secondary diagnostics channel (frequency division multiplexed in the preferred embodiment). Modems capable of doing so are commercially available as the Racal-Milgo Omnimode ® series modems. Multiplexers with such capabilities are commercially available as the Racal-Milgo Omnimux ® series multiplexers. These connections enable the Network manager 24 to communicate with the entire network 5 through these central site objects. Those skilled in the art will appreciate that the network shown in FIG. 1 is somewhat simplified compared to real world networks and is presented only as a mechanism for understanding the general environment of the invention.

Messages passed between the Network Manager 24 and the network objects include alarms, informational messages and instructions. Network objects can signify malfunctions by sending alarms to the Network Manager 24. Network objects can send informational messages in response to requests from the Network Manager 24. The Network Manager 24 can send instructions to network objects to perform diagnostic tests or other functions such as loop back tests or switching functions.

The Network Manager 24 and the central network objects 46, 58, 74 and 78 can exchange alarms, informational messages and instructions directly or through a dedicated network such as a dial-up network or an ×X.25 network. Remote objects, i.e. network objects located at remote sites, communicate with the Network Manager 24 through the central objects via a multiplexed in-band or out-of-band secondary diagnostic channel in a known manner.

As previously mentioned, some network management system's diagnostics are not autonomous alarm based. However, equivalent information is generally available at the Network Manager 24 for use by the expert system 10. For purposes of this discussion, all will be referred to as alarms.

When the Network Manager 24 receives an alarm, it informs the operator via the terminal 33 and/or printer 34. The operator can then use the terminal 33 to send an instruction to the object which sent the alarm. For example, he can instruct the sending object to perform diagnostic tests and send back the results. Upon determining the nature of the malfunction, the operator can send remedial instructions to the object such as lowering transmission speed or switching in a redundant object or he can take other corrective actions such as contacting the telephone company for repairs.

Through the connection 22, the ENDS 10 can communicate with the network 5 as if it were the operator of the Network Manager 24. The Network Manager 24 forwards alarms to ENDS 10. ENDS 10 can then send instructions to network objects requesting more information or initiating various diagnostic tests. Upon determining the nature of the malfunction, the ENDS 10, in conjunction with the Network Manager 24 can send remedial instructions in some cases such as switching in redundant equipment or rerouting traffic.

Those skilled in the art will appreciate that the system and network shown in FIG. 1 is intended to be illustrative and that many variations are possible. For example, the Network Manager 24 and the ENDS 10 could possibly coexist on the same computer system in an alternative embodiment so that duplicate operating systems, disk drives, printers and terminals may not necessarily be required. Of course, such a system might require a more powerful multitasking computer system than those individually required by the Network Manager 24 and the ENDS 10 in the illustrative embodiment in order to achieve similar performance speed. Similarly, great variety can exist in the actual communications network. It should also be recalled that the Expert System of the present invention can be used for purposes other than network diagnostics.

Overview of the Invention

Figure 2:
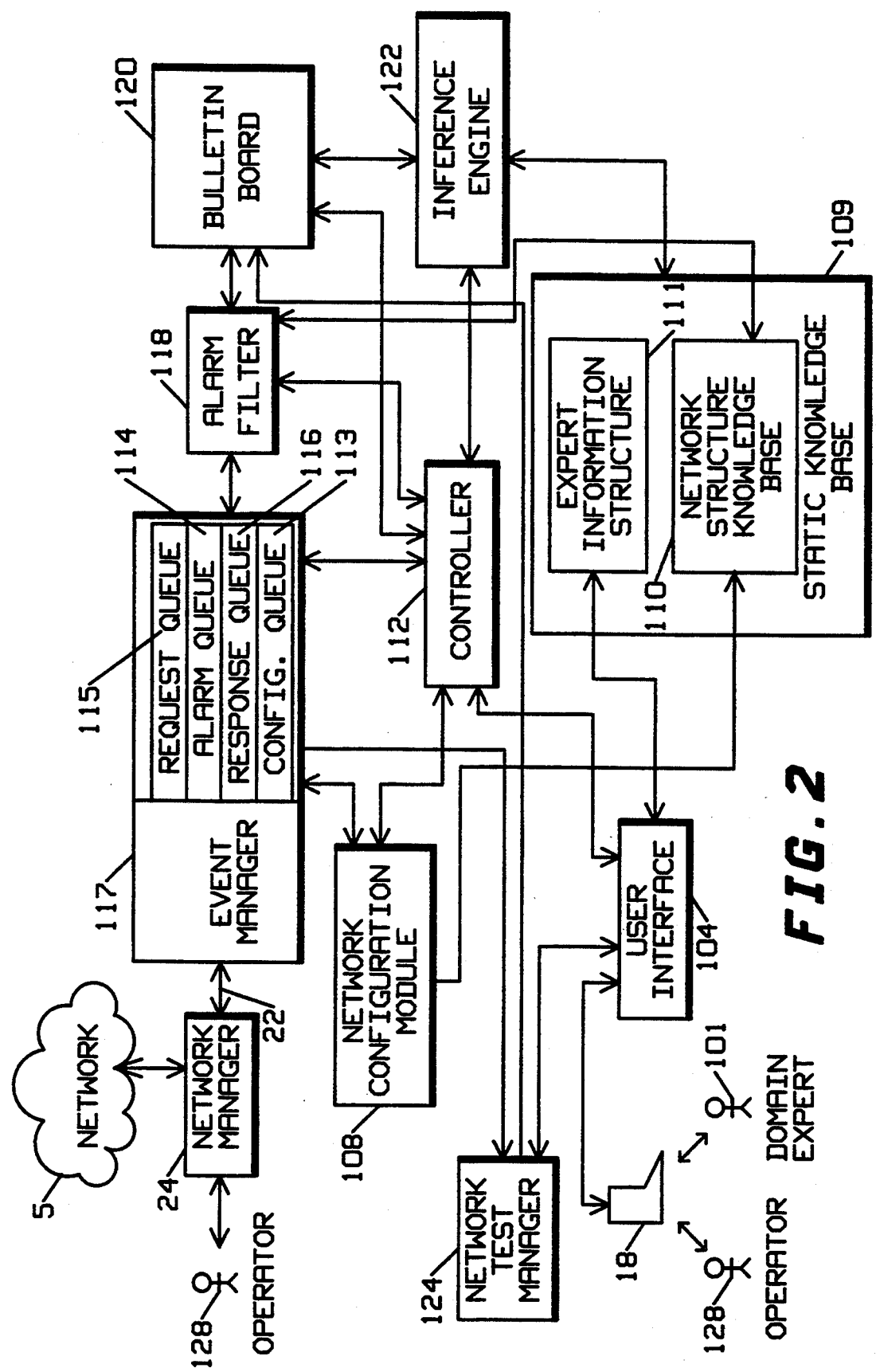
FIG. 2 is a functional block diagram of an embodiment of the invention.
Figure 3:
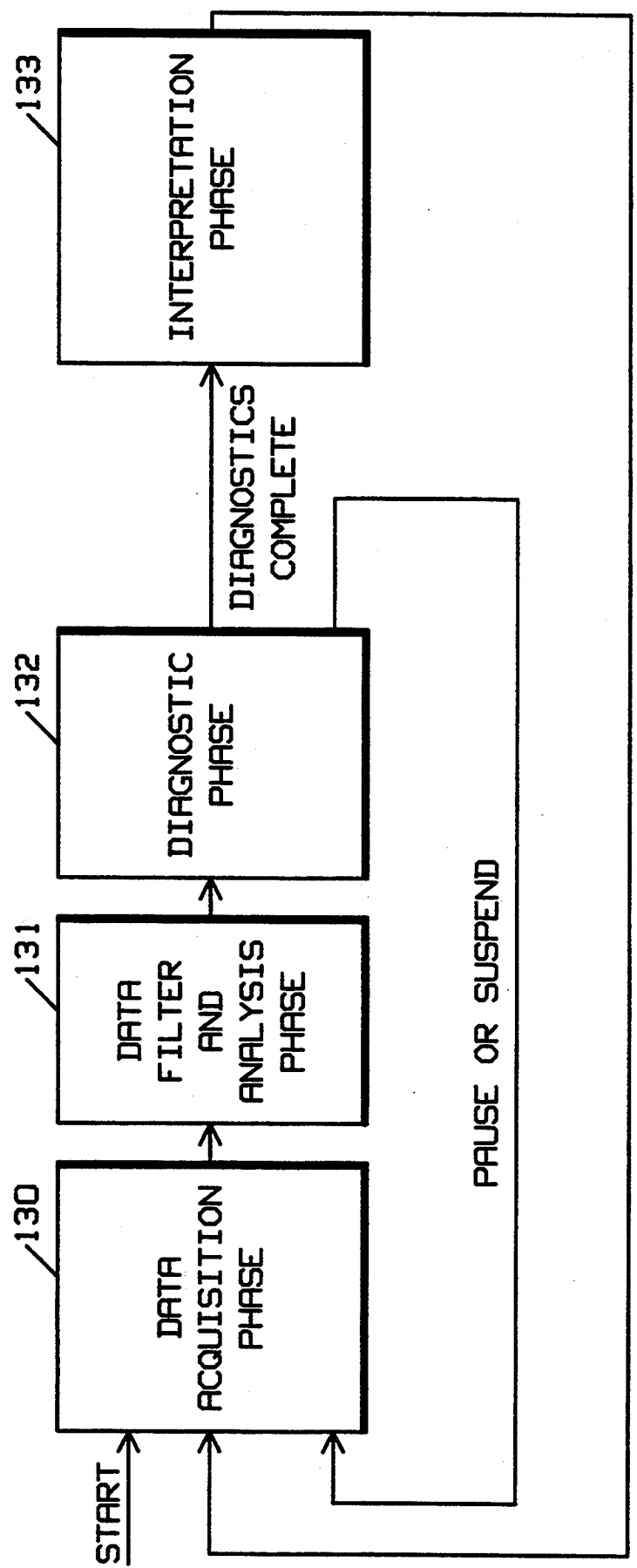
FIG. 3 is a high level flow-chart showing the processing flow for each phase of operation of the Expert System of the present invention.
Figure 4:
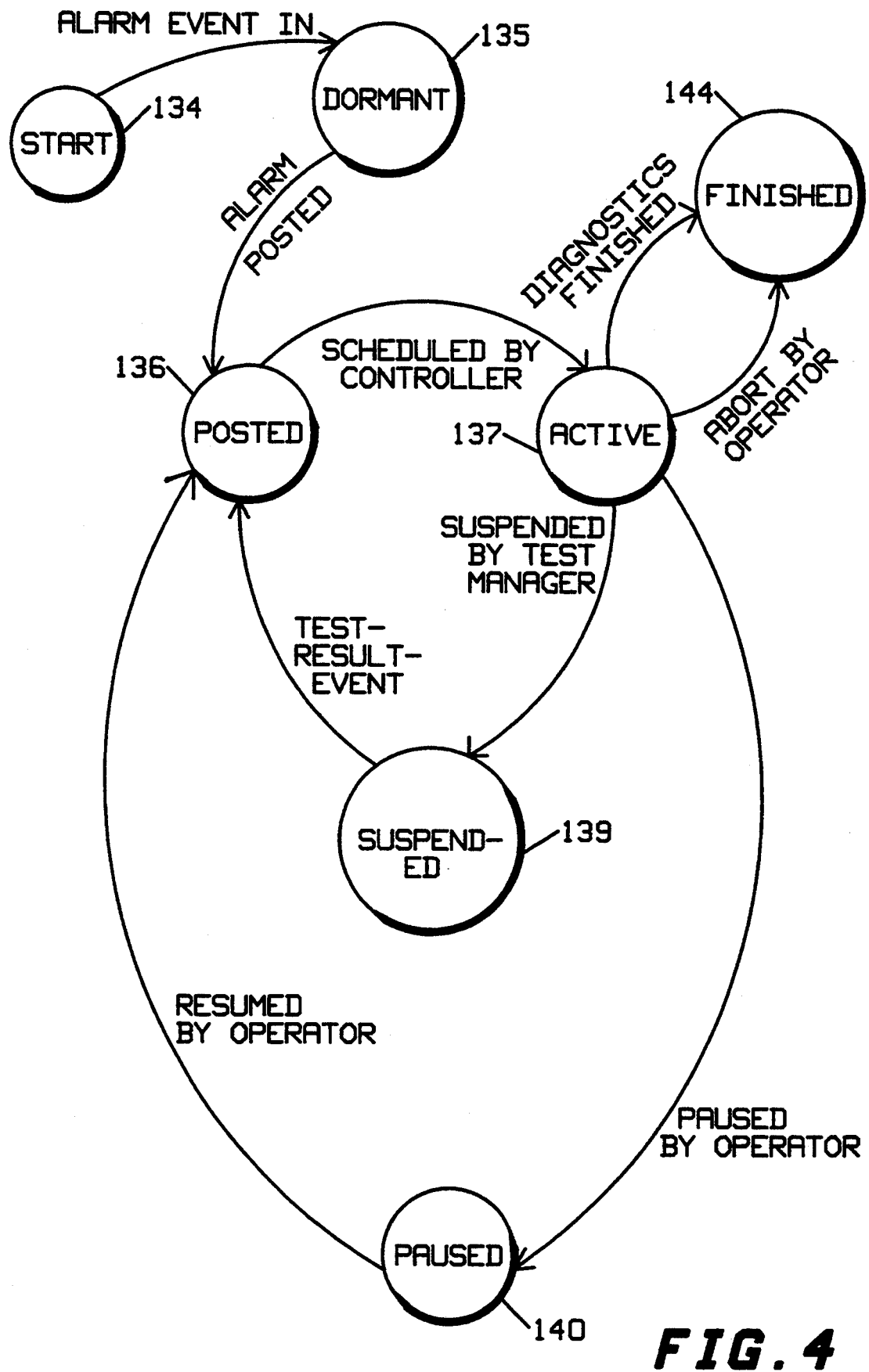
FIG. 4 is a goal state transition diagram for the operation of the present invention.

The architecture of the ENDS 10 is illustrated in some detail by the functional block diagram of FIG. 2 while the overall operational flow is described in conjunction with FIG. 3 and the defined states of goals are covered in FIG. 4. In order to understand the invention, its overall structure is first briefly presented in conjunction with FIG. 2. The overall flow of operation will then be discussed in conjunction with FIG. 3, followed by a discussion of the state diagram of FIG. 4. At this point a more detailed discussion of the interaction and operation of each of the individual components of FIG. 2 will proceed.

ENDS 10, in its preferred form, comprises several parts: a User Interface Module 104, a Network Configuration Module 108, a Static Knowledge Base 109 comprising a network structure knowledge base 110 and an expert information structure 111, a Controller 112, an Event Manager 117, an Alarm Filter 118, a Bulletin Board 120, an Inference Engine 122, and a Network Test Manager 124, as seen in FIG. 2.

The basic function of each of these components is described below. Although some of the terminology used in these brief descriptions has not yet been introduced, this summary will be useful as a glossary for the reader's later reference.

EVENT MANAGER 117—Receives "events" from the Network Manager 24 and determines what kind of event it is (alarm, response, or configuration), constructs a "record" using the information about the event and places the record in the appropriate queue. (Alarm Queue 114, Response Queue 116, or configuration Queue 113). The Event Manager also receives request from the Network Test Manager 124 and places them in Request Queue 115 for forwarding to the Network Manager 24. Responses in the Response Queue 116 are answers to requests and are forwarded to the Network Test Manager 124. Alarms are sent to the Alarm Filter 118. Configuration information is sent to the Network Configuration Module 108. The Event Manager 117 also prioritizes the events where required.

ALARM FILTER 118—Posts alarms in the form of goals to the Bulletin Board 120 after removing redundant alarms through a filtering process.

NETWORK CONFIGURATION MODULE 108—Manages the Network Structure Knowledge Base 110 by interpreting information in the Configuration Queue 113 and updating the Network Structure Knowledge Base 110 accordingly so that the Expert Network Diagnostic System (ENDS) 10 always has a current picture of what the network 5 looks like.

NETWORK TEST MANAGER 124—Sends instructions to the Network Manager 24 requesting tests and further information needed to perform diagnostic functions.

BULLETIN BOARD 120—A global data structure, which could also be thought of or referred to as the Goal Queue, which holds goals to be processed by the Inference Engine 122. The Bulletin Board 120 also dynamically posts goals, tests etc. as processed by the Inference Engine 122 in a process referred to herein as 'instantiation'.

STATIC KNOWLEDGE BASE 109—Stores the Expert Information Structure 111 which holds the knowledge of the Domain Expert 101 in a form usable by the Inference Engine 122. Also stores the Network Structure Knowledge Base 110 which contains information about the makeup and structure of the Network 5 and is maintained by the Network Configuration Module 108.

INFERENCE ENGINE 122—Determines which rules in the Expert Information Structure 111 to apply and applies rules stored in the Expert Information Structure 111 to goals on the Bulletin Board 120 to determine cause of Alarms. It does so by instantiating a goal tree for each goal in accordance with the Expert Information Structure 111. If further information is needed, it queries the user or the Network Test Manager 124 to obtain the information. Processing of a goal may be paused or suspended to allow processing other goals while tests are being performed.

USER INTERFACE 104—Provides Operator 128 or Domain Expert 101 with prompts, templates, menus, etc. to allow for easy entry of information or queries. The User Interface 104 operates in two modes, Expert Knowledge Acquisition and System Operation, to provide a user friendly environment in which the Domain Expert 101 or Operator 128 may interact with the Expert System 10.

CONTROLLER 112—Schedules and invokes the above modules in appropriate sequence and oversees operation of the Expert Network Diagnostic System (ENDS) 10 generally. Selects one of posted goals on Bulletin Board 120 for active status so that it can be processed by the Inference Engine 122 by examining the goal's priority number as well as its arrival time.

FIG. 3 depicts the overall flow of the operation of the invention. Recall that the invention operates in one of two basic modes: Expert Knowledge Acquisition, and System Operation. The Expert Knowledge Acquisition mode is used to allow the Domain Expert 101 (or the Operator 128) to enter domain expert knowledge into the system. The System Operation mode is used during actual operation of the system for performing diagnostics functions. For now, let us assume that the knowledge from the Domain Expert 101 has already been entered into the system and that the system is in the System Operation mode. Later, the Knowledge Acquisition process will be treated in detail.

Referring to FIG. 3, when the system is started, it enters a data acquisition phase 130 in which data (in the form of "events" from the Network Manager 24) relating to the performance of the network are reported to the Event Manager 117. In general, these data may represent network malfunctions, as will become clear later. These data are then passed to the Alarm Filter 118 which operates in conjunction with the Network Structure Knowledge Base 110 to perform analysis and filtering function; to take place at a data filter and analysis phase 131. In this phase, the data are filtered by removing redundant data and placed in a form suitable for posting on the Bulletin Board 120.

Once placed on the Bulletin Board 120, the system moves into a diagnostic phase 132 with respect to the data posted on the Bulletin Board 120. In this stage, data having highest priority of all data posted on the Bulletin Board 120 are placed in an active state. A knowledge source associated with the particular type of data is retrieved and operated upon by the Inference Engine 122 in conjunction with the Expert Information Structure 111 (i.e. the knowledge of the Domain Expert 101) and if further information is required to diagnose the problem, the Network Test Manager 124 may be invoked to perform specific tests on, or retrieve further information about, the network via the Network Manager 24.

When such further tests are required, often the process of performing the tests may take a long time or require undesirable interruption of normal network operation. In such cases, the Operator 128 may wish to pause operation on that data until a later time if a manual mode of operation is in use. In an automatic mode of operation, the system may automatically suspend operation on that data until the requested further information or test result is received. While waiting for the test result or further information to be received, the data being processed reenter the data acquisition phase 130. This allows the system to process other data ("events") in the meantime. Resumption of processing of the data 'takes place at the point where processing was paused or suspended. When the diagnostic phase is completed, the system enters the interpretation phase 133. In this phase, the results of the diagnostics are logged to a printer, a disk file and/or the screen for use by the operator who may be required to take various corrective actions such as ordering repairs or replacement defective components, contacting the telephone company, etc.

Each phase of the above process is controlled, invoked and scheduled by the Controller 112. The Controller 112 may be thought of as a supervisor of the operation of the system.

The "data" referred to above takes several forms. In general, the data start out as an "event", which as used in this example communications network diagnostic system, is a message either from the Network Manager 24 to the ENDS 10 or from ENDS 10 to the Network Manager 24. Three types of events are sent from the Network Manager 24 to the ENDS 10 via communication line 22. First, a configuration event contains information about the configuration of the network 5. Second, an alarm is a report of a network malfunction. Third, a result event contains the results of a test or query such as a network component test or a query of a database for information. A fourth type of event, a request event, is sent from the ENDS 10 to the Network Manager 24 via communication line 22. It contains a request for a network device to perform a diagnostic test or a request to retrieve information describing a network object's configuration from the data base manager 30.

Of greatest interest at this point is the "alarm" event which can be thought of simply as a report issued from a network object (or Network Manager) indicating that it has detected a possible malfunction or other error condition which needs attention. The data acquisition phase 130 deals with receipt of these alarms (and other events). The Event Manager 117 converts these alarms into a data structure referred to herein as a "record" with an unique name given by the Event Manager 117. During the data filter and analysis phase 131, these records (if not redundant, e.g. two network objects report detecting the same malfunction) are posted to the Bulletin Board 120 at which point they are converted to "goals". That is, it becomes a goal of the system to find the solution to the problem which resulted in the alarm corresponding to these goals. Hereafter, the terms "event", "goal", "alarm" and "record" may be used somewhat interchangeably to represent data structures corresponding to the same "event". The term "node" is used herein to describe flow-chart blocks and hypothesis tree nodes, but those skilled in the art will appreciate that the term "node" is sometimes used in the literature to describe that which is referred to as a "record" herein. Use of the term "record" is intended to minimize confusion and not as a technical limitation for the particular type of data structure used in implementation.

As shown in FIG. 4, goals may be considered to have any of five states in the preferred embodiment of the present invention: posted, active, suspended, paused or dormant. The two remaining states, start and finished are shown for clarity of explanation. The transition from one state to the next is shown in the state flow diagram of FIG. 4. A start state 134 is defined as a condition where the system is awaiting receipt of an alarm event. When an event is received, it is held in queue at the dormant state 135 until the system can post the event. State 136 (posted) represents goals which are posted on the Bulletin Board 120, after filtering by the Alarm Filter, either as a result of an alarm event, a test result event or resumption of a user paused event. In this state, when the goal has the highest priority of all goals on the Bulletin Board 120, it is selected for further processing. Once the posted goal has been selected for processing by the Inference Engine 122, the state changes to active state 137. In the event of suspension of processing by the test manager 124 (e.g. to perform a lengthy diagnostic test), the state changes to suspended state 139 until receipt of a test result event once again results in change to the posted state 136.

While in active state 137, the goal may be paused under certain circumstances by the Operator 101 placing the goal in paused state 140 until resumed by the user at which point the goal is returned to the posted state 140. (It may be desirable to pause the goal rather than begin a lengthy interruptive test which would disrupt communications.) In active state 137, when diagnostics is completed, the goal moves into a finished state 144 with respect to the goal of interest. The finished state 144 of FIG. 4 corresponds roughly to the interpretation phase 133 of FIG. 4. The diagnostic phase 132 of FIG. 3 corresponds to the active, posted, suspended and paused states of FIG. 4. The dormant and posted states 135 and 136 of FIG. 4 correspond roughly to the data acquisition phase 130 and the data filter and analysis phase 131 of FIG. 3.

The system may be implemented or operated (for example by selection from a menu) in any of three modes during System Operation according to the preferred embodiment. The modes are Automatic, Manual and Semi-Automatic. To understand the rational for these modes, let us digress briefly to a discussion of the data communication environment.

In the data communication and network management environment, it must be remembered that it is often the case that many alarm are of negligible importance due to transient phenomenon. Further, it should be noted that often alarms are produced due to degradation of communication, as for example in the case of a marginal transmission line which in affected by changes in weather which make it impossible to transmit at the highest data rates over such lines. In this example, a 19.2 Kbps modem might be forced to reduce its data rate to 16.8 Kbps in order to cope with the poor transmission line without introducing transmission errors. Such a rate change is normally prompted by an increased error rate or retransmission rate at the higher data rate and often causes an alarm to be sent to the Network Manager 24. In order to diagnose this problem, it might be necessary to perform interruptive tests, i.e. tests which interrupt communication such as loop-back tests.

Consider the case of a financial institution operating during normal business hours. If the above modem is serving all of the tellers in the financial institution, the lowering of the data rate to 16.8 Kbps may go unnoticed, depending upon the work load at the time. Worst case, such a data rate change will slow down response time of the tellers' terminals to some degree. If an interruptive diagnostic test is run, the modem must be taken completely out of service for a period of time varying from several minutes to much longer in order to diagnose the problem. If this were done, the tellers would be completely unable to process transactions and customer lines would back up until service was restored.

Obviously, in the above scenario poor weather is slowing down communication, but little can be done about it without disrupting service. Since the disruption of service for diagnostics would be more damaging to the day to day transaction of business than simply living with the decreased data throughput for a while, it is desirable not to implement interruptive diagnostic tests at this time. It is, however possible that there are non-interruptive tests which might pinpoint the problem to a transmission line which needs service. Such tests might be readily run without disrupting business and might lead to correction of the problem.

By allowing the three separate modes of operation, such situations can be dealt with, in a manner least disruptive to business, by the Expert Network Diagnostic System (ENDS) 10 of the present invention. In the manual mode, all tests or actions are individually under the control of the operator at all times so that all tests must be ordered by the Operator 128 before they can be performed. In the automatic mode, all tests are automatically performed by the Expert System 10 (ENDS) regardless of whether or not the test will result in an interruption. In the above environment, the automatic mode might be invoked during evenings and/or weekends when user data traffic is low or nonexistent. The tests can then be logged by the system for examination by the Operator 128 during working hours. In this manner, problems such as the above can be detected and corrective action taken at times when business will be minimally disrupted. The third mode, Semi-Automatic, may generally be defined as anything in between. In the preferred embodiment, the Semi-Automatic mode is designed so that non-interruptive tests are automatically performed while interruptive tests require consent or direction by the Operator 128. In this manner, the Operator 128 can make a judgment as to whether or not the problem is severe enough, given the circumstances (time of day, day of week, work load, etc.), to warrant a disruption of service for diagnostic testing.

In the manual mode or semi-automatic mode, if the test is interruptive, the user will be presented with a question or instruction to perform a particular test in the preferred embodiment, such as:

---
PERFORM A SELF TEST OF MODEM 39.

RESULT = _____
---

At this, the Operator 128 can either pause the process if it is not an appropriate time to perform the test, or perform the test and enter the answer in the blank. If the Operator 128 pauses the test, he can later return to enter the answer and continue the diagnostic process.

To relate the various modes to FIG. 4, the suspended state is entered by the Network Test Manager 124 in the automatic mode. The Paused state is entered by the Operator 101 in the manual mode. A hybrid of these is used in the Semi-Automatic mode depending upon whether or not the test is interruptive.

Referring back to FIG. 2, a more detailed description of the interaction of the various functional blocks follows:

Expert information is entered into ENDS 10 by a Domain Expert 101 (someone with extensive experience in diagnosing problems with this network) in general. Because of the structure of the expert information used by the present invention, the services of a knowledge engineer are typically not needed or are minimal. The Domain Expert 101 uses the terminal 18 to enter the rules and procedures (expert knowledge) he has found effective in diagnosing the network 5. The User Interface 104 facilitates this data entry by providing an interactive user-friendly interface as will be described in more detail under the heading "User Interface". As the User Interface Module 104 receives the data, it stores it in a data structure called the Expert Information Structure 111.

Network structural information is entered into ENDS 10 by the Network Configuration Module 108.

The Network Configuration Module 108 uses the Event Manager 117 (described below) to get configuration information from the Data Base Manager 30 within the Network Manager 24. The Network Configuration Module 108 stores a subset of the information in the Network Manager's Data Base Manager 30 in a data structure called the Network Structural Knowledge Base 110. Since the Network Manager 24 can be called upon to retrieve more detailed information if required, the Network Structure Knowledge Base 110 can be less detailed than the Network Manager's Data Base Manager 30. In alternate embodiments, it may be eliminated altogether in favor of the Network Manager's Data Base Manager 30 (e.g. in a hybrid network manager-/Expert System embodiment). The Network Configuration Module 108 also uses the Data Base Manager 30 of Network Manager 24 to update the Network Structural Knowledge Base 110 while the ENDS 10 is performing diagnostic functions.

Once the Network Structure Knowledge Base 110 has been initialized the operator 128 can use the User Interface 104 to instruct ENDS 10 to perform network diagnostics. The Controller 112 schedules the various ENDS 10 modules. It first invokes the Event Manager 117 to handle communication of "events" between the Network Manager 24 and ENDS 10. All communication between the ENDS 10 and the Network 5 are handled as events.

Upon receiving one of the first three types of events described above (configuration, alarm or result) the Event Manager 117 decodes the event to determine the type of event and attributes such as the sending object, identification number and time received by the Network Manager 24. The Event Manager 117 places these attributes in data structures called records as previously described. Next, the Event Manager adds records with network configuration information to a Configuration Queue 113 associated with Event Manager 117. Records with alarm information are added to an Alarm Queue 114 associated with Event Manager 117. Records with test result information are added to a Response Queue 116 associated with Event Manager 117.

Upon receiving a request for a diagnostic test from the Network Manager 24, the Event Manager 117 encodes the test request into a request event understandable by the Network Manager 24 and sends the event via communication line 22 to the Network Manager 24.

The Controller 112 invokes the Alarm Filter 118. The Alarm Filter 118 takes alarm records from the Alarm Queue 114 and determines whether or not the alarms are redundant. If so, the Alarm Filter 118 deletes the redundant alarms. The Alarm Filter adds records corresponding to non-redundant alarms to a global data structure called the Bulletin Board 120.

The Controller 112 then selects the next goal on the Bulletin Board 120 to be processed. Controller 112 makes this determination based on three factors: status (whether the goal is ready to be processed), priority number and the amount of time since the alarm was received by the ENDS 10.

The Domain Expert 101 may determine whether the time factor should operate such that the more recently received goals take priority or whether the least recently received goals take priority. The priority number is assigned by the Domain Expert 101 according to his experience. For example, a lost power alarm from a central multiplexer such as 74 would likely have a higher priority than a high error rate alarm from a point to point connection modem such as 50. Similarly, priority numbers can relate to the physical location of the device. In general, devices located closer to the central site are often more likely to be of higher importance than at remote sites. In FIG. 1, for example, an alarm from modem 58 should be given a higher priority number, in general, than a similar alarm from modem 62 since a failure at modem 58 would disrupt communications to three terminals whereas a failure at modem 62 would be more likely to only affect terminal 64. Of course, critical paths of communication, as in military environments, can be assigned higher priority than less critical communications links. Those skilled in the art will appreciate that numerous criteria can be used to establishes priority numbers including the experience of the Domain Expert 101, business considerations, security considerations or system policies.

In a similar manner, certain alarms may be best handled as most recent having higher priority while other alarms may be best handled as least recent having higher priority. For example, an alarm relating to error rate may be due to a transient phenomenon and older goals may well be discarded altogether or at least given lower priority than more recently received goals. On the other hand, alarms relating to a line failure may be best handled in the order received. Such decisions are preferably left up to the Domain Expert 101.

The Controller 112 invokes the Inference Engine 122 to process the selected goal in the Bulletin Board 120. The Inference Engine 122 processes the goal by using information from the associated Alarm Record, the Expert Information Structure 111 and the Network Structural Knowledge Base 110 to determine the malfunction which caused the alarm associated with the goal and to remedy the malfunction. If the Inference Engine 122 determines that it needs more information to process the goal, it requests it through the Network Test Manager 124 described below.

The Inference Engine 122 uses the information in the alarm record and the Network Structural Knowledge Base 110 to determine which Expert Knowledge Source applies to the alarm. This may be done using a look-up table maintained in the ENDS 10. As the Inference Engine 122 applies the Expert Knowledge Source, it constructs a tree below the goal node on the Bulletin Board to keep track of what it has done so far in a process which will be referred to as "instantiation" and described later in more detail under the heading "Inference Engine" In so doing, if it determines that it needs more information to complete the reasoning, it can suspend the reasoning and later resume where it left off. If it determines that some action should be taken either to determine or remedy the problem, it sends a request for information to the Network Test Manager 124. The Inference Engine 122 relinquishes control upon determining that it needs more information to diagnose or remedy the problem, or upon exhausting the expert knowledge that apply to the alarm.

The Network Test Manager 124 is called from the Inference Engine 122 with a request for information. The invention takes different action depending upon whether it is operating in manual, semi-automatic or automatic modes. If the invention is operating in a manual mode, the Network Test Module prints a query to the terminal 18 and returns the user's 128's response. If the invention is in an automatic mode, the module sends the request to the Event Manager 117, which in turn sends the request to the Network Manager 24. The Network Manager 24 then obtains the result and forwards the result to the Response Queue 116 where it can De retrieved by the Event Manager. In the semi-auto mode the choice of which of the above actions to take depends upon the nature of the test required as described previously in the preferred embodiment.

Finally, the Controller 112 invokes the Network Configuration Module 108 to update the Network Structural Knowledge Base 110 if it has been changed since the last time this module ran, as explained above.

User Interface

1. High Level Menu and Overview

Figure 5:
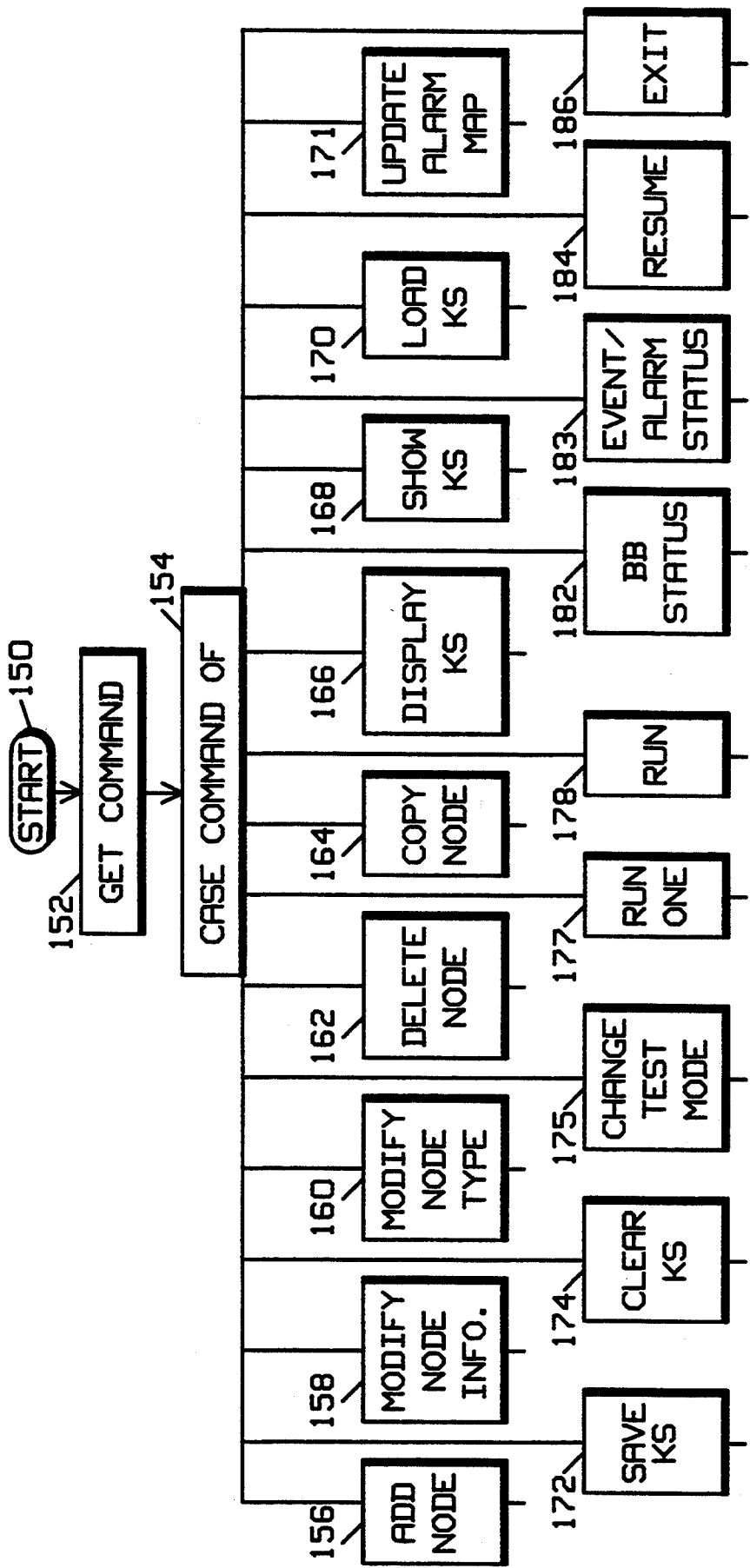
FIG. 5 shows a flow-chart of the operation of the User Interface Module 104.

Turning now to FIG. 5, a flow-chart illustrates the high-level operation of the User Interface Module 104. As discussed previously, the module has two distinct purposes: Expert Knowledge Acquisition and System Operation. FIGS. 6 through 16 show the operation of the Expert Knowledge Acquisition functions. FIGS. 17 through 22 show the operation of the System Operation functions. The bottom blocks 156 through 186 of FIG. 5 should be considered procedure labels which are carried over to FIGS. 6–22. In operation, the procedures are shown as menu selections which may be selected by using a pointing device such as a mouse. Other methods of human interface may also be used including direct entry of commands corresponding to the various procedures, as will be appreciated by those skilled in the art. Each of the menu selections (procedures) are discussed briefly below and in more detail immediately following.

ADD NODE 156: Used in the Knowledge Acquisition process by the Domain Expert 101 to add a knowledge node to the Expert Information Structure 111.

MODIFY NODE INFORMATION 158: Used in the Knowledge Acquisition process by the Domain Expert 101 to change the information in an already established knowledge node.

MODIFY NODE TYPE 160: Used in the Knowledge Acquisition process by the Domain Expert 101 to change the knowledge node type.

DELETE NODE 162: Used in the Knowledge Acquisition process by the Domain Expert 101 to remove an already established knowledge node.

COPY NODE 164: Used in the Knowledge Acquisition process by the Domain Expert 101 to produce a new knowledge node which is a copy of an existing knowledge node in order to simplify adding similar knowledge nodes to the Expert Information Structure 111.

DISPLAY KNOWLEDGE SOURCE 166: Used in the Knowledge Acquisition process by the Domain Expert 101 to produce a graphic display of a currently existing (or currently being built) Knowledge Source.

SHOW KNOWLEDGE SOURCE 168: Used in the Knowledge Acquisition process by the Domain Expert 101 to produce a text display of a currently existing (or currently being built) Knowledge Source.

LOAD KNOWLEDGE SOURCE 170: Used in the Knowledge Acquisition process by the Domain Expert 101 to retrieve a saved Knowledge Source from disk storage and load it into working memory.

UPDATE ALARM MAP: Used by the Domain Expert 101 in the Knowledge Acquisition process to update a map (table stored in 109) relating alarms to knowledge sources.

SAVE KNOWLEDGE SOURCE 172: Used in the Knowledge Acquisition process by the Domain Expert 101 to save a Knowledge Source to a disk file.

CLEAR KNOWLEDGE SOURCE 174: Used in the Knowledge Acquisition process by the Domain Expert 101 to remove a Knowledge Source from working memory.

CHANGE TEST MODE 175: Used by the System Operator 128 in the System Operation process to select automatic, semi-automatic or manual operation of the Expert System 10.

RUN ONE 177: Used by the System Operator 128 in the System Operation process to invoke the Expert System 10 for a single goal only.

RUN 178: Used by the System Operator 128 in the System Operation process to invoke the Expert System 10.

BULLETIN BOARD STATUS 182: Used by the System Operator 128 in the System Operation process to write the status of each goal on the Bulletin Board 120 to a screen window.

EVENT/ALARM STATUS 183: Used by the System Operator 128 in the System Operation process to write the status of each alarm and event on the Bulletin Board 120 to a screen window. Similar in operation to BULLETIN BOARD STATUS 182 except that different information is displayed in a screen window and therefore not discussed in detail.

RESUME 184: Used by the System Operator 128 in the System Operation process to continue processing a paused goal.

EXIT 186: Used by the System Operator 128 in the System Operation process or the Domain Expert 101 in the knowledge Acquisition process to exit the Expert System operation.

The Domain Expert 101 uses the knowledge acquisition functions to enter, modify and display information in the Expert Information Structure 111. The Expert Information Structure 111 is explained in detail below, but essentially it comprises a number of Expert Knowledge Sources, one associated with each possible type of alarm and tracked in a table. Each knowledge source in turn includes a number of data structures called "knowledge nodes" or "nodes". Each type of knowledge node has a set of attributes associated with it to store characteristics of the node knowledge such as its name, its type, and the nodes to which it points. The Domain Expert 101 defines a knowledge node by assigning values to its attributes.

The program flow for User Interface Module 104 begins at start block 150. Block 152 determines which function the Domain Expert 101 wants to invoke by reading selections made by the Domain Expert 101 selected from a menu, preferably using a pointing device. Block 154 corresponds to a "case" command and selects the next block based on the selection of the Domain Expert 101: Add Node 156, Modify Node Information 158, Modify Node Type 160, Delete Node 162, Copy Node 164, Display Knowledge Source 166, Show Knowledge Source 168, Load Knowledge Source 170, Save Knowledge Source 172, Clear Knowledge Source 174, Change Test Mode 175, Run One 177, Run 178, Bulletin Board Status 182, Resume 184, Exit 186, event-/alarm status 183, and update Alarm Map 171. Based on the Domain Expert's selection, program control flows to one of the procedures described by the flow-charts of FIGS. 6 through 22.

2. Expert Knowledge Acquisition

The process of acquiring the Expert Knowledge is described in detail in conjunction with the flow-charts of FIGS. 6–16.

Figure 6:
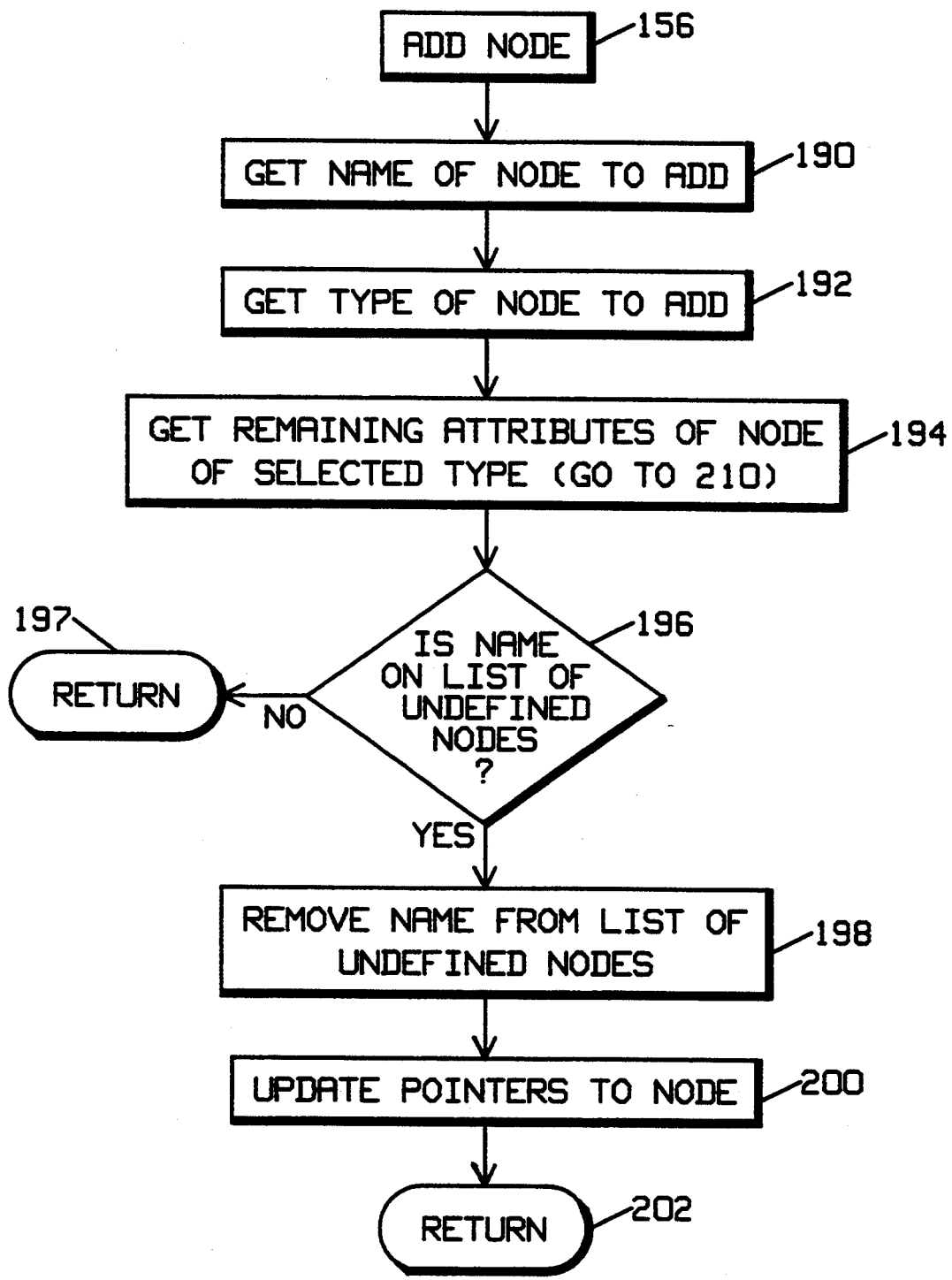
FIG. 6 shows a flow-chart of the operation of procedure Add Node.

The flow-chart in FIG. 6 illustrates User Interface 104 operation after selection of the Add Node procedure 156. Block 190 gets the name of the knowledge node that the Domain Expert 101 wants to add. It does so by, for example, allowing the user to type a name or to select one of the nodes on the list of nodes which are referred to by other nodes but not yet defined (the list of undefined nodes) using the terminal's cursor or a pointing device such as a mouse. Block 190 would preferably only accept typed names if there were no existing defined nodes by that name using conventional error trapping techniques. Next, 192 gets the type of node the Domain Expert 101 wants to add. One way it could do so is by displaying a list of the node types and allowing him to select one. Other techniques will occur to those skilled in the art. Block 194 calls a function to get the remaining attributes (those other than name and type) of the node being added. The function prompts the user for the remaining attributes of a node of the selected type which the user enters by conventional means.

In the preferred embodiment, this is done by presenting the Domain Expert 101 with a template of node attributes to be filled in. Since different node types require different sets of attributes, different templates may be presented for different node types. Using Object-Oriented Programming, such individual templates may inherit appropriate attributes from a generic template.

To help ensure the integrity of the knowledge source, two stacks are maintained which may be displayed to the Domain Expert 101 whenever Add Node 156 is selected. The first stack shows the node names for nodes which already exist. The second stack shows the node names for nodes which are pointed to by existing (defined) nodes but which have not yet been defined themselves. In this manner, the Domain Expert 101 always has easy reference to nodes which must be defined.

When Add Node procedure 156 is selected, the Domain Expert 101 is presented with a list of node types at 192 for the Domain Expert to select from among. Valid node types for HYPOTHESIS TREE nodes in the present embodiment are: KS node, AND node and OR node. KS nodes (knowledge sources nodes) are OR nodes which are the first node of a knowledge source and serve to identify the knowledge source. AND nodes are satisfied when all children of the node are satisfied while OR nodes are satisfied when any one of the node's children is satisfied as would be expected applying convention rules of logic. Other types of nodes may be defined in other embodiments.

For flow chart type nodes, valid node types in the present embodiment are: TEST node, CONCLUDE node, CALL node, CONFIRM node, FACT node, COUNT node, and DELAY node. Other types of nodes may be defined in other embodiments.

TEST nodes are nodes which require a test to be performed by the user or network manager 24 to obtain information for the Expert System 10. All nodes subsequent to a test node depend upon the outcome of the test node.

CONCLUDE nodes are nodes which generally terminate a flow-chart and provide a solution to the lowest level hypothesis for which the current flow-chart is a leaf.

CALL nodes are nodes which point to HYPOTHESIS TREE nodes in other branches of the HYPOTHESIS TREE and are useful to reduce need for redundant portions of HYPOTHESIS TREES. Thus, in addition to hypothesis tree nodes leading to flow-chart nodes in the present invention, flow-chart nodes may also lead to hypothesis tree nodes.

CONFIRM nodes are nodes which return conclusion values to the lowest level hypothesis node which leads to the flow-chart, that is, they provide the solution to the hypothesis.

FACT nodes are nodes which simply print or display a fact when instantiated.

COUNT nodes are nodes which increment (or decrement) a counter each time the COUNT node is instantiated.

DELAY nodes are nodes which impose a delay period selected by the Domain Expert 101 each time the node is instantiated.

The function of block 194 is illustrated by the flow-chart in FIG. 7 and is described below in more detail. Control then passes to block 196 which determines whether the name of the node is on the list (stack) of undefined nodes. If not, 197 returns control to the User Interface 104. Otherwise, 198 removes the name from the list of undefined nodes. Block 200 then updates all pointers to this node. The pointers are updated by finding all the defined nodes which have attributes pointing to this node and setting those attributes to the address of the current node. Finally, 202 transfers control back to step 152 of FIG. 5.

Figure 7:
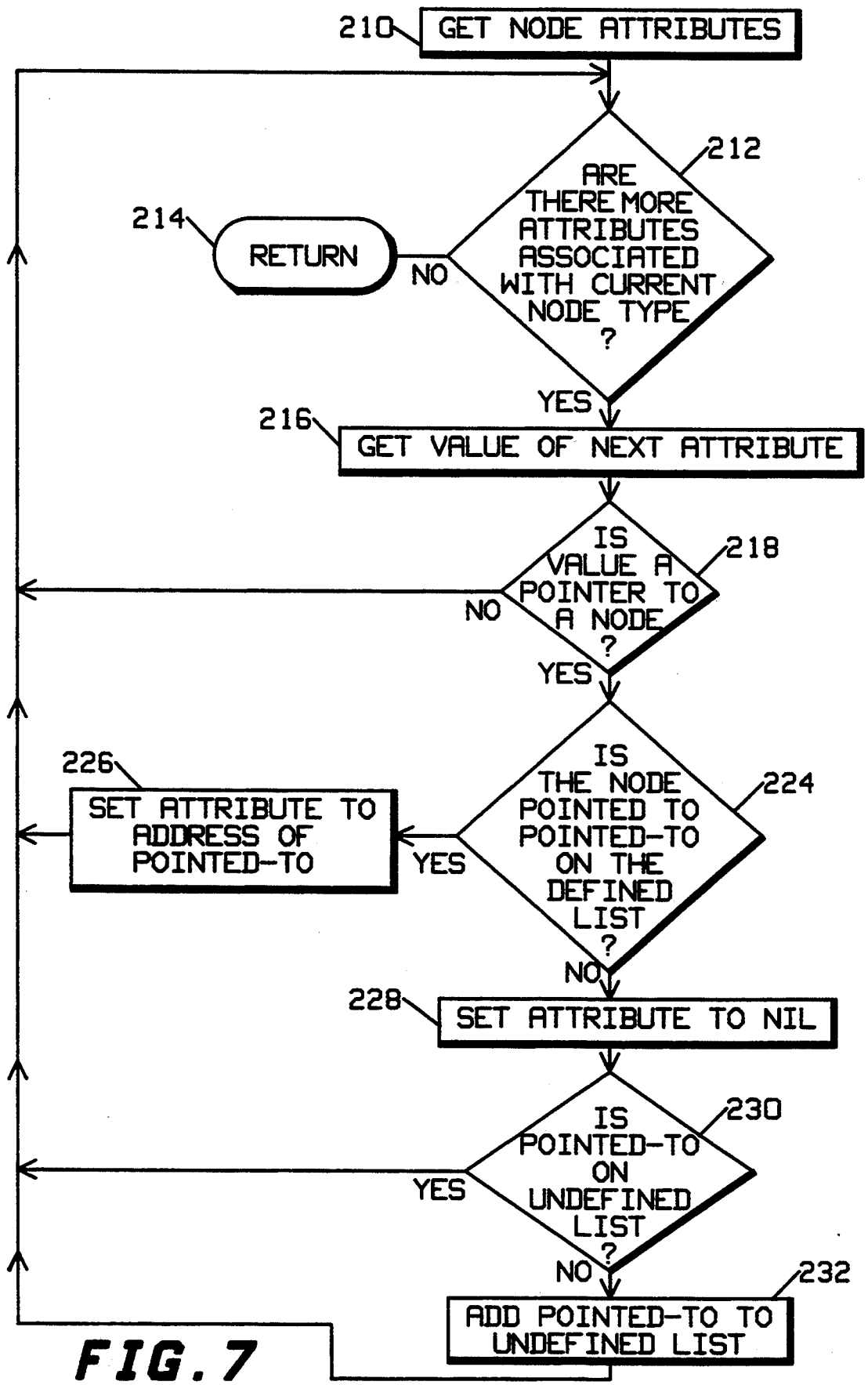
FIG. 7 shows a flow-chart of the operation of procedure Get Node Attributes.

The flow-chart in FIG. 7 illustrates now the Knowledge Acquisition module 104 assigns attributes to a knowledge node. Block 212 determines whether there are more attributes of the current node type to assign. If not, 214 returns control to the function which called it. Otherwise, 216 gets the value of the next attribute from the Domain Expert 101 by, for example, displaying the name of the attribute and allowing the Domain Expert 101 to type in the value at terminal 18. Block 218 then determines whether the value is a pointer to another node. If not, control returns to 212. Otherwise, 224 determines whether the node pointed to (called "pointed-to") has been previously defined by checking the list of defined nodes. If so, 226 sets the attribute to the address of the "pointed-to" node and control goes to 212. Otherwise, 228 sets the value of the attribute to nil. Block 230 then determines whether the "pointed-to" node is on the list of undefined nodes. If so, control returns to 212. Otherwise, 232 adds "pointed-to" to the list of undefined nodes and control returns to 212. The process proceeds as described above until a no answer is received at step 2 12 after which control passes back to the procedure that called it.

The flow-chart in FIG. 8 illustrates User Interface 104 operation after selection of Modify Node Information 158. First, 266 gets the name of the knowledge node the Domain Expert 101 wants to modify. It does so by, for example, displaying a list of the names of the defined nodes and allowing the Domain Expert 101 to select one. Control then passes to Block 267 where the type of node is determined by the previously defined or existing node type. Block 268 then retrieves the remaining attributes of the node by invoking the Add Node procedure 210 to allow the Domain Expert 101 to change any of the attributes except the node name and type. Ideally, the default values of the attributes are the original values. This process is illustrated by FIG. 7 and explained above. Finally, 270 returns control to the User Interface by transferring control back to step 152 of FIG. 5.

The flow-chart in FIG. 9 illustrates User Interface 104 operation after selection of Modify Node Type procedure 160. A separate procedure for modifying the knowledge node type is provided and not integrated with the Modify Node Information procedure 158 in the preferred embodiment. At step 284 the procedure gets the name of the node to change the type of from the Domain Expert 101. As before, for example, it might display a list of the names of defined nodes and allow the Domain Expert 101 to select one. Control then passes to step 288 which gets the new node type from the Domain Expert 101. It could do this by, for example, displaying a list of the node types and allowing the Domain Expert 101 to select one. Control then goes to step 294 which calls the Get Node Attributes procedure 210 to get the attributes (other than name and type) of the node from the Domain Expert 101. Finally, 296 transfers control to the main User Interface program at step 152.

The flow-chart in FIG. 10 illustrates User Interface 104 operation after selection of Delete Node procedure 162. First, 310 gets the name of the knowledge node to delete from the Domain Expert 101 by, for example, displaying the names of defined nodes and allowing him to select one. Second, 318 removes the name chosen from the list of defined knowledge nodes. A verification process may be included in this step to help assure that nodes are not accidentally deleted. Block 320 then determines whether any attributes of the other nodes point to the node. If not, 332 returns control to the User Interface 104. Otherwise, 324 deletes all such attributes to ensure that no nodes point to the deleted node. Finally, 328 transfers control to 152.

Figure 11:
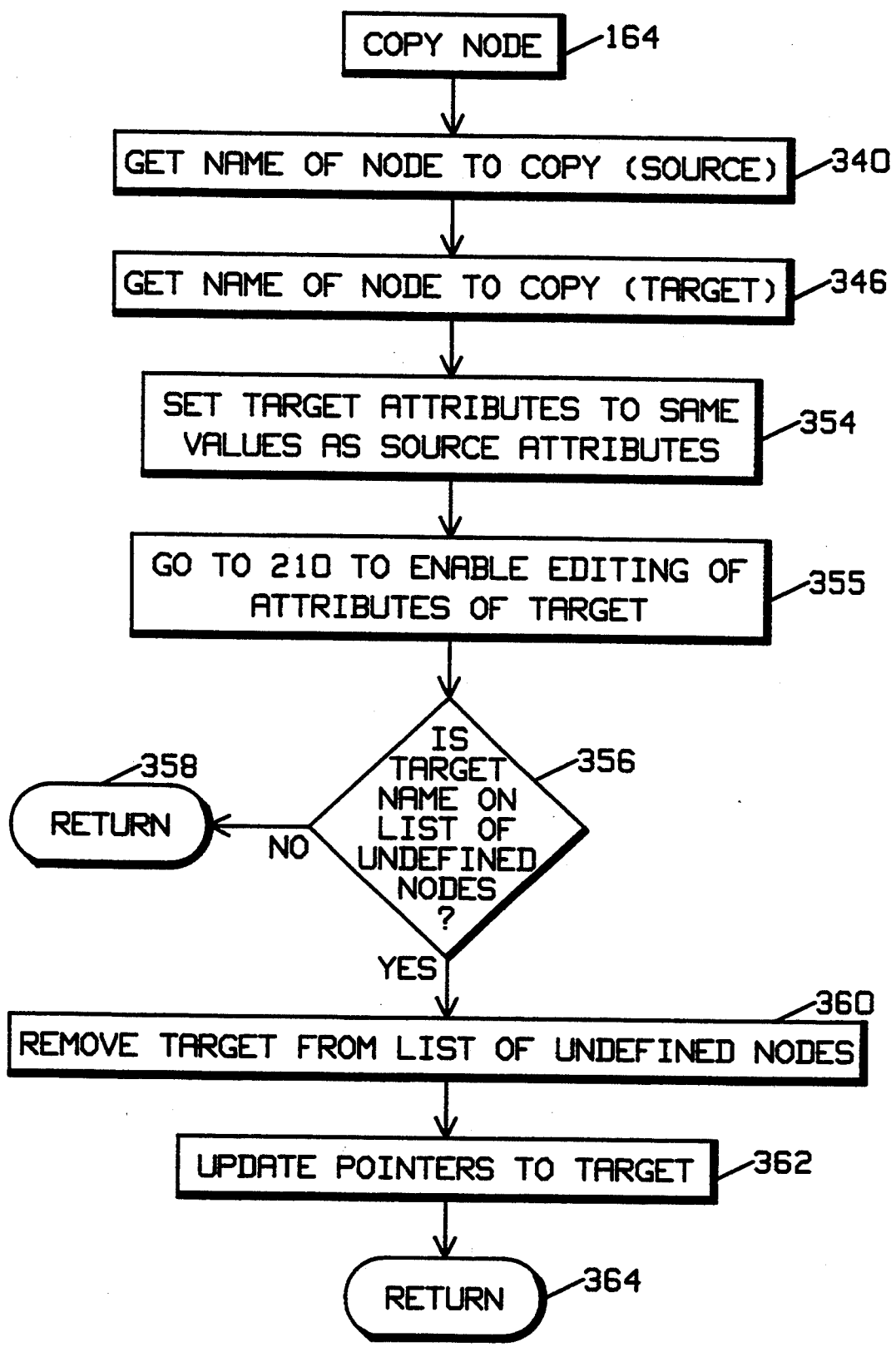
FIG. 11 shows a flow-chart of the operation of procedure Copy Node.

The flow-chart in FIG. 11 illustrates User Interface 104 operation after selection of Copy Node procedure 164. First, block 340 gets from the Domain Expert 101 the name of the knowledge node to copy (called the source) by, for example, displaying a list of the defined nodes and allowing him to select one. Second, 346 gets from the Domain Expert 101 the name of the node to which the information will be copied (called the target). It might do this by requesting the Domain Expert 101 to type a name, and accepting the name if there are no existing defined nodes by that name. Third, 354 sets the values of the target attributes to the values of the corresponding source attributes. Fourth, 355 calls the get node attributes function 210 to enable the Domain Expert 101 to change the attributes of the target (except node type). Block 356 then determines whether the name is on the list of undefined nodes. If not, 358 transfers control to step 152 of FIG. 5. Otherwise, 360 removes the name of the target from a stack list maintained by the system which keeps track of all undefined nodes (the undefined stack list). Block 362 then updates the pointers to the target. It does so by finding all the defined nodes which have attributes pointing to the target and setting those attributes to the address of it. Finally, 364 transfers control to step 152 of FIG. 5.

This Copy Node procedure 164 is designed to facilitate data entry by allowing easy entry of data for new nodes by in effect duplicating existing nodes. The attributes differing from the node being duplicated may then be modified since the procedure automatically calls the Get Node Attributes routine 210. Other such procedures for simplifying data entry when creating nodes will occur to those skilled in the art.

Figure 12:
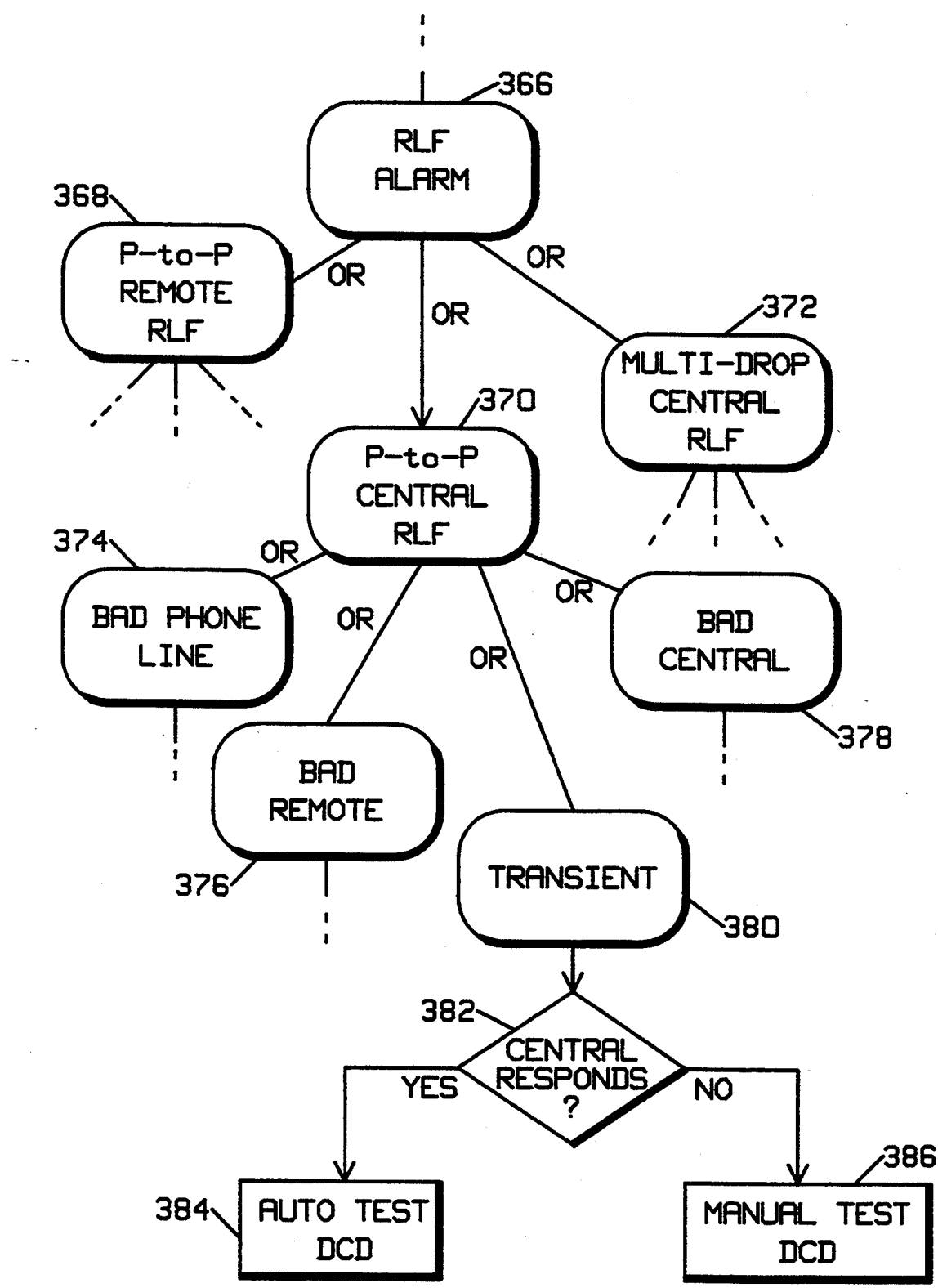
FIG. 12 shows an example of the results of procedure Display Knowledge Source.

The User Interface provides two mechanisms for displaying the knowledge source: Display Knowledge Source procedure 166 and Show Knowledge Source procedure 168. Selection of Display Knowledge Source 166, the User Interface 104 presents a graphical representation of the Expert Information Structure 111 while selection of Show Knowledge source 168 provides a text output of the defined nodes. In the Display Knowledge Source procedure 166, the system displays, for example, a diagram such as that in FIG. 12. The circles (shown as ovals in the figure) represent nodes. Text inside of or adjacent to the nodes are used to identify the node or operation being displayed. In the example of FIG. 12, the display shows a receive line failure (RLF) for the example network of FIG. 1 with the associated nodes. The diagram shows nodes as ovals with the node names written in the ovals. The nodes pointed to by a node are drawn below the node and connected to it with a line with a link name associated with it. In other embodiments, the node names may be used to represent the nodes with lines interconnecting the names (i.e. no circles representing nodes). Similarly, the display may flow left to right, etc., rather than top to bottom and information may be in symbolic or abbreviated form as required.

The circle 366 represents the alarm node associated with the knowledge base. The text in the circle is the name of the node. Node 366 points to nodes 368, 370 and 372 which represent three possible causes of the alarm. The lines connecting the nodes are indicated as OR links indicating that any of these nodes alone could result in the RLF Alarm 366.

For example, the node drawn as 366 is an OR node named "RLF Alarm" (RLF stands for Remote Line Failure) and written inside. The node is an OR node, meaning that its truth value is true if at least one of the nodes to which it points is true. It points to nodes named p-to-p-remote-rlf, p-to-p-central-rlf and multidrop-central-rlf. These are represented as 368, 370 and 372.

Each of the nodes 368, 370 and 372 may be further broken down into other OR or AND links as shown in connection with node 370. Node 370 includes four nodes below it which are shown as OR functions meaning that node 370 is true if any one of these four nodes is true, namely: bad phone line node 374, bad remote 376, bad central 378 or transient phenomenon 380. Each of these four nodes may point to other nodes or processes as illustrated by node 380 which points to a short process represented as a flow-chart. This flow-chart first determines if the central modem responds at 382 and if so, an automatic test of DCD (Data Carrier Detect) is performed at 384. If not a manual test of DCD is indicated by step 386.

Display Knowledge Source procedure 166 may be implemented in a conventional manner using the standard drawing tools commercially available in the Expert System Programming Environment 16 such as those in Carnegie Group's Knowledge Craft ™ product or using known CAD (computer aided drafting techniques). The information for creating such a display is readily available from the knowledge base 109 which has information relating each of the nodes to each other as well as the attributes of each node. This display capability provides the user or expert an easily grasped representation of what procedure is indicated by a particular alarm.

Figure 13:
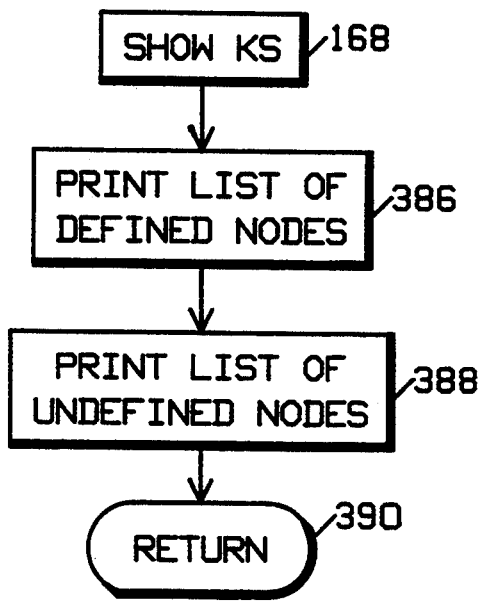
FIG. 13 shows a flow-chart of the operation of procedure Show Knowledge Source.

The flow-chart in FIG. 13 illustrates User Interface 104 operation after selection of the Show Knowledge Source procedure 166. Block 386 prints the list of defined knowledge nodes of the currently loaded knowledge source to the terminal's display 18 (or to the printer 20). Block 388 then similarly prints the list of undefined nodes, that is, nodes which have been referred to but which have not yet been defined. Finally, 390 transfers control back to step 152 of FIG. 5.

Figure 14:
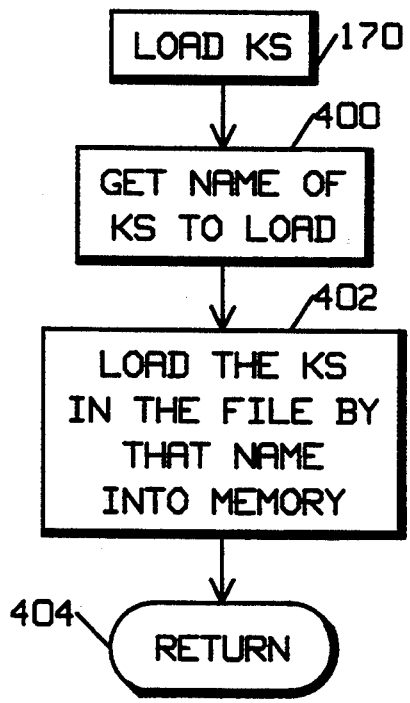
FIG. 14 shows a flow-chart of the operation of procedure Load Knowledge Source.

The flow-chart in FIG. 14 illustrates User Interface 104 operation after selection of the Load Knowledge Source procedure 170. First, step 400 gets the name of the knowledge source to load. It might do so by, for example, displaying a list of knowledge sources and allowing the Domain Expert 101 to choose one. Next, 402 loads the selected knowledge source into memory. Finally, 404 transfers control back to 152 of FIG. 5.

The procedure Update Alarm Map 171 is used by the Domain Expert 101 to update a map or table relating alarm type to knowledge sources. The present invention may use several knowledge sources broken up as the Domain Expert 101 sees fit. In order to process an alarm, the alarm is first related to an appropriate knowledge source by reference to this table. When the Domain Expert 101 wishes to add a new alarm or knowledge source, he updates this table to properly relate the alarm with the appropriate knowledge source. The table may be updated using conventional table update methods.

Figure 15:
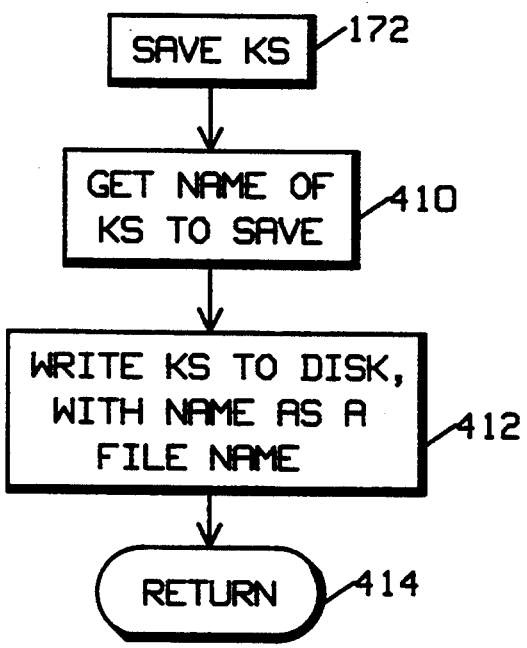
FIG. 15 shows a flow-chart of the operation of procedure Save Knowledge Source.

The flow-chart in FIG. 15 illustrates User Interface 104 operation after selection of the Save Knowledge Source procedure 172. First, block 410 gets the name of the knowledge source to save by allowing the Domain Expert 101 to type a file name. Next, 412 writes the knowledge source, list of defined nodes and list of undefined nodes to a file with that name. Finally, 414 returns control to the User Interface 104 at step 152.

Figure 16:
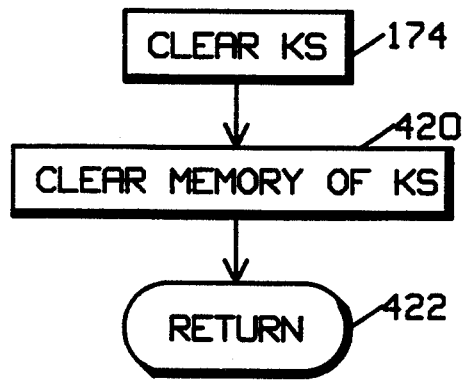
FIG. 16 shows a flow-chart of the operation of procedure Clear Knowledge Source.

The flow-chart in FIG. 16 illustrates User Interface 104 operation after selection of Clear Knowledge Source 174. Block 420 clears the current knowledge source from memory, and 422 transfers control to 152.

3. System Operation

FIGS. 17 through 22 illustrate the operation of the system operation functions of the User Interface 104. The Operator 128 uses the system operation functions to set the operation of the ENDS 10 to manual, semi-automatic or automatic mode, run ENDS, display the Bulletin Board 120, resume inferencing paused goals and exit ENDS 10.

Figure 17:
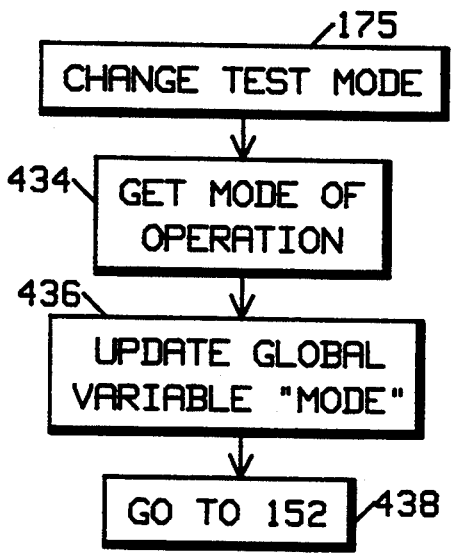
FIG. 17 shows a flow-chart of the operation of procedure Change Test Mode.

The flow-chart in FIG. 17 illustrates User Interface 104 operation after selection of the Change Test Mode procedure 175. First, block 434 gets the mode of operation by allowing the Domain Expert 101 to select from manual, automatic or semi-automatic. The nature of the three modes has been explained previously. At step 436, a global variable called "mode" is updated to reflect the selection made in step 434. Finally, 438 returns control to the User Interface 104 at step 152 of FIG. 5.

Figure 18:
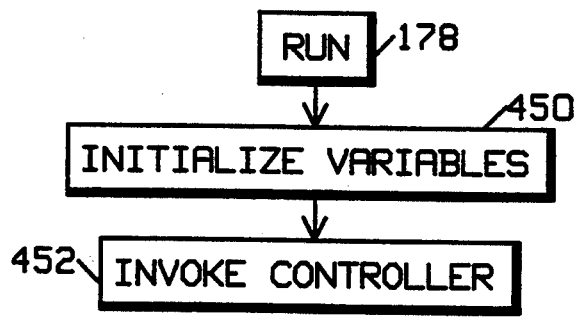
FIG. 18 shows a flow-chart of the operation of procedure Run.

FIG. 18 illustrates the operation of the User Interface 104 after selection of Run 178. Block 450 initializes the structures and variables used during operation of the system. Block 452 then invokes the Controller 112, which schedules the modules of the system as illustrated in FIG. 2. The operation of the Controller 112 is described in a later section.

Figure 19:
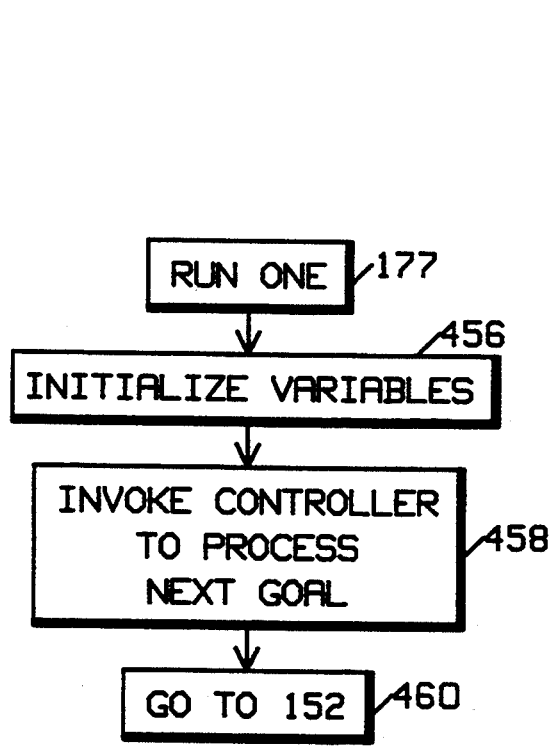
FIG. 19 shows a flow-chart of the operation of procedure Run one which runs the ENDS 10 for one goal only.

FIG. 19 illustrates the operation of the User Interface 104 after selection of Run One 177. Block 456 initializes the structures and variables used during operation of the system. Block 458 then invokes the Controller to process the next goal only. Finally, 460 transfers control to step 152 of FIG. 5.

Figure 20:
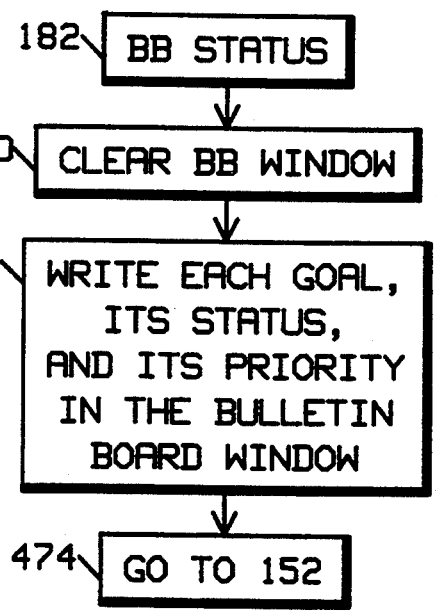
FIG. 20 shows a flow-chart of the operation of procedure Bulletin Board Status which shows the status of the Bulletin Board 120.

FIG. 20 illustrates the operation of the User Interface 104 after selection of the Display Bulletin Board Status procedure 182. First, 470 clears a display window set up on the screen for the Bulletin Board Display in a conventional manner. Next, 472 writes the name of each goal on the Bulletin Board 120 along with its status and priority. Goal status and priority are attributes associated with the goal which are used to determine the order of processing the particular goal as explained previously. Block 474 then transfers control to step 152 of FIG. 5.

FIG. 21 illustrates the operation of the User Interface 104 after selection of the Resume procedure 184. This procedure is used to resume operation on a goal which has been paused. A goal is assigned one of several status states (as was described in more detail in connection with FIG. 4) including "posted" indicating that the goal is ready to run, "active" when the goal is actually being processed, "paused" when the goal has been paused by the user in manual or semi-automatic mode, and "suspended" when the goal has been running but has been temporarily stopped by the system in automatic or semi-automatic mode as when, for example, further information is required to complete processing a goal. A typical example is when a test, such as a loop-back test must be performed in order to proceed with processing the goal tree. While this test is being performed, the goal is placed in the suspended status. While the goal is suspended, the ENDS 10 retrieves the next goal from the Bulletin Board 120 for processing so that the system does not have to operate in a completely sequential manner. A goal may of course also be assigned a status of "paused" in manual mode as described in conjunction with FIG. 4. Operation of the Resume procedure 184 resumes processing of the paused goal.

When the Resume process 184 is invoked, block 490 first gets the name of the goal to resume. It does so by, for example, listing all paused goals and allowing the user to select one. Second, 492 changes the status of the selected goal to "posted", to indicate that it is ready to run. When the Inference Engine 122 is available and the resumed 'goal' is next in line for processing, processing will resume where it left off. Note that if a higher priority goal is on the Bulletin Board 120, it will be processed first even though the 'resumed' goal was interrupted. This is because that the goal is resumed by placing it back in the normal queue for processing. A marker is associated with the 'resumed' goal at the time it is "paused" so that the place where processing is to resume is readily determined by the Inference Engine 122. Finally, 494 transfers control to step 152 of FIG. 5.

FIG. 22 illustrates the operation of the User Interface 104 after selection of Exit 186. Block 510 writes all the data on the Bulletin Board 120 to a log file. The name of the file may be a default file name or may be individually selected by the user at the time of exiting. Block 512 then halts operation. To begin operation again, the user must invoke the Expert System 10 again.

4. Sample Session (Manual Mode)

In order to get a better idea of the operation of the system, the following Table 1 is a sample session conducted in the Manual Mode of operation. Operator input is shown in underlined normal text while output from the Expert System 10 is shown in bold.

TABLE 1

Sample Session

An RLF alarm has been received for CENTRAL modem on a MULTIDROP line.
This alarm may be caused by:
   -A Transient Condition,

TABLE 1-continued
Sample Session

-A mis-strapped Central unit,
-A defective diagnostics board.
Testing for a Transient alarm condition.
Are all devices on this line currently active?
    (yes or no) yes
Clear this alarm and monitor the system for 2 minutes.
Did the Alarm occur again?
    (yes or no) yes
The RLF Alarm is still present. Continuing diagnostics!
*Testing for an improperly strapped CENTRAL unit.
Does the CENTRAL unit have hardware straps?
    (yes or no) no
Begin checking CENTRAL unit's DCD strapping.
Is the CENTRAL unit strapped for constant DCD?
    (yes or no) Yes
A CENTRAL unit on a MULTIDROP line should always be strapped for SWITCHED DCD.
This CENTRAL unit is improperly strapped. Correct strapping.

Expert Information Structure

Because of the complexity of data communication network diagnostics, it may be easier to understand the Expert Information Structure 111 with an example from a more familiar subject. FIG. 23 therefore illustrates a block diagram of a possible use of the structure for an automobile diagnostic system. This example system includes three hypothetical diagnostic machines, each of which is connected to an automobile which is the diagnostic target for this example. Diagnostic Machine A 514 is connected to automobile A 516 via connection 517. Diagnostic Machine B 518 is connected to automobile B 520 via connection 522. Diagnostic Machine C 524 is connected to automobile C 526 via connection 528. Each of the three diagnostic machines is then connected to the Expert Auto Diagnostic System 530 via connections 532, 534 and 536 respectively which may, for example be wireless radio links in this hypothetical case. Each diagnostic machine monitors the operation of the car it is connected to and sends an alarm to the Expert Auto Diagnostic System 530 upon discovering a problem. This hypothetical network has similarities to the network diagnostic environment in that there are certain tests which should not be invoked automatically except when certain conditions prevail. For example, it might be dangerous to invoke certain brake tests or transmission tests at highway speeds without the driver's consent. A set of criteria could be developed for this example which would dictate the ability of the diagnostic system to automatically initiate tests. These hypothetical diagnostic machines are assumed to have the capability of performing tests on the car and correcting certain problems subject to such constraints.

Figure 24:
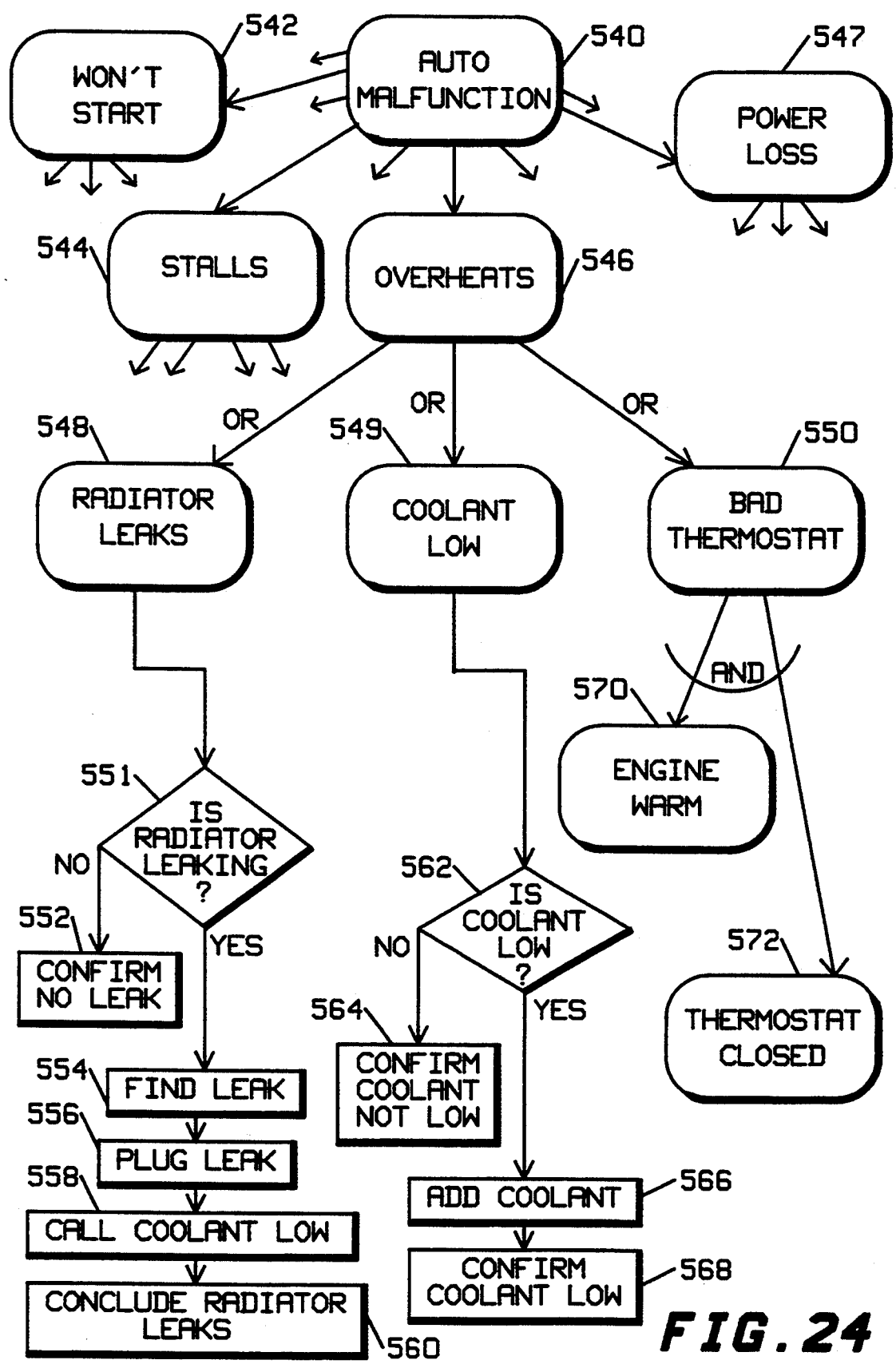
FIG. 24 shows a simplified Expert Information Structure for an automobile diagnostic system.

FIG. 24 shows an Expert Information Structure for the Expert Auto Diagnostic System 530. The information in the example is for instruction as to the operation of the expert information structure only. It should be noted that this is an overly simplified contrived example and is not necessarily an accurate diagnostic procedure for troubleshooting an automobile radiator. It is nonetheless an easier environment for many to grasp than that of a complex data communications environment and will thus be used herein for instructional purposes.

The User Interface organizes the nodes defined by the Domain Expert into a data structure called an Expert Information Structure, such as that pictured in FIG. 24. The structure combines the simplicity and efficiency of flow-chart based knowledge representation with the hierarchical organization of hypothesis tree-based knowledge representation.

The hypothesis tree is a hierarchical structure of hypotheses, each of which is associated with a symptom or possible failure. The structure is processed by using a process of elimination among hypotheses. The Domain Expert creates such an Expert Information Structure based upon his expert knowledge of the workings of the system to be diagnosed. The Domain Expert may start the process, for example, by isolating each different type of malfunction (alarm) which must be analyzed. Each of these alarms, or certain groups of such alarms, may lend themselves to creation of an individual knowledge sources. In FIG. 24, five such types of malfunction are shown (542, 544, 546, 547) explicitly and others suggested implicitly by the arrows leading from node 540. The Domain Expert may select any number of knowledge sources to construct so that the problem is broken down into a manageable size. He then constructs a hypothesis tree for each type of malfunction and proceeds to further divide the hypothesis into further hypothesis (e.g. 548, 549, 550) until a leaf in the hypothesis tree is reached. At he leaf, there may be questions to be answered or test procedures to be followed. The hypothesis tree then converts to a flow-chart format (e.g. 562 down, 551 down) in order to obtain the needed information. Such flow-chart operations may call other flow-charts or other hypothesis tree nodes in the same (or another) hypothesis tree in order to satisfy the hypothesis. This hybrid of the hypothesis tree and the flow-chart is referred to herein as the Expert Information Structure or the Structured Flow Graph. Each knowledge source so constructed is related to the particular type of alarm through a knowledge source table.

At the top of the tree of FIG. 24 is a root node 540 which is pointed to by no other knowledge nodes. The root node 540 points to nodes such as 542, 544, 546 and 547 representing all possible alarms. The latter nodes represent the high level hypotheses. These are confirmed or rejected by first decomposing them into "sub-hypothesis", which are represented by the knowledge nodes pointed to by each alarm. Each of these nodes in turn may point to nodes representing the sub-hypothesis which could have caused it. The pattern can continue until the hypotheses can be most easily confirmed or eliminated by the answer to a question asked by the user, the response to a test sent to the Network Test Manager or the application of deterministic, procedure-oriented testing processes which may include gathering information from the user or a device analogous to the Network Manager. Such processes are represented by flow-charts.

In other words, the root node 540 represents the most general malfunction: that there has been a malfunction. Leaves represent the more specific malfunctions. The system uses the structure for reasoning as follows. Upon receiving an alarm, the system processes the sub-tree having the node associated with the alarm as its root. The goal of the system is then to determine the nature of the problem and then to resolve the problem. Each alarm node points to the possible causes of the associated alarm. The system determines whether each cause occurred by determining whether the nodes that the node points to has occurred. This pattern continues through all branches and leaves of the tree. Whether a malfunction/resolution at the leaf level occurred is determined by carrying out the procedures in the flow-chart to which the leaf points.

In the example of FIG. 24, the Expert Information Structure has one root node 540 which points to knowledge nodes which represent every possible alarm (called alarm nodes). This node is automatically defined by the system when the domain expert defines the alarm nodes. The alarm nodes in the example are Won't Start 542, Stalls 544, Overheats 546 and Power Loss 547. Each alarm node in turn points to nodes representing the malfunctions which could have caused the alarm. In the example, Overheats 546 points to nodes representing all of the possible causes of an engine overheating. This example presumes that only three such possibilities exist as shown in FIG. 24. Radiator Leaks 548 represents a leaking radiator, Coolant Low 549 indicates that the radiator is low on coolant and Bad Thermostat 550 represents a malfunctioning thermostat.

Any one of these problems could cause a car to overheat. A Domain Expert therefore would use the User Interface to define overheats 546 as an OR node, which means that it occurred if at least one of the nodes it points to occurred. OR nodes have the following attributes: IS-A, NODE-ID, DUE-TO-CONDITIONS, YES-NODE, PRE-DESCRIPTION, QUERY, HAS-TEST, CONCLUSION-IF-TRUE, CONCLUSION-IF-FALSE, FORGET, and HELP.

The attributes YES-NODE, QUERY, HAS-TEST, FORGET and HELP have no purpose in an alarm node of the preferred embodiment and will be explained below. For all node types, the attribute IS-A contains the node type. All knowledge node types for the present embodiment have been previously discussed. For OR nodes, this will be "OR node". For all node types, NODE-ID contains the name of the node. For Overheat node 546, this would be "Overheats". DUE-TO-OR-NODE contains the names of the nodes from which the truth value of this node 546 is determined. In the example, Overheats 546 will be true if one of the nodes radiator-leaks 548, coolant-low 549, or bad-thermostat 550 occurred (in this example, we assume that these are the only possible causes of overheating). DUE-TO-CONDITIONS contains the node names in DUE-TO-OR-NODES, each followed by either "yes" or "no". The value after each node name indicates whether to consider that node to be true if the problem associated occurred ("yes") or did not occur ("no"). In the example, the attribute would contain "(radiator-leaks yes) (coolant-low yes) (bad-thermostat yes)" Therefore, the node 546 will be true if either radiator-leaks, or coolant-low or bad-thermostat nodes is true.

For all knowledge node types, PRE-DESCRIPTION contains the message to be printed upon reaching the node. PRE-DESCRIPTION enables the user to see what ENDS is doing, and assists the Domain expert in debugging. The PRE-DESCRIPTION in Overheats 546 could contain the message "Car overheated. Either the radiator leaks, the coolant is low or the thermostat is bad."

For all knowledge node types, CONCLUSION-IF-TRUE 562 contains the message to be printed upon determining that the node is true and CONCLUSION-IF-FALSE 566 contains the message to be printed upon determining that node 549 is false. One purpose of CONCLUSION-IF-TRUE and CONCLUSION-IF-FALSE is to enable the user to track the progress of ENDS and to assist the domain expert in debugging. Overheat probably would contain no message in CONCLUSION-IF-TRUE or CONCLUSION-IF-FALSE because the truth value of an alarm node is known.

For all knowledge node types, FORGET controls whether the node 546 will be processed if its truth value has already been determined. For example, if 546 were pointed to by more than one node, FORGET would determine whether ENDS would process 546 a second time to determine its value. The value of FORGET in Overheat 546 would be inconsequential because the node 546 is pointed to only once, by Overheats 546.

Table 2 below summarizes the attributes of the Overheats node 546:

TABLE 2

| ATTRIBUTES OF "OVERHEATS" | |
| --- | --- |
| IS-A | or node |
| NODE-ID | overheats |
| DUE-TO-OR-NODE | (radiator-leaks, coolant-low, bad-thermostat) |
| DUE-TO-CONDITIONS | (radiator-leaks yes) (coolant-low yes) (bad-thermostat yes) |
| YES-NODE | |
| PRE-DESCRIPTION or the | "Car overheated. Either the radiator leaks, the coolant is low thermostat is bad." |
| QUERY | |
| HAS-TEST | |
| CONCLUSION IF TRUE | |
| CONCLUSION IF FALSE | |
| FORGE | |
| HELP | |

The first knowledge node pointed to by Overheat 546 is Radiator-leaks 548. Because it points to no other knowledge tree node, it is a leaf node. Because all leaf nodes are OR nodes in this embodiment, the Domain Expert would use the User Interface to define Radiator-leaks as an OR node. He would set the attributes as follows. DUE-TO-OR-NODE and DUE-TO-CONDITIONS would be empty because the node 548 points to no other nodes. YES-NODE is the first node of the flow-chart to which a leaf node might point. Radiator-leaks 548 points to a flow-chart with procedures to determine whether the radiator leaks. If so, the procedures repair the leak and determines whether the radiator needs coolant. If so, the procedures add coolant. YES-NODE therefore contains Is-radiator-leaking, the first node in that flow-chart. PRE-DESCRIPTION might contain "Current hypothesis: radiator leaks". The attributes QUERY and HAS-TEST apply only to leaf nodes which do not point to flow-charts and will be explained below. CONCLUSION-IF-TRUE could contain "Radiator leak repaired". CONCLUSION-IF-FALSE would contain "Radiator was not leaking". The value of FORGET here would be inconsequential, because the node 548 is only called once.

The HELP attribute contains nothing in this case since the user is not prompted for a test result. If present, the HELP attribute can be used in a number of different ways as desired by the system designer. For example, the HELP attribute can be used as a pointer to or file name of a help file which contains information which is context sensitive. This help file may contain, for example, text or graphical assistance to the user or may place the user within a network map showing the network surrounding the location of an alarm so that the operator can get a better idea of what type of problems is being encountered and the ramifications of such problems to allow the operator to make better informed decisions regarding corrective actions. Those skilled in the art will appreciate that many possible implementations are possible for use of the HELP attribute.

The attributes of node 548 (radiator leaks) are summarized in Table 3 below.

TABLE 3
ATTRIBUTES OF "RADIATOR-LEAKS"

| | |
|---|---|
| IS-A | OR node |
| NODE-ID | radiator-leaks |
| DUE-TO-OR-NODE | |
| DUE-TO-CONDITIONS | |
| YES-NODE | is-radiator-leaking |
| PRE-DESCRIPTION | "Current hypothesis: radiator leaks." |
| QUERY | |
| HAS-TEST | |
| CONCLUSION IF TRUE | "radiator leak repaired" |
| CONCLUSION IF FALSE | "radiator was not leaking" |
| FORGET | |
| HELP | |

Radiator-leaks points to the flow-chart beginning with knowledge node Is-radiator-leaking 551. Is-radiator-leaking is a TEST node because the subsequent flow-chart instruction depends on the answer to a question sent to the user or the Diagnostic Machine. Test nodes have attributes IS-A, NODE-ID, YES-NODE, NO-NODE, HAS-TEST, PRE-DESCRIPTION, QUERY, CONCLUSION-IF-TRUE, CONCLUSION-IF-FALSE, FORGET and HELP. YES-NODE contains the name of the node to branch to if the answer to the question is yes. For Is-radiator-leaking, YES-NODE is Find-leak. NO-NODE contains the name of the node to branch to if the answer to the question is no. The FORGET attribute is used when the node may be pointed to during more than one analysis. IF the information obtained in the test is static there is no need, generally, to re-test and FORGET="no". If the information is more dynamic or volatile, then it should be re-tested whenever the test node is encountered an FORGET="yes".

For Is-radiator-leaking, NO-NODE is Confirm-no-leak. Table 4 below shows the attributes of is-radiator-leaking:

TABLE 4
ATTRIBUTES OF "IS-RADIATOR-LEAKING"

| | |
|---|---|
| IS-A | test-node |
| NODE-ID | is-radiator-leaking |
| YES-NODE | find-leak |
| NO-NODE | confirm-no-leak |
| QUERY | "is radiator leaking?" |
| HAS-TEST | |
| PRE-DESCRIPTION: | "check radiator!" |
| CONCLUSION-IF-TRUE: | "radiator is leaking" |
| CONCLUSION-IF-FALSE: | "'radiator is ok" |
| FORGET: | yes |
| HELP: for | "while car is running, look dripping coolant" |

HAS-TEST is the name of the test to send to the Diagnostic Machine if the system is operating in the automatic mode. Automatic mode and manual mode are explained below (see Inference Engine). For Is-radiator-leaking, HAS-TEST would be a test to physically check the radiator for leaks.

QUERY contains the question to print to the user if the system if operating in manual mode, explained below. The answer to the question will be the equivalent to the response to the HAS-TEST test.

CONCLUSION-IF-TRUE and CONCLUSION-IF-FALSE in Is-radiator leaking would contain appropriate messages to the user. Because Is-radiator-leaking is pointed to only by Radiator-leaks, FORGET would be inconsequential.

HELP contains the message to print if the user requests help while this node 551 is being processed. Help messages are therefore used only in nodes which have a QUERY. For Is-radiator-leaking, HELP could contain "While car is running, look for dripping coolant".

If the user or diagnostic computer returned "false" in response to being asked whether the radiator leaked, control would go to Confirm-no-leak 552, a CONFIRM node which returns the flow of control to Radiator-leaks 548 with a value of "false". CONFIRM nodes contain the following attributes: IS-A, NODE-ID, BRANCH-TO-AND-CONFIRM, NEXT-HYPOTHESIS, NODE-HAVING-HYPOTHESIS, and PRE-DESCRIPTION. BRANCH-TO-AND-CONFIRM contains the name of the node to return control and a truth value to. Normally this is the leaf node which called the flow-chart of which the confirm node is a member. For Confirm-no-leak, BRANCH-TO-AND-CONFIRM contains "Radiator-leaks no". This is illustrated in Table 5 below:

TABLE 5
ATTRIBUTES OF "CONFIRM-NO-LEAK"

| | |
|---|---|
| IS-A: | confirm node |
| NODE-ID: | confirm-no-leak |
| BRANCH-TO-AND-CONFIRM: | (radiator-leaks no) |
| NEXT-HYPOTHESIS: | |
| NODE-HAVING-HYPOTHESIS | |
| PRE-DESCRIPTION: | |

NEXT-HYPOTHESIS attribute allows the Domain Expert to change the hypothesis to the process following this knowledge node. By default, the system will continue processing the tree in the nodes in the order originally specified. The originally specified order is the order the Domain Expert listed the nodes in the DUE-TO-AND-NODE or DUE-TO-OR-NODE attribute of the node which points to them. If reaching the CONFIRM node means that certain information has been learned that would make a different processing order more effective, the Domain Expert can specify a new order here by listing the node names in the desired order of a group of nodes all pointed to by the node contained in NODE-HAVING-HYPOTHESIS. Reaching CONFIRM-NO-LEAK, would not indicate any reason to change the processing order. Accordingly, NEXT-HYPOTHESIS and NODE-HAVING-HYPOTHESIS would contain "nil".

If on the other hand the user or diagnostic computer returned "true" in response to being asked whether the radiator leaked, control would go to Find-leak 554, a TEST node which sends an instruction to the diagnostic machine (in automatic mode) or the user (in manual mode) to locate the leak. For Find-leak 554, HAS-TEST would contain the name of a function to send the diagnostic machine to locate the leak and QUERY would contain text instructing the user to locate the leak. Any value returned by the machine or user would be disregarded. Both YES-NODE and NO-NODE would contain Plug-leak.

Plug-leak 556 is a TEST-NODE which instructs the machine (in automatic mode) or the user (in manual mode) to repair the leak. The HAS-TEST attribute would be the name of a function to send to the the diagnostic machine instructing it to repair the leak. QUERY would contain an instruction to the user to repair the leak. Any response from the machine or user would be disregarded. YES-NODE and NO-NODE would contain "Call-coolant-low".

The Call-coolant-low node 558 calls the flow-chart pointed to by the leaf node coolant low 549, described below, to determine whether the radiator needs coolant, and, if so, to add coolant. A CALL node contains attributes: IS-A, NODE-ID, CALL-FUNCTION, FUNCTION-CONDITION, PRE-DESCRIPTION, CONCLUSION-IF-TRUE, CONCLUSION-IF-FALSE, YES-NODE, NO-NODE and FORGET. IS-A, NODE-ID, PRE-DESCRIPTION, CONCLUSION-IF-TRUE, CONCLUSION-IF-FALSE are described above. For Call-coolant-low, IS-A contains call-node, node-id contains call-coolant-low; PRE-DESCRIPTION, CONCLUSION-IF-TRUE and CONCLUSION-IF-FALSE contain appropriate messages; and forget and help contain nil. Table 6 below summarizes the attributes of this node:

TABLE 6
ATTRIBUTES OF "CALL-COOLANT-LOW"

| | |
|---|---|
| IS-A | call-node |
| NODE-ID | call-coolant-low |
| CALL-FUNCTION | coolant-low |
| FUNCTION-CONDITION | (coolant-low yes) |
| PRE-DESCRIPTION | "check coolant level" |
| CONCLUSION-IF-TRUE | "coolant level is low" |
| CONCLUSION-IF-FALSE | "coolant level is ok" |
| YES-NODE | conclude-radiator-leaks |
| NO-NODE | conclude-radiator-leaks |
| FORGET: | |
| HELP: | |

CALL-FUNCTION contains the name of a hypothesis tree node, an "AND" node or an "OR node. Control will be transferred to the hypothesis tree node being called, and any hypothesis tree or flow-charts that would have been performed upon reaching the called node will be performed currently. Then, control will return to the call node with the value determined for the node being called. For Call-coolant-low, CALL-FUNCTION will be "coolant-low", the name of node 549.

FUNCTION-CONDITION contains the name of the node contained in CALL-FUNCTION followed by either "yes" to indicate that the CALL node is true if the node called returns true, or "no" to indicate that the CALL node is true if the knowledge node called returns false. For Call-coolant-low, FUNCTION-CONDITION is: "(coolant-low yes )".

PRE-DESCRIPTION, CONCLUSION-IF-TRUE and CONCLUSION-IF-FALSE contain appropriate messages for the user.

Both YES-NODE and NO-NODE contain "Conclude-radiator-leaks", the name of node 560.

The Conclude-radiator-leaks node 560 prints an appropriate message to the user and ends the reasoning for the Overheat node 546. CONCLUDE nodes contain the attributes NODE-ID and CONCLUSION. For all CONCLUDE nodes, NODE-ID contains conclude-node- CONCLUSION contains a message for the user. For Conclude-radiator-leaks, the message might be "Leak repaired."

Coolant-low 549 is the second node to which Overheats 546 points. Because it is a leaf node, it is defined as an OR node. Because Coolant-low points to a flow-chart, QUERY, HAS-TEST and HELP contain "nil". YES-NODE contains the name of the first node in the flow-chart: Is-coolant-low. FORGET contains "no" so that after Coolant-low is called from Call-coolant-low 558, the value of Coolant-low 549 is retained and the flow-chart is not processed a second time.

Is-coolant-low is a test node to determine whether coolant needs to be added to the radiator. HAS-TEST contains the name of a procedure for the diagnostic machine to perform to determine whether the coolant is low. QUERY contains a message requesting the user to determine whether the coolant is low. NO-NODE contains "Confirm-coolant-not-low", the name of node 564. YES-NODE contains "Add-coolant", the name of node 566.

If the value of Is-coolant-low is "no", control goes to confirm-coolant-not-low 564, which returns control to Coolant-low 549 with a value of "no" Confirm-coolant-not-low 564 is a CONFIRM node with BRANCH-TO-AND-CONFIRM containing "(Coolant-low no)" and NEXT-HYPOTHESIS, and NODE-HAVING-HYPOTHESIS containing "nil".

If on the other hand the value of Is-coolant-low is "yes", control goes to Add-coolant, a TEST node with QUERY instructing the user to add coolant and HAS-TEST instructing the diagnostic machine to add coolant. Add-coolant ignores the response from the user or machine. Accordingly, both YES-NODE and NO-NODE contain "Confirm-coolant-low", the name of node 568.

Confirm-coolant-low 568 then returns control to Coolant-low 549 with a value of "yes". Confirm-coolant-low is a CONFIRM node with BRANCH-TO-AND-CONFIRM containing "(Coolant-low yes)" and NEXT-HYPOTHESIS and NODE-HAVING-HYPOTHESIS containing "nil".

If the value of Coolant-low 549 was found to be "yes", the goal has been solved and the Inference Engine returns control to the Controller. Otherwise, AND node Bad-thermostat 550 becomes the hypothesis. The hypothesis, that the thermostat has malfunctioned, is true if the engine is warm, signified by Engine-warm 570 and the thermostat is closed, signified by Thermostat closed 572. AND nodes have the following attributes: IS-A, NODE-ID, DUE-TO-AND-NODE, DUE-TO-CONDITIONS, PRE-DESCRIPTION, CONCLUSION-IF-TRUE, CONCLUSION-IF-FALSE, and FORGET. IS-A, NODE-ID, PRE-DESCRIPTION, CONCLUSION-IF-TRUE, CONCLUSION-IF-FALSE and FORGET are described above.

DUE-TO-AND-NODE contains the names of the nodes from which the value of the AND node is determined. An AND node is "yes" if each node named in DUE-TO-AND-NODE occurred. In Bad-thermostat therefore, DUE-TO-AND-NODE would contain "(Engine-warm) (Thermostat-closed)".

DUE-TO-CONDITIONS contains the knowledge node names in DUE-TO-AND-NODE each followed by either "yes" or "no". The value after each node name indicates whether to consider that node to be true if the problem associated occurred ("yes") or did not occur ("no"). In Bad-thermostat therefore, DUE-TO-CONDITIONS would contain "(Engine-warm yes) (Thermostat-closed yes)".

In the example, the diagnostic machine cannot repair a bad thermostat. Therefore, CONCLUSION-IF- TRUE instructs the user what to do if the thermostat has malfunctioned. An informative CONCLUSION-IF-TRUE for Bad-thermostat would be "Thermostat malfunctioned and must be replaced." Table 7 below summarizes the attributes of the "Bad Thermostat".

TABLE 7

ATTRIBUTES OF "BAD THERMOSTAT"

| | |
|---|---|
| IS-A: | AND node |
| NODE-ID: | bad-thermostat |
| DUE-TO-AND-NODE | (engine-warm, thermostat-closed) |
| DUE-TO-CONDITIONS: | (engine-warm yes) (thermostat-closed yes) |
| PRE-DESCRIPTION | "current hypothesis: bad thermostat" |
| CONCLUSION-IF-TRUE | "thermostat is malfunctioning an must be replaced" |
| CONCLUSION-IF-FALSE | "good thermostat" |
| FORGET: | |

The first requirement for determining Bad-thermostat 550 true is finding Engine-warm 570 true. Engine-warm 570 is an OR node which is true if the engine temperature is above a certain level. Because 570 is a leaf node, DUE-TO-OR-NODE and DUE-TO-CONDITIONS contain "nil". Because 570 points to no flow-chart, YES-NODE contains "nil". The truth of 570 is determined by the answer to the question in QUERY or the response to the test in HAS-TEST. Table 8 below summarizes the attributes of the "Engine Warm" node:

TABLE 8

ATTRIBUTES OF "ENGINE WARM"

| | |
|---|---|
| IS-A | OR node |
| NODE-ID | engine-warm |
| DUE-TO-OR-NODES | |
| DUE-TO-CONDITIONS | |
| YES-NODE | |
| PRE-DESCRIPTION | "current hypothesis: engine is warm" |
| HAS TEST: | |
| QUERY | "is engine temperature above normal" |
| CONCLUSION-IF-TRUE | "engine is warm" |
| CONCLUSION-IF-FALSE | "engine temperature is normal" |
| FORGET: | |
| HELP: | |

The second requirement for determining Bad-thermostat is finding Thermostat-closed 572 true. Thermostat-closed is an OR node which is true if the thermostat is in the closed position, not allowing water to flow through it. Like Engine-warm 570, Thermostat-closed is a leaf which points to no flow-chart, and thus attributes DUE-TO-OR-NODE, DUE-TO-CONDITIONS and YES-NODE contain "nil". The truth of 572 is determined by the answer to the question in QUERY or the response to the test in HAS-TEST.

If Bad-thermostat is true, control is returned to the Controller. Otherwise, the Inference Engine would continue to process remaining hypotheses pointed to by Overheats 546 (not shown in the example) until one was found true or until there were no more.

Figure 25A:
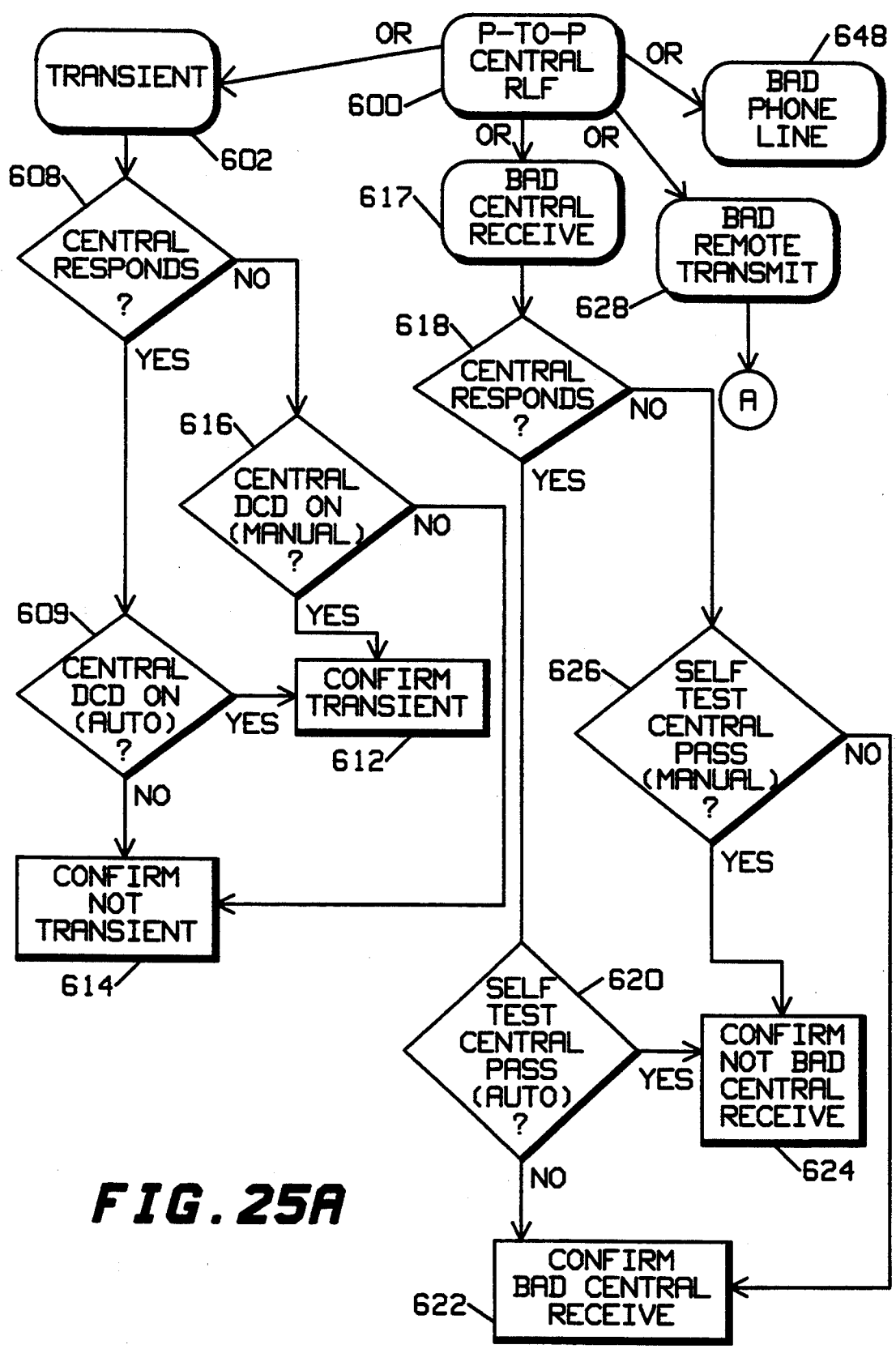
FIG. 25, which is broken down into FIGS. 25A and 25B due to size, shows a simplified Expert Information Structure for a data communication network diagnostic system.
Figure 25B:
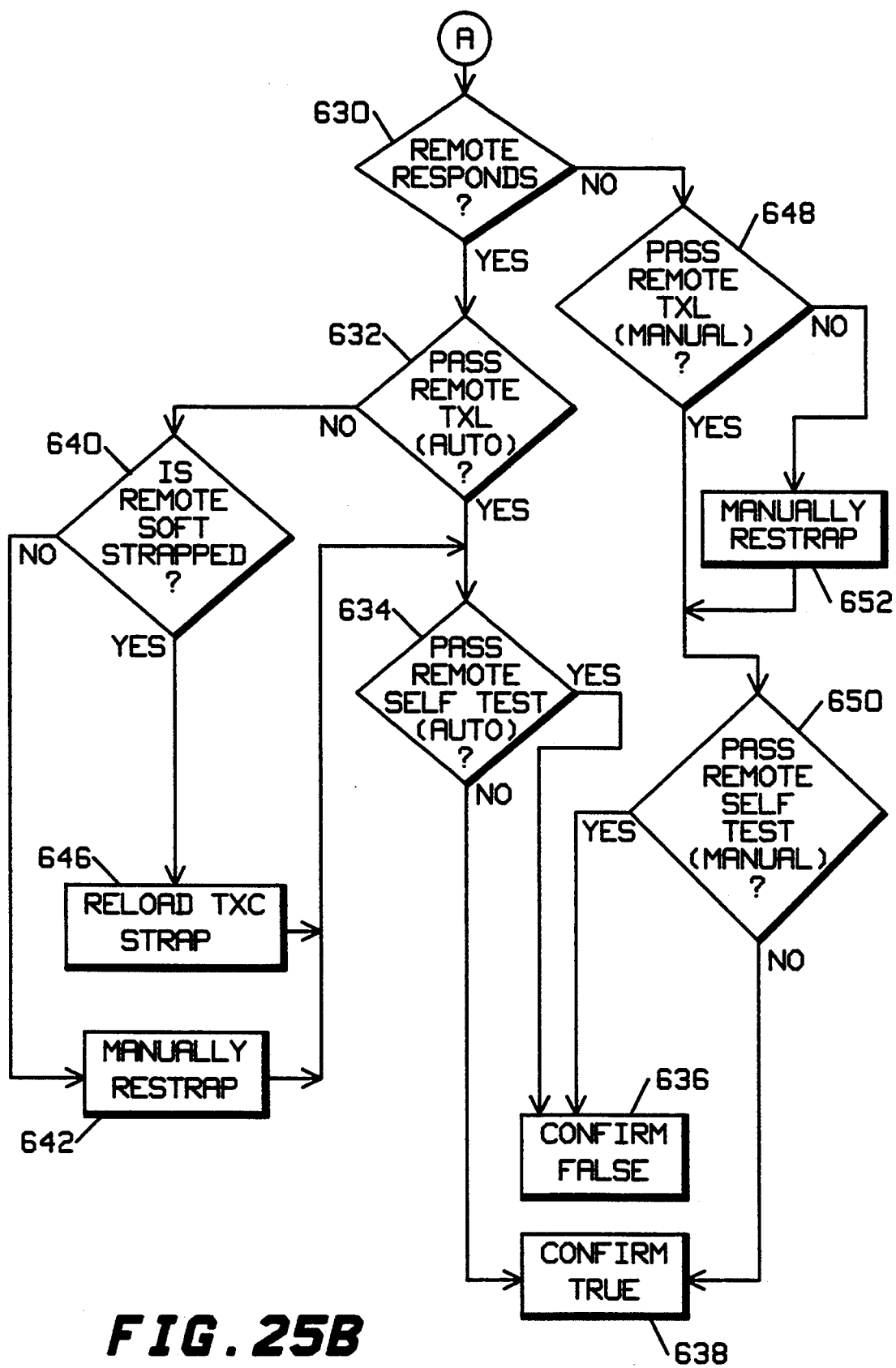
Figure 26:
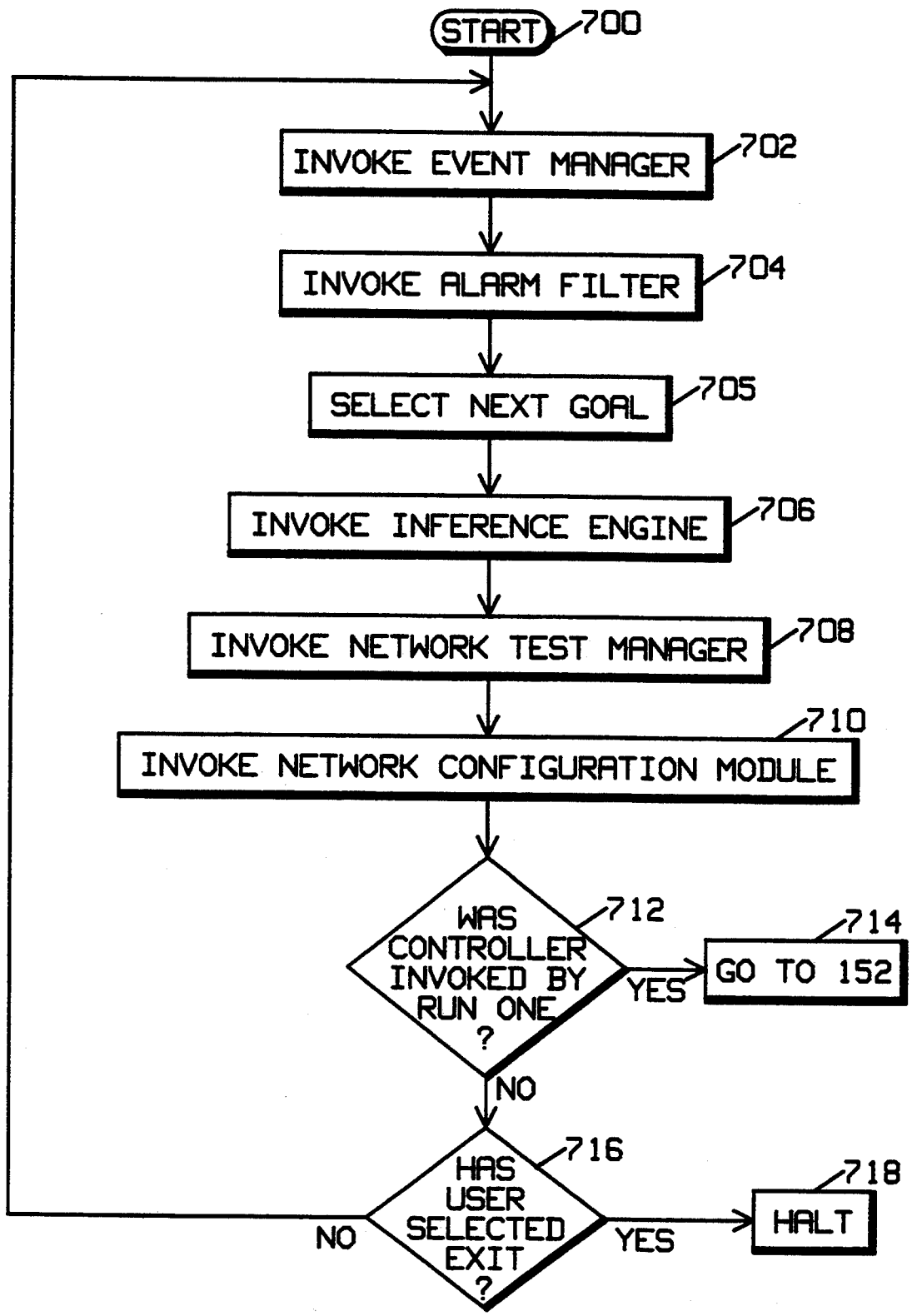
FIG. 26 shows a flow-chart of the operation of the Controller 112.

Returning now to the network diagnostic environment of the preferred embodiment, FIGS. 25 and 26 show an example of a section of the Expert Information Structure for a data communications network as illustrated by the example of FIG. 1. The figures show only the section of an Expert Information Structure 111 that would be processed after determining that a central network object with a point to point configuration has sent a receive line failure alarm to the Network Manager 24. P-to-p-central-rlf 600 is an OR node which represents that state of knowledge.

The first hypothesis of the cause of the malfunction is a transient condition, represented by OR node Transient 602. To determine whether this was the cause, TEST node 608 determines whether the central device responds to diagnostic information. If so, TEST node 609 sends a test to the central object (OR, if in manual mode, instructs the user to send such a test) to determine whether the central Data Carrier Detect (DCD) is on. If the result is positive, CONFIRM node CONFIRM-TRANSIENT 612 returns "yes" to OR node Transient 602. If the test result is negative, CONFIRM node CONFIRM-NOT-TRANSIENT 614 returns "no" to OR node Transient 602 hypothesis.

If 608 determines that the central object does not respond to diagnostic information, TEST node 616 instructs the user to manually determine whether the central DCD is on. If the user answers "yes", 6 12 returns "yes" to OR node Transient 602. Otherwise, 614 returns "no" to OR node Transient 602 hypothesis.

The second hypothesis of the cause of the point to point central remote line failure is a malfunctioning receiver (demodulator) on the central object, represented by Bad-central-receive hypothesis 617. To determine whether this was the cause, TEST node 618 first determines whether the central modem responds to diagnostic information. If so, TEST node 620 sends a self test command to the central object initiating a self test of the central object. If the object fails the test, CONFIRM node 622 returns "yes" to Bad-central-receive 617. If the object passes the test, CONFIRM node 624 returns "no" to Bad-central-receive 617. If 618 determined that the central modem does not respond, 626 instructs the user to manually self test the central object. If the object fails, 622 returns "yes" to Bad-central-receive 617. Otherwise, 624 returns "no" to Bad-central-receive 617.

The third hypothesized cause of the point to point central remote line failure is a malfunctioning transmitter on the remote object, represented by Bad-remote-transmit 628. To determine if this was the cause, TEST node 630 first determines whether the remote object responds. If so, 632 sends a Transmit Level (TXL) test to the remote object. If the object passes the test, 634 sends a self test to the remote object. If the object fails the self test, 638 returns "yes" to Bad-remote-transmit 628. If the object passes the self test, 638 returns "no" to Bad-remote-transmit 628.

If the remote object fails the Transmit Level (TXL) test in 632, 640 determines whether the object is soft strapped (i.e. configuration strapping information is stored in a memory rather than physical hardware jumpers). If not, 642 instructs the user to manually re-strap the object. Otherwise, 646 reloads the Transmit Level (TXL) strap. After 642 or 646, control goes to 634, explained above.

If the remote does not respond in 630, 648 instructs the user to manually test the Transmit Level (TXL) on the remote object. If the object passes, 650 instructs the user to manually self-test the object. Otherwise, 652 instructs the user to manually re-strap the object before performing a manual remote self test in 650.

If the object passes the test in 650, 636 returns "no" to Bad-remote-transmit 628. Otherwise, 638 returns "yes" to Bad-remote-transmit 628.

The fourth hypothesized cause of the point to point remote line failure is a bad phone line, represented by OR node Bad-phone-line 648. This must be the cause of the malfunction if none of the other three hypotheses occurred. This hypothesis is assumed to be correct by the process of elimination of the other three causes. Therefore the node attributes DUE-TO-OR-NODE, DUE-TO-CONDITIONS, YES-NODE, QUERY, HAS-TEST and CONCLUSION-IF-FALSE contain "nil". CONCLUSION-IF-TRUE contains a message to the user, for example to inform the telephone company of the malfuncioning line.

Controller

FIG. 26 illustrates the operation of the Controller 112. User Interface 104 commands "Run" and "Run One" initiate the Controller 112. If "Run One" is selected, the Controller 112 only operates for one cycle on the goal which is next in the queue. First, after the Start block 700, 702 invokes the Event Manager 117 to send network tests to and receive alarms, information events and network configuration events from the Network Manager 24, since the last time it was invoked.

Second, 704 invokes the Alarm Filter 118 to post non-redundant alarms as goals on the Bulletin Board 120. Third, 705 selects the next goal to solve. It does so by selecting the the goal with a status of "posted" and priority at least as high as any other posted goal. If more than one posted goal has the highest priority, the Controller 112 selects the goal which has been on the Bulletin Board 120 the longest or was generated earliest in the preferred embodiment. In another embodiment, the most recent goal is selected depending upon the nature of the diagnostic system. Status, priority and time posted are goal attributes which are more fully explained in the Inference Engine 122 section, but basically, the status is an attribute which indicates whether or not the goal is posted on the Bulletin Board 120 (for purposes of the present discussion). The priority is a number assigned by the Domain Expert 101 to the type of goal indicating its importance, for example a number between 0 and 10 (or 0 and 100, etc.) may be assigned. The time posted is, of course, used to determine how long the goal has been posted in order to resolve the situation where two or more goals are posted with the same priority.

Fourth, 706 invokes the Inference Engine 122 to determine the problems which caused the goals on the Bulletin Board 120 and to resolve the problems. Fifth, 708 then invokes the Network Test Manager 124 to handle any requests by the Inference Engine 122 for information from the Network Manager 24. Fifth, 710 invokes the Network Configuration Manager 108 to update the Network Structure Knowledge Base 110 if the Network Manager 24 has detected any changes in the layout of the network since the last time the Network Configuration Manager 108 was invoked. Sixth, 712 determines whether the Controller 112 was initiated with the command "Run One". If so, 714 transfers control to 152 of the User Interface so that only one goal is operated upon. Otherwise, 716 determines whether the user has selected the command "Exit" from the User Interface. If so, 714 transfers control to step 718 where the process halts. Otherwise, control returns to 702 where the process is repeated until the user selects "Exit". Some rearrangement of the order of operation of the controller 112 may be possible without departing from the present invention.

Event Manager

Figure 27:
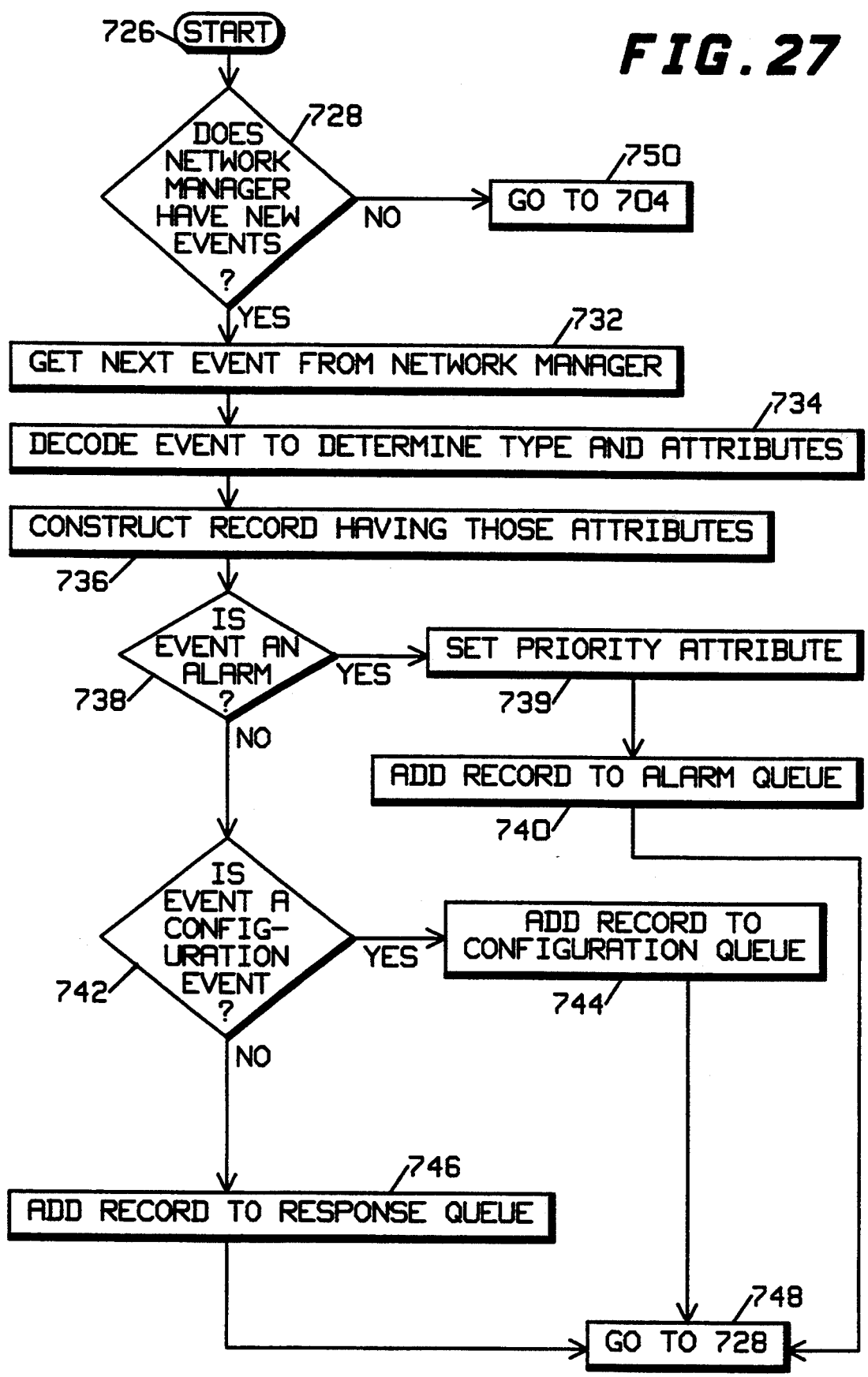
FIG. 27 shows a flow-chart of the operation of the Event Manager 117 in retrieving events from the Network Manager 24.

The Event Manager 117 is invoked by the Controller 112 to send network tests to and receive alarms, information events and network configuration events from the Network Manager 24. FIG. 27 shows how the Event Manager 117 retrieves events (alarms, configuration events and result events) from the Network Manager 24. After the start block 726, 728 determines whether the Network Manager 24 has any events which the Event Manager 117 has not already retrieved. If not, 730 transfers control to 704 of the Controller 112 flowchart of FIG. 26. Otherwise, 732 retrieves the next event from the Network Manager 24. For each event, block 734 then decodes the event to determine its type (alarm, configuration event or result event) and several other characteristics including the time it was received by the Network Manager 24, and the network component it concerns. Next, 736 constructs a record of the proper type (alarm, configuration or response) with the other above characteristics as its attributes. Block 738 then determines whether the event is an alarm. If so, 739 sets the priority attribute of the record based on the alarm type. Block 740 then adds the alarm record to the Alarm Queue 114. Otherwise, 742 determines whether the event is a configuration event. If so, 744 adds it to the Configuration Queue 113. If it is not an alarm or a configuration event, it must be a response event. In that case, block 746 adds the record to the Response Queue 116. After 740, 744 or 746 adds the record to the proper queue, 748 returns control to 728 where the process begins to repeat.

Figure 28:
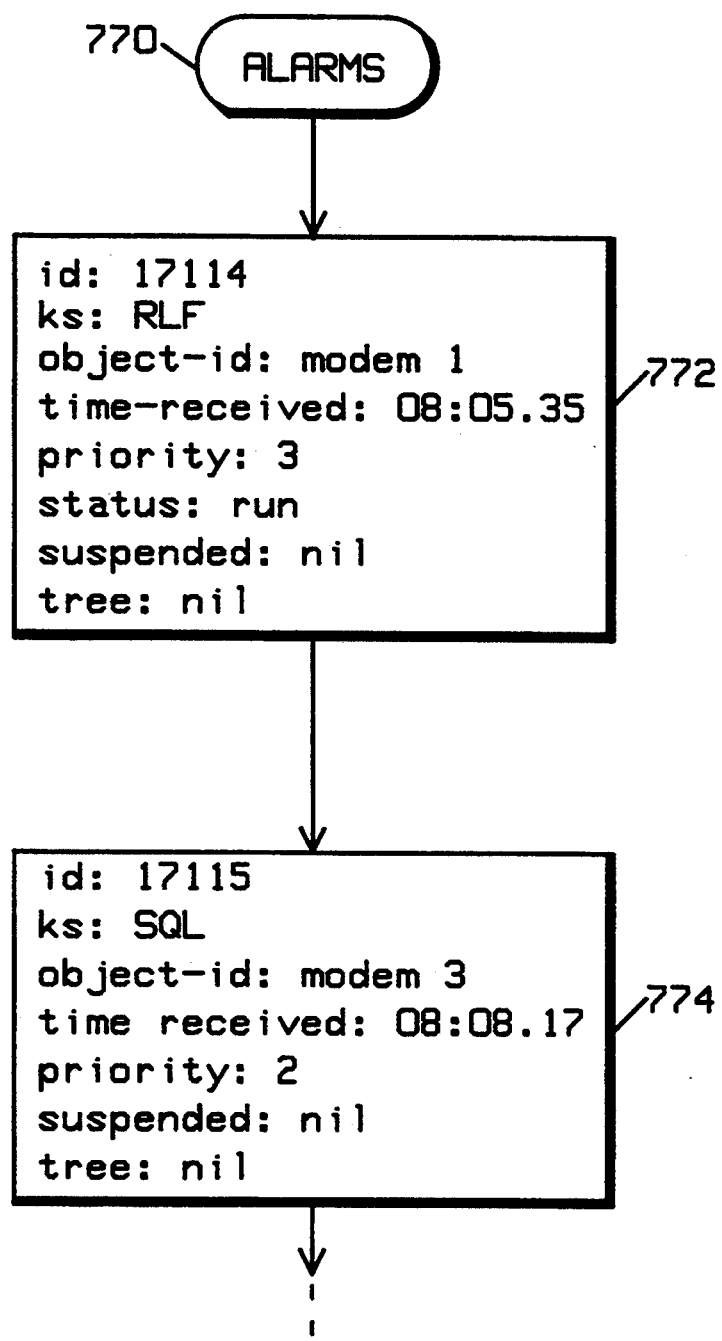
FIG. 28 shows a portion of the Alarm Queue 114.

FIG. 28 shows an example of part of an Alarm Queue 114. Alarm record 770 points to the alarm queue 114. The Alarm Queue 114 points to a queue of alarm records. Records 772 and 774 are examples of alarm records. The alarm records contain information about the alarm including a unique identifier of the alarm record (id), the type of alarm. Each Knowledge Source (ks) corresponds to an alarm, the name of the object which sent the alarm (object-id), the time the Network Manager 24 received the alarm (time-received), the priority of the alarm (priority), the status of the alarm (status) and the last record processed before the goal was suspended (suspended-goal) The values of id, Knowledge Source, object-id, time-received are determined by the information in the alarm event. The value of priority is determined by, for example, a table of each type of alarm and its corresponding priority which would be assigned by the Domain Expert 101 based upon his experience with what types of alarms demand the most attention, priority communication links, policy, etc. The Event Manager 117 initializes status to dormant, suspended-record to nil. The purpose of each alarm attribute is more fully explained below in the section on the Inference Engine 122.

FIG. 29 shows a portion of the Response Queue 116. Response record 776 points to the Response Queue 116, which is illustrated by records 778 and 780. The first attribute in response record is record-id, a unique identifier of the record. Second, response-type contains the type of test which requested the information in the response. Third, object-id contains the name of the network object which the response concerns. Finally, value contains the value returned by the test (yes or no). The unit-config attribute contains information regarding the configuration of the physical device as, for example, determined by the device's internal strapping.

Since each data communication network is different and there are different needs for diagnostics for each network, a domain expert must almost surely provide custom expert information for diagnosing each network. For example, priority numbers often depend more upon what the business environment needs from the network than on the actual devices themselves.

FIG. 30 shows a portion of the Configuration Queue 113. Configuration record 782 points to the Configuration Queue 113, which is illustrated by records 784 and 786. The first attribute in a configuration record is record-id, an unique identifier of the record. Second, object-id contains the name of the object for which the configuration has been changed. Finally, various other attributes will contain information on how the configuration has changed. Those skilled in the art will understand how to arrange such information, which information is highly dependent upon the particular system and devices available, but is not important to this discussion.

Figure 31:
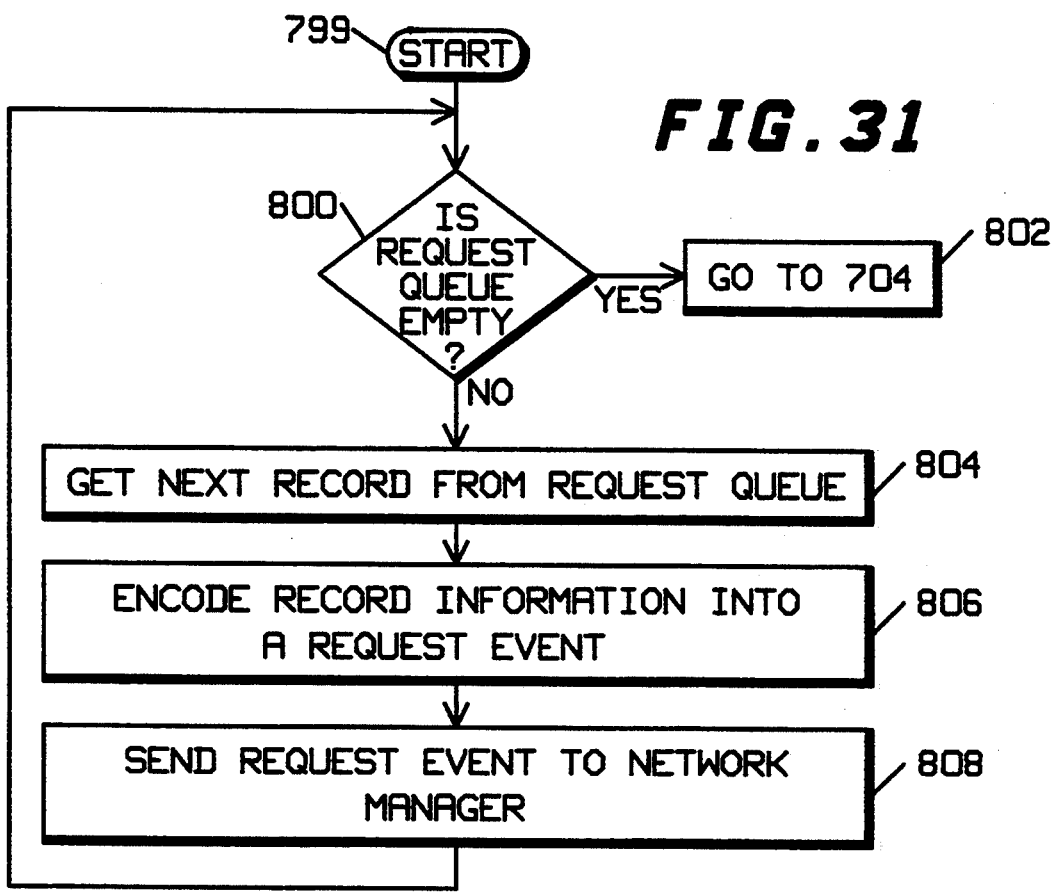
FIG. 31 shows a flow-chart of the operation of the Event Manager 117 in sending events to the Network Manager 24.

FIG. 31 shows how the Event Manager 117 queues requests for information from the Network Manager 24. First, after the start block 799, block 800 determines whether the Request Queue 115 is empty. If so, 802 transfers control to block 704 of the Controller 112. Otherwise, 804 retrieves the next information request record from the Request Queue 115 (constructed by the Network Test Manager). Block 806 then encodes this information into a request event interpretable by the Network Manager 24. Finally, 808 sends the request event to the Network Manager 24. Control then returns to 800 where the process begins to repeat.

Figure 32:
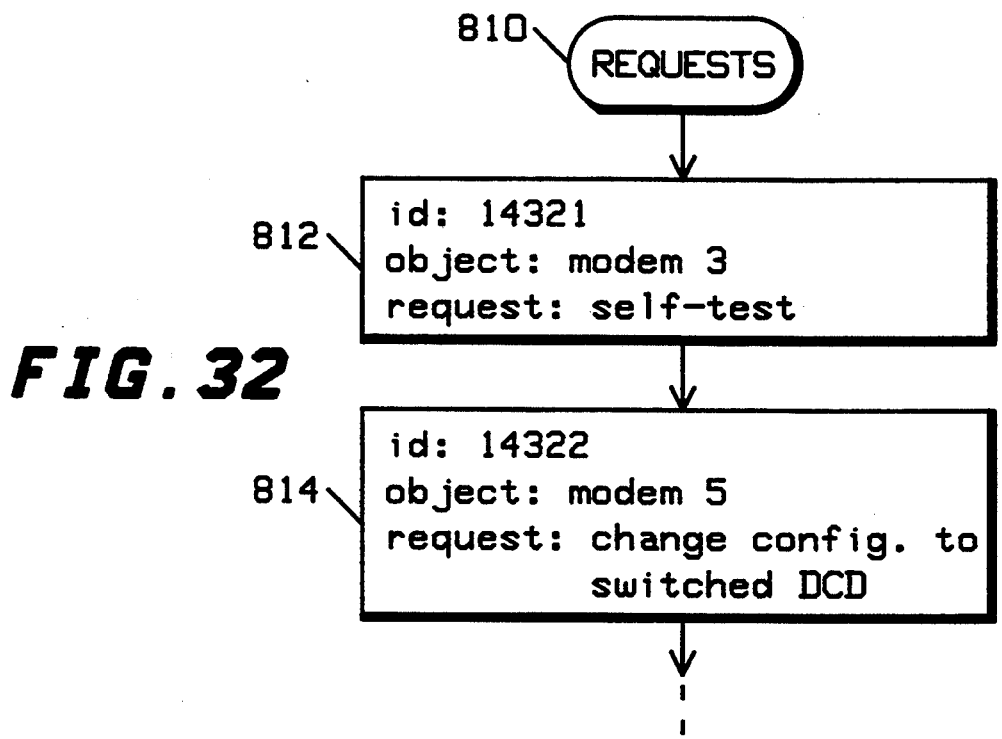
FIG. 32 shows a portion of the Request Queue 115.

FIG. 32 shows an example of a Request Queue 115. Request record 810 points to the Request Queue 115 containing records 812 and 814. The first attribute in the record is object-id, which contains the name of the object for which information is desired. The other attribute is request, which contains the name of the test or instruction requested.

Alarm Filter

Figure 33:
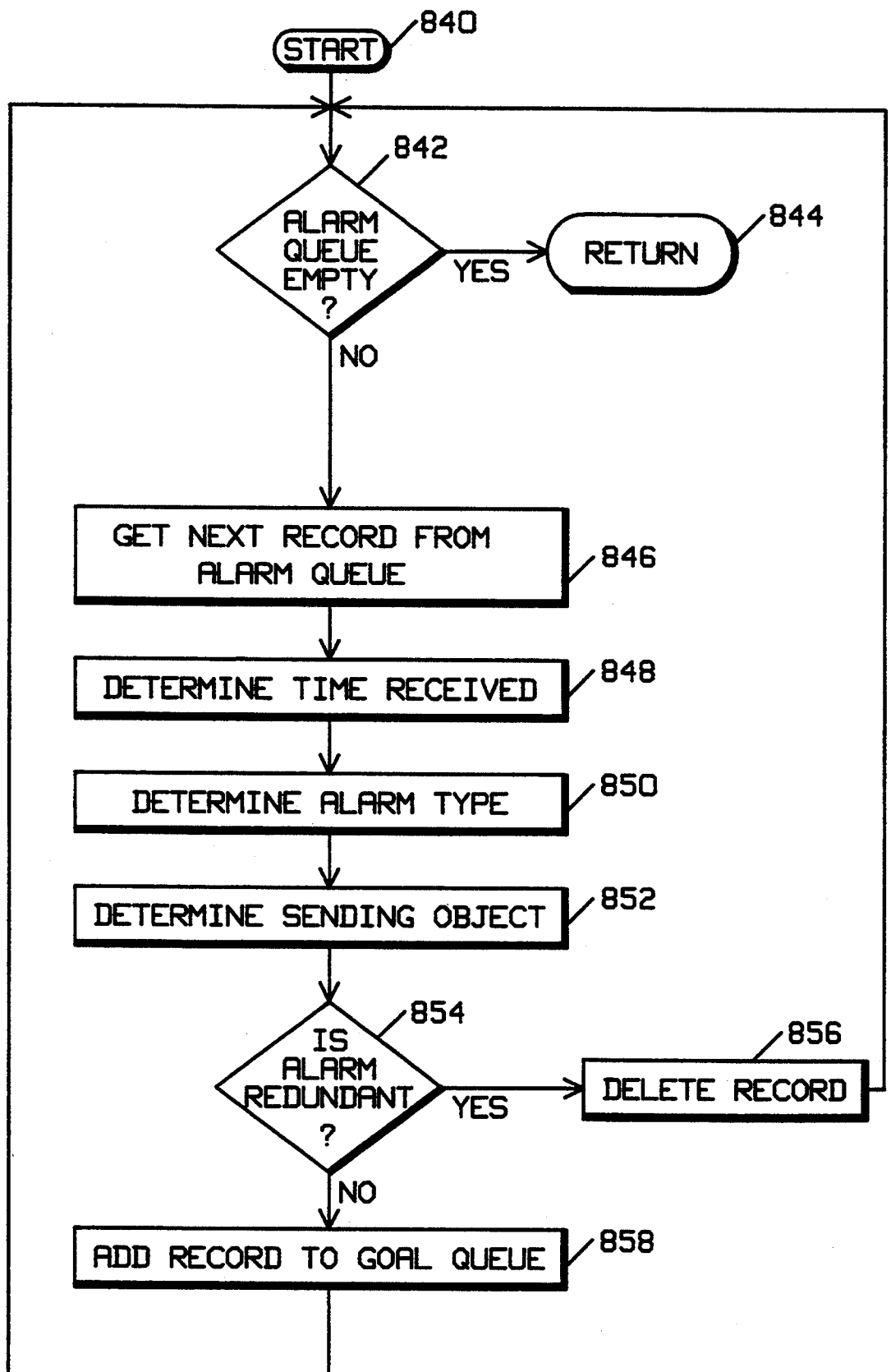
FIG. 33 shows a flow-chart of the operation of the Alarm Filter 118.

FIG. 33 is a flow-chart of the operation of the Alarm Filter 118. After the start block 840, block 842 determines whether the Alarm Queue 114 is empty. If so, 844 transfers control to Controller block 705. Otherwise, 846 retrieves the next alarm record from the Alarm Queue 114. Block 848 then determines the time the alarm was received by the time-received attribute of the alarm record. Next, 850 determines the type of the alarm associated with the alarm record from the alarm-type attribute. Block 852 determines the object which sent the alarm from the object-id attribute of the record. Using all of this information along with the network structure knowledge base, 854 determines whether the alarm is redundant or correlated to other alarms.

The Alarm Filter 118 of the preferred embodiment determines whether alarms are redundant by both space and time correlation techniques. Other techniques of filtering may be required for Expert Systems operating in other environments. By its knowledge of the network topology obtained from the Network Structure Knowledge Base 110, and access to events in the Event Manager 117 as well as the Bulletin Board 120, the Alarm Filter 118 examines newly received alarms comparing them to goals on the Bulletin Board 120 and events in the Event Manager 117 to determine whether they should be considered redundant.

Redundant alarms can be present by virtue of two devices reporting the same problem such is the case where modem 78 of FIG. 1 and modem 84 both report a problem associated with transmission line 80. By knowing the network topology, the Alarm Filter 118 can readily determine that both alarms relate to the same problem. For example, if a high error rate alarm is reported by central modem 46 in the point to point connection shown in FIG. 1, there is a strong likelihood that a similar error reported by remote modem 50 at about the same time is redundant. In a similar manner, some types of alarms are repeatedly transmitted until told by tee network manager to quit, thus multiple alarms can be produced in that instance. It is also possible, with some network topologies such as mesh-like configurations, that a single alarm produced by a single device could take two or more different paths to the network manager. Such alarms, in the preferred system, would have the same time stamp and could thus be eliminated by the Alarm Filter 118.

Due to finite queue sizes, it may be necessary or desirable to give the power to delete lower priority alarms to the Alarm Filter 118 also. For example, if a major failure occurs which in effect overpowers the ENDS 10 with alarms, the Alarm Filter 118 can discard alarms (preferably but not necessarily in accordance with their priority) in order to prevent a queue overflow or system crash.

If an alarm is found to be redundant, 856 deletes the alarm record and control is returned to 842. Otherwise, 858 adds the alarm record to the Goal Queue within Bulletin Board 120 and control returns to 842.

The flow-chart of FIG. 33 does not address what happens if an alarm is correlated with other alarms which have been received. This is because the course of action to be followed in this instance can be highly domain dependent. In some cases, receipt of a correlated alarm can exactly or nearly exactly identify a problem making diagnostics trivial. In other cases it may complicate the diagnostic process. In some instances, receipt of an alarm correlated to a currently active goal may mean that processing of the goal can be terminated. In other instances, the receipt of a correlated goal may simply mean that more information is available to apply to solving the problem at hand. Accordingly, the handling of correlated alarms is best left to the individual design of the system.

Inference Engine

The Inference Engine 122 operates using the knowledge of the Domain Expert 101 contained in the Expert Information Structure 111. This Expert Information Structure 111 is a knowledge base which is divided into many knowledge sources, one for each type of alarm to be handled by the Inference Engine 122. By dividing the knowledge in this manner, knowledge which is not currently needed is not loaded into memory, thus conserving memory. To speed operation a cache may be desirable so that the most recently used knowledge sources (e.g. the five most recently used) may be held in the cache using conventional disk caching techniques. During the Expert Knowledge Acquisition process, the Domain Expert 101 can concentrate on the knowledge required to solve one problem at a time making the entry of knowledge somewhat modular and leading to fewer errors. Knowledge can be added incrementally as required by the Domain Expert 101 or Operator 128.

In operation, when the alarms are posted to the Bulletin Board 120, the Controller 112 marks one as active for use by the Inference Engine 122. The Inference Engine 122 then maps this active goal to its appropriate knowledge source using, for example, a look-up table. If the knowledge source is not currently in memory or cache, it is loaded from disk. Then, the Inference Engine begins to solve the goal by a process called "instantiation" herein. This is the process of building a dynamic trace on the Bulletin Board 120 of a goal tree corresponding to the goal's solution. The term "instantiation", as used herein, is similar in meaning to the use of the term in connection with the Prolog language and other artificial intelligence oriented languages. In Prolog, a variable is instantiated when there is an object for which the variable stands for; for example, when a variable has been replaced by a constant. In the present invention, a node is instantiated when variables associated with the node have been replaced by facts such as alarm type, configuration information, priority, time, user supplied information, network database information, test results, etc. as the expert knowledge structure is traversed.

Figure 34:
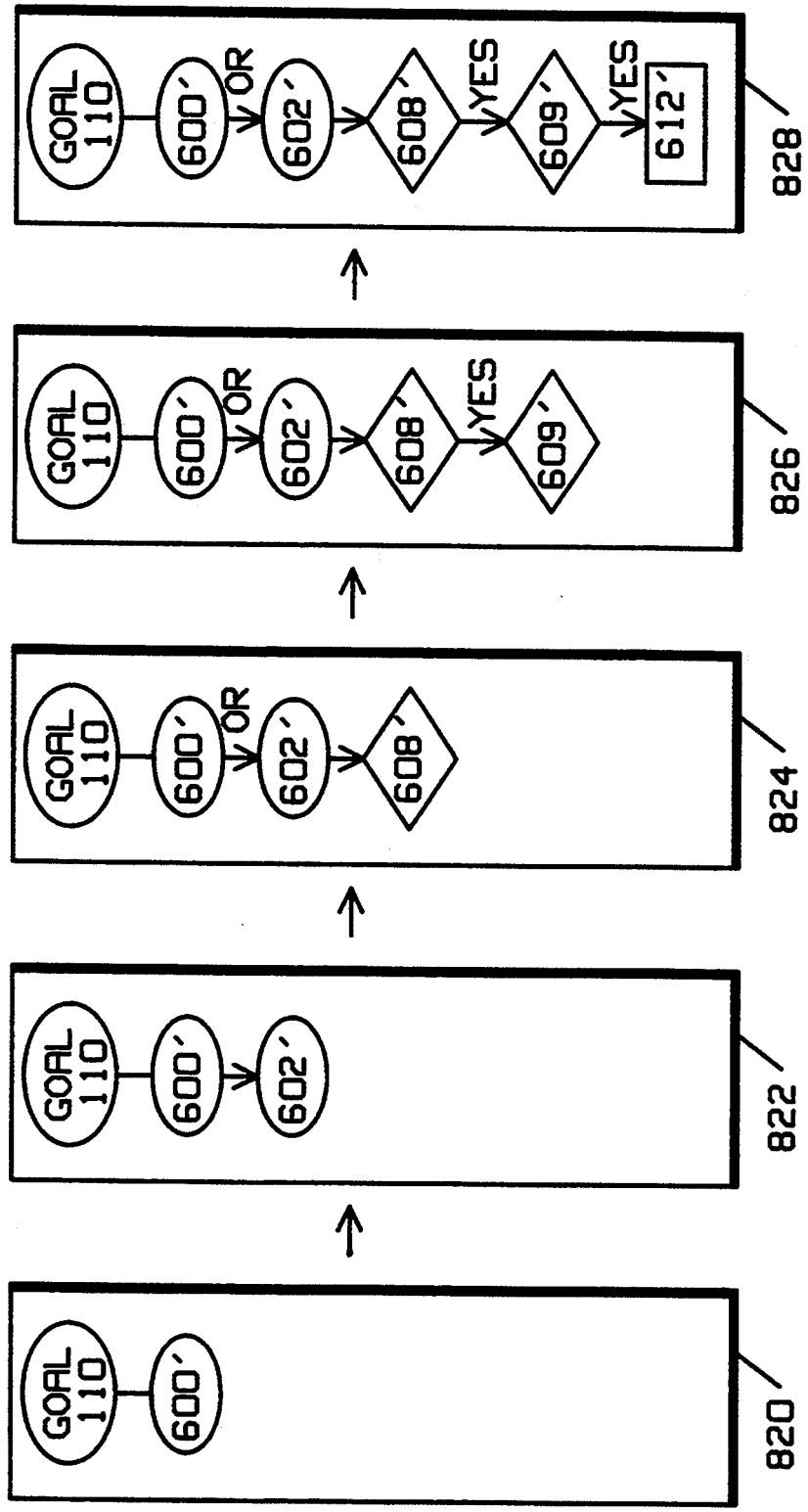
FIG. 34 illustrates the process of instantiation by the Inference Engine 122.
Figure 35A:
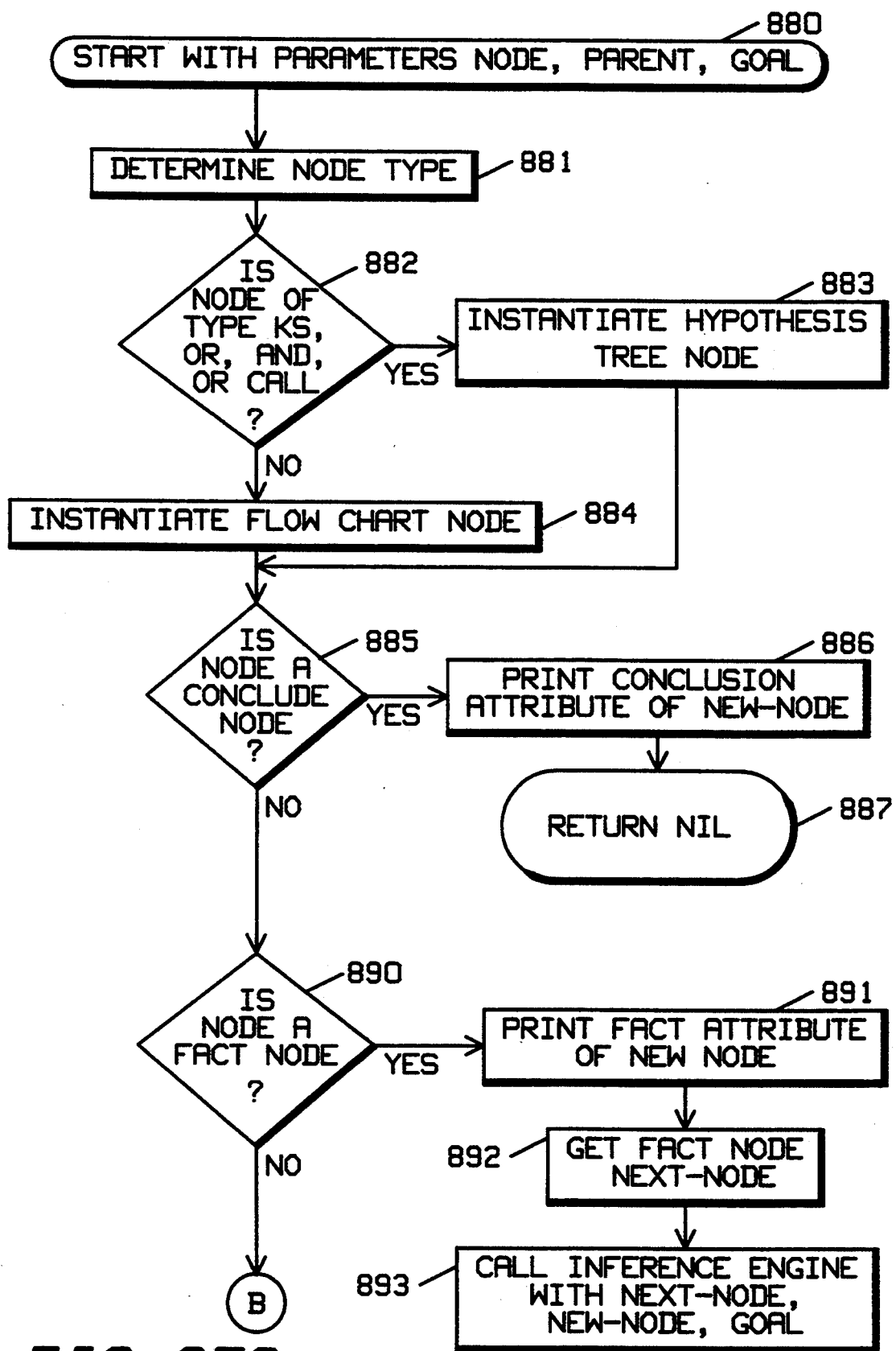
FIG. 35, which is broken down into FIGS. 35A, 35B, 35C and 35D due to size shows a flow-chart of the operation of the Inference Engine 122 of the present invention.
Figure 35B:
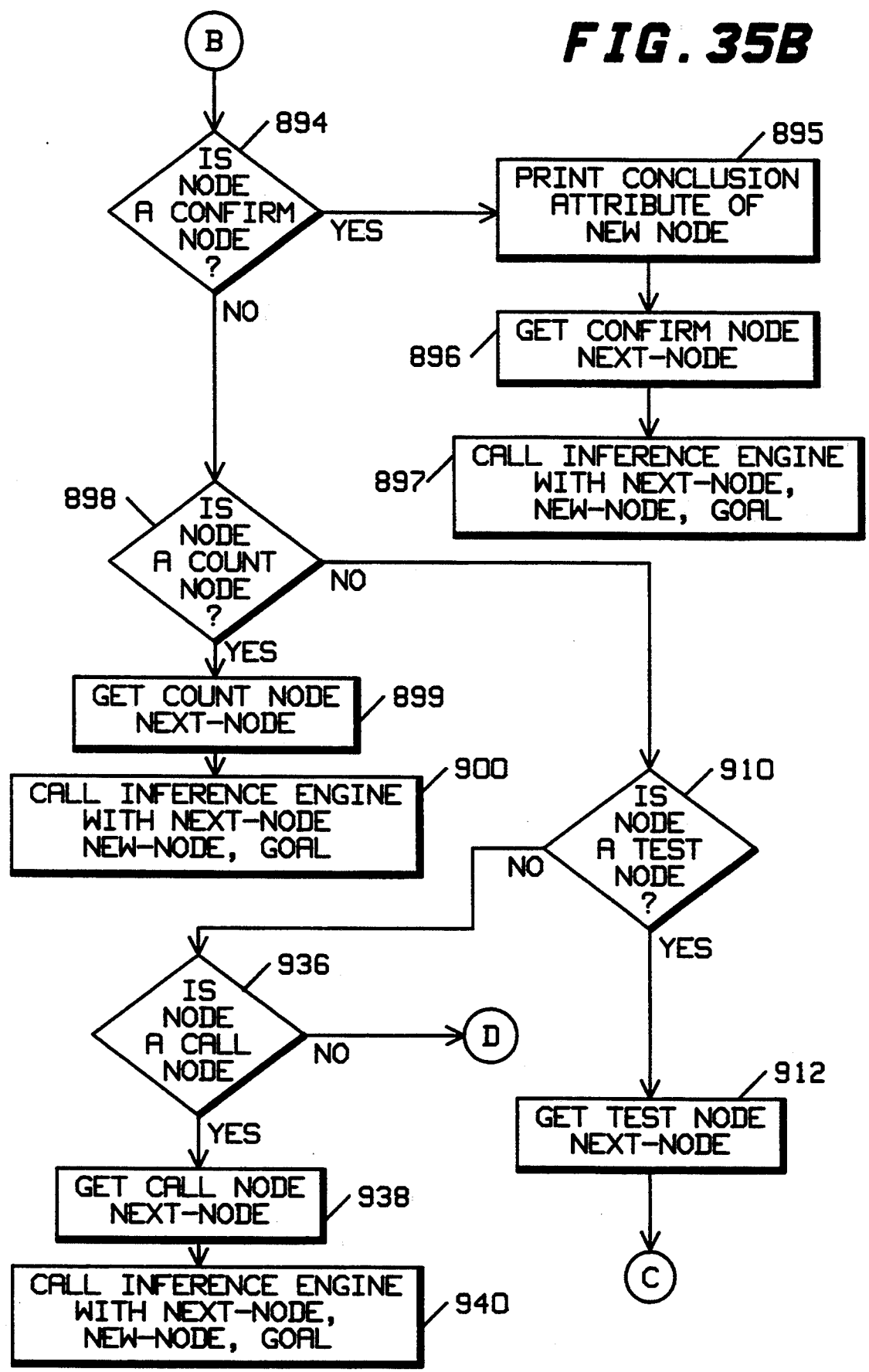
Figure 35C:
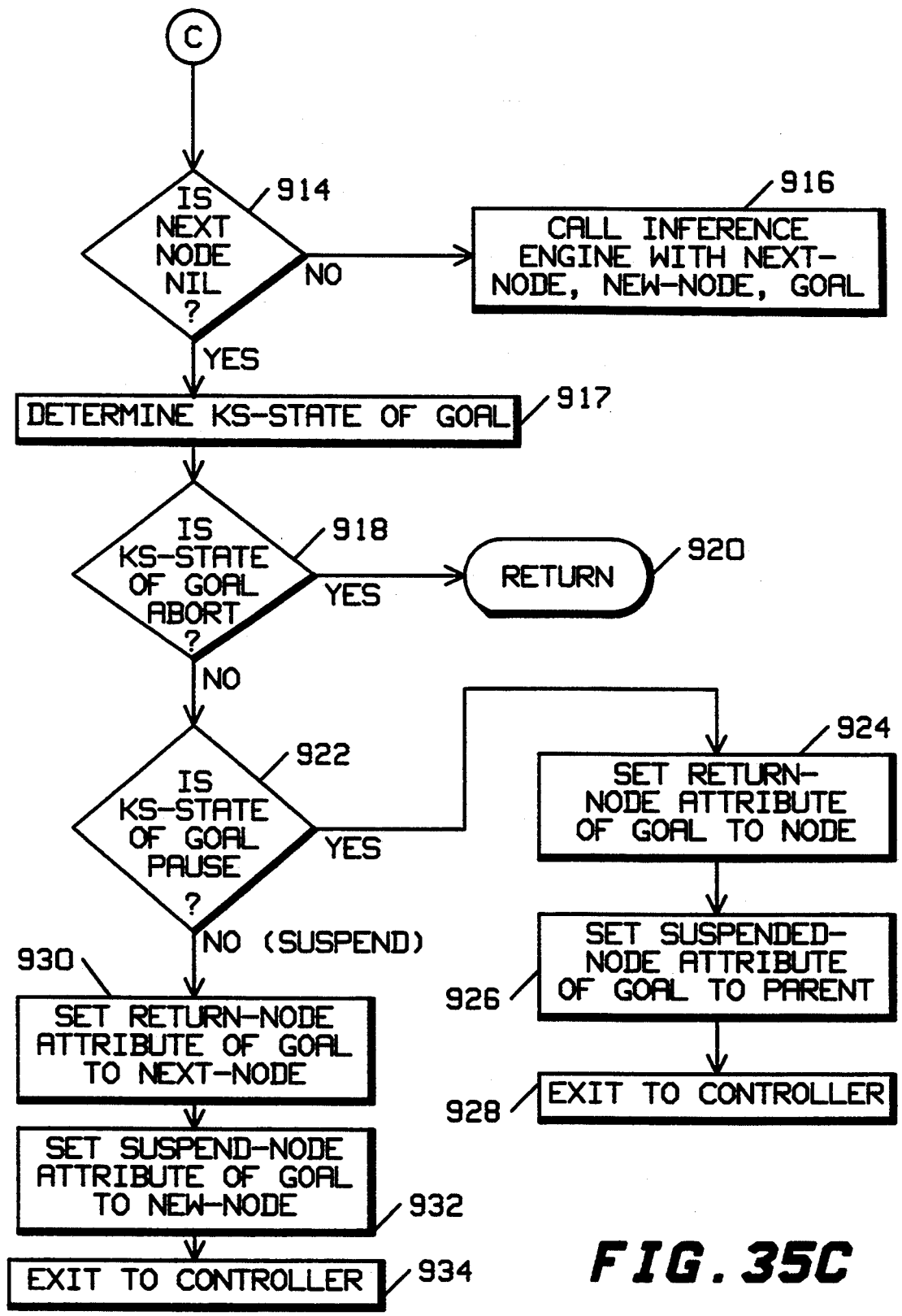
Figure 35D:
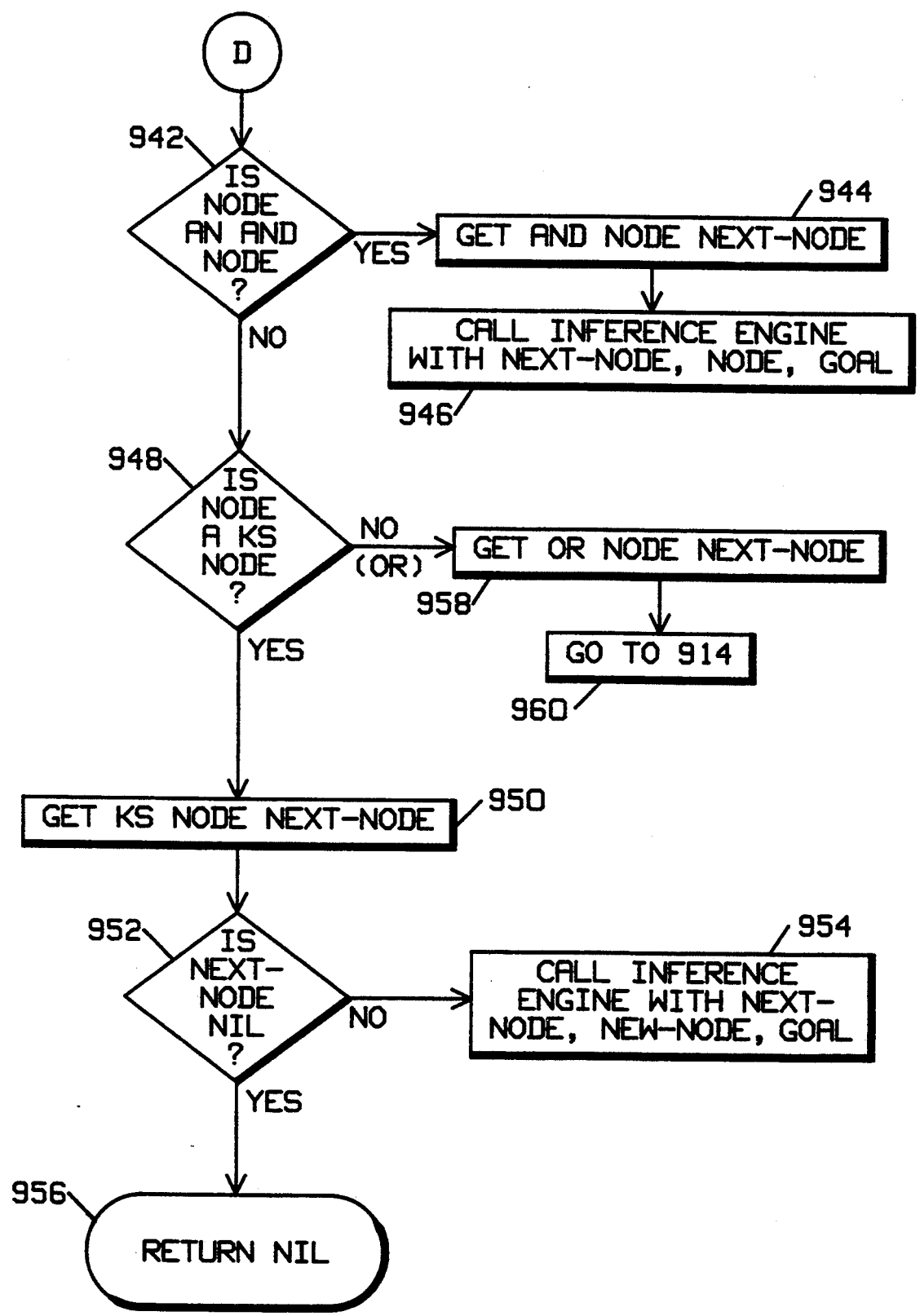

This instantiating process may be thought of as a step by step "cloning" of the knowledge source beneath the active goal. But, since each type of goal has its own knowledge source associated with it, and since some knowledge in the knowledge source may not be applicable to the specific active goal, the resulting trace will rarely look like an exact clone of the knowledge source. To clarify, refer back to FIG. 25A which corresponds to a knowledge source for a point-to-point central RLF alarm. The instantiation process for a point-to-point central RLF alarm caused by a transient (approximately the left-most path of FIG. 25A) is shown in FIG. 34. For simplicity, the numbers in the nodes of FIG. 34 correspond to the legend numbers in FIG. 25A except that the "prime" designation has been added to distinguish the clone from the knowledge source.

FIG. 34 represents a conceptual view of a time sequence of the cloning of the knowledge source in memory as the Inference Engine 122 operates on the goal. Note that if desired, such a graphical representation of the cloning process could be produced on a monitor in real time to show the actual processing of the goal. At step 820, goal 600' (point-to-point Central RLF) is instantiated with the particular information inherited from the goal. When it begins analysis of the problem, it begins, by convention, with the left-most branch of the goal tree of FIG. 25A and works downward and toward the right. With this convention in mind, the Domain Expert 101 may prepare the Expert Information Structure 111 with higher probability, least interruptive or fastest tests on the left to enhance operation. Other schemes for prioritizing the process of traversing the tree are possible. In this example, the left-most possible cause of this problem is a transient 602 so that goal (shown as 602') is instantiated below the general goal 600' in memory as shown in 822.

For the next step, there is only one possibility, that being the test 608 which is instantiated below 602 as 608' as shown in 824. Once added to the memory model, the Inference Engine 122 instructs the Network Test Manager 124 to conduct the associated test (if required) or otherwise obtains the answer (e.g. from the user in manual mode) to 608'. In this case, assume the answer is "yes" in which case the process proceeds to step 609 (Central DCD on?) in FIG. 25A. Thus, 609' is added to the memory model by instantiating 609 as shown in 826 after which the test indicated in 609' is performed. Assuming that the result of 609' is "yes", the transient nature of the problem is confirmed and 612' (Confirm Transient, a copy of 609) is instantiated to memory as shown in 828, and the goal has been solved. At this point, the Controller 112 selects the next goal for processing after logging the results of this instantiation process to the printer 20 or disk file if desired.

As shown in this example, the instantiating process is a step by step cloning process which produces a clone of the applicable portions of the goal tree corresponding to the goal being processed. During each stage of instantiation, the knowledge source is reproduced using the information from the alarm to refine the part of the knowledge source which is placed in memory as the Inference Engine 122 systematically works through the goal's solution using a recursive call to itself. This process will obviously produce a different tree for each solution to the goal, but retains the knowledge source as the generic for each type of goal.

During the instantiation process, the Inference Engine 122 may require the resources of the Network Structure Knowledge Base 110 as well as those resources previously mentioned. It directly interfaces with this Knowledge Base 110 in the preferred embodiment and can query it to obtain, for example, connection information which may be needed to solve the goal.

Of course, the instantiation process may proceed somewhat differently depending upon the mode of operation of the system. In Automatic Mode, the Inference Engine 122 may simply proceed unassisted with obtaining the information needed to solve a goal. In some cases, as previously described, the goal may be suspended to allow operation on other goals. In the Manual Mode, requests for information or tests must be printed to a screen or the system otherwise requests approval or operator assistance. The Operator 128 is presented with three choices: pause, abort or answer query in the preferred embodiment. In the Semi-Automatic Mode, the Inference Engine 122 must either look up the test on a map or examine an attribute associated with the test or otherwise determine whether or not to proceed with the test or request Operator assistance.

Although the above example is somewhat simple, those skilled in the art will appreciate the instantiation process with more complex goals after considering this example in conjunction with the following more detailed description. The following pseudocode describes the operation of the Inference Engine with comments surrounded by /* and */:

```
INFERENCE-ENGINE (Node, Parent, Goal)
    Determine node-type of Node;
    if node-type of Node = AND node or OR node or
                                                               KS-Node or
    Call-Node
        New-Node :=  Instantiate-Hypo-Node (Node, Parent, Goal);
                     /* Instantiate the Flow-Chart Node on the
                     Bulletin Board under the Parent node for the
                     current coal */
```

-continued

```
        else
            New-Node :=     Instantiate-Flow-Chart-Node(Node, Parent, Goal);
                            /* Instantiate the Hypothesis Tree Node on the
                            Bulletin Board under the Parent node for the
                            current Goal */
            case node-type of Node
                Conclude-Node:      print conclusion attribute of New-
Node;
                                        Return (NIL);
/* back to controller, indicating the completion of a goal */
                Fact-Node:          print fact attribute of New-
Node;
                                            Next-Node := Get-
                        Fact-Node-Next-
                                            Node(Node, New-Node,
                        Goal);
                                            Inference-Engine
                        (Next-Node,
                                            New-Node, Goal);
                Confirm-Node:       Print pre-description attribute of
New-Node;
                                            Next-Node := Get-
                        Confirm-Node-Next-
                                            Node (Node, New-node,
                        Goal);
                                            Inference-Engine
                        (Next-Node, New-
                                            Node, Goal);
                Count-Node:         Next-Node := Get-Count-Node-
Next-
                                            Node(Node, New-Node,
                        Goal);
                                            Inference-Engine
                        (Next-Node,
                                            New-Node, Goal);
                Call-Node:          Next-Node := Get-Call-Node-Next-
                                            Node (Node, New-Node,
                        Goal);
                                            Inference-
                        Engine(Next-Node, New-Node,
                                            Goal);
                Test-Node:          Next-Node := Get-Test-Node-Next-
                                            Node (Node, New-Node,
                        Goal);
                                            If Next-Node <> NIL
                                                Inference-Engine
                        (Next-Node,
                                            New-Node, Goal);
                                            else
                                                Determine ks-
                        state of Goal;
                                            Case ks-state of
                        Goal
                                                Abort:
                        Return (NIL);
                                                Pause:
                        Set Return-Node attribute of
                            Goal to Node;
            Set Suspended-Node attribute
                of Goal to Parent;
            Exit to Controller;
                                            Suspend: Set Return-
Node attribute of
Goal to Next-Node;
Set Suspended-Node attribute of
Goal to New-Node;
Exit to Controller;
                AND node:           Next-Node := Get-And-Node-Next-
Node
            (Node,New-Node, Goal);
                                            Inference    Engine
(Next-Node, New-Node,
    Goal);
                OR node:            Next-Node := Get-Or-Node-Next-
Node
            (Node,
                                            New-Node, Goal);
                                            If   Next-Node <> NIL
                                                Inference-Engine
(Next-Node, New-Node,
    Goal)
                                            else
```

| | |
|---|---|
| Goal; | Determine ks-state of |
| Return(NIL); | CASE ks-state of Goal abort: |
| Return-Node attribute of Goal Node; | pause: set to |
| Suspended-Node attribute of Parent; | set Goal to |
| Controller; | Exit to |
| Return-Node attribute of Next-Node; | Suspend: set Goal to |
| Suspended-Node attribute of New-Node; | set Goal to |
| Controller; | Exit to |
| KS-Node: Next node := Get-Ks-Node-Next-Node (Node, New-Node, Goal); | |
| If Next-node <> NIL Inference-Engine (Next-Node, New-Node,Goal); | |
| else return (NIL) | |

FIG. 35, which is broken down into FIGS. 35A–35D, is a flow-chart version of the pseudocode listed above showing the operation of the Inference Engine 122. The Inference Engine 122 is called with parameters "Node" for the knowledge node (a pointer to the node to determine the truth of), Parent (a pointer to the node which points to Node and which was the Node parameter in the previous call to Inference Engine) and Goal (a pointer to the goal which the Inference Engine 122 is attempting to solve). After the Start block 880, step 881 determines the node type of Node. Next, 882 determines whether the node type is Knowledge Source (KS), OR, AND or CALL. If so, 883 builds (instantiates) a hypothesis tree node under the Parent Node on the Bulletin Board 120, using a routine such as the one described by the following pseudocode.

```
INSTANTIATE-HYPO-NODE (Node, Parent, Goal)
  hypo-list: = all instances of Node;
  /* Each knowledge node in Knowledge Source has
     an INSTANCES attribute which contains a list
     of all instances of it. */
  /* If there are no instances of node, instantiate new node */
  if (hypo-list = nil)
     New-Node: = Build-Hypo-Node(Node, Parent, Goal);
     Return (New-Node);
  else /* there are instances of node */
     Instance: = find from the Node-Stack attribute of Goal
     the entry that is an instance of Node;
     /* Node-Stack attribute of Goal contains a node list
        which corresponds to all the node instances that have
        already been instantiated under the Goal node on the
        Bulletin Board */
     /* if no instance of Node corresponds to Goal,
        Instantiate new node */
     if (Instance = nil)
        New-Node: = Build-Hypo-Node (Node, Parent, Goal);
        Return (New-Node);
     else
        /* an instance of Node has already been Instantiated for Goal
        if (forget attribute of Instance is "yes")
           /* Instantiate another instance of Node */
           New-Node: = Build-Hypo-Node(Node, Parent,
           Goal);
           Return (New-Node);
        else
           /* forget is "no", do not need to instantiate
              another instance of node */
           Return (Instance);
```

The INSTANTIATE-HYPO-NODE routine calls Build-Hypo-Node, which is described by the following pseudo code:

```
BUILD-HYPO-NODE (Node, Parent, Goal)
  New-Node: = make an instance of Node;
  Set instance-of attribute of New-Node to Node;
  Set reverse-node attribute of New-Node to Parent;
  /* add this New-Node to the value list of the node-stack
     attribute of Goal */
  add New-Node to node-stack attribute of Goal;
  determine node-type of Parent:
  case node-type of Parent:
     AND, OR, KS-NODE:
        /* determine the next due-to-condition node-value
           pair assoicated with the Parent and update
           due-to-traces attribute of parent */
        Node-Value-Pair: = get next node-value pair from
           due-to-condition attribute of Parent;
        delete the Node-Value-Pair from due-to-conditions
           attribute of parent;
        New-Node-Value-Pair: = replace the node field of
           the Node-Value-Pair with New-Node;
        Add the New-Node-Value-Pair to due-to-trace
           attribute of Parent;
     CALL NODE:
        /* determine the next function-condition function-
           value pair associated with the Parent node,
           and update due-to-traces attribute of Parent
        Node-Value-Pair: = get next function-value pair
           from function-condition attribute of Parent;
        delete Node-Value-Pair from function-condition
           attribute of Parent;
        New-Node-Value-Pair: = replace the node field of
           the Node-Value-Pair with New-Node;
        Add the New-Node-Value-Pair to Due-to-trace
```

-continued

```
    attribute of Parent;
    Return (New-Node);
```

If 882 determined that the knowledge node was not of type Knowledge Source, OR, AND or CALL, 884 calls routine Instantiate-Flow-Chart-Node to Instantiate a flow-chart node for the Node under the Parent node on the Bulletin Board 120. A pseudocode routine for performing this function is shown below:

```
INSTANTIATE-FLOW-CHART-NODE (Node, Parent, Goal)
    flow-list: = all instances of Node;
    /* each knowledge node in knowledge source has an Instance
    attribute which contains a list of all instances of it */
    if (flow-list = nil)
    /* if there are no instances of node, build new node */
        New-Node: = Build-Flow-Chart-Node(Node, Parent, Goal);
    else
        Instance: = find from the Node-Stack attribute of Goal
    the entry which is a instance of Node;
    /* Node-Stack attribute of Goal contains a node list which
    corresponds to all the node instances that have already been
    instantiated under the Goal node on the Bulletin Board */
        if (Instance = nil)
    /* If no instance of Node corresponds to Goal, instantiate
    New Node from Node */
            New-Node: = Build-Flow-Chart-Node (Node, Parent,
    Goal);
        else /* Instance exists */
            /* Instantiate a copy from Instance node */
            New-Node: = Build-Flow-Chart-Node (Instance, Parent,
    Goal);
    Return (New-Node);
```

INSTANTIATE-FLOW-CHART-NODE calls the BUILD-FLOW-CHART-NODE routine which is described by the following Pseudocode.

```
BUILD-FLOW-CHART-NODE (Node, Parent, Goal)
    New-Node := make an instance of Node;
    Set instance-of attribute of New-Node to Node;
    Set Reverse-node attribute of New-Node to Parent;
    Add New-Node to Node-Stack attribute of Goal;
    If (truth-value attribute of Parent = "yes")
        set yes-node attribute of Parent to New-Node;
    else
        set no-node attribute of Parent to New-Node;
    Return (New-Node);
```

After instantiating the hypothesis tree node or flow-chart node, 885 determines whether Node is a CONCLUDE node. If so, 886 prints the CONCLUSION attribute of the node. Block 887 then returns control to the routine which called the Inference Engine. Otherwise, 890 determines whether Node is a FACT node.

If Node is a FACT node, 891 prints the FACT attribute of Node. Block 892 then determines the Next-Node of the FACT node by calling a routine GET-FACT-NODE-TEXT-NODE which gets the next node of a Fact node. A pseudocode representation of this routine is as follows:

```
GET-FACT-NODE-NEXT-NODE (Node, New-Node, Goal)
    set the truth-value attribute of New-Node to "yes";
    Next-Node: = get the value of yes-node attribute
        of New-Node;
    Return (Next-Node);
```

Block 893 then recursively calls the Inference Engine with pointers to Next-Node, New-Node and Goal as parameters Node, Parent, and Goal. Otherwise, 894 determines whether Node is a CONFIRM node. If so, 895 prints the CONCLUSION attribute of Node. Next, 896 calls a routine, GET-CONFIRM-NODE-NEXT-NODE, which determines the next node of a CONFIRM node (called Next-Node).

```
GET-CONFIRM-NODE-NEXT-NODE
(Node, New-Node, Goal)
    Confirm-Pair: = get the node-value pair from the
        branch-to-and-confirm
    attribute of New-Node;
        Confirm-Node: = get the node field of the Confirm-Pair;
        /* node field of Confirm-Pair contains the node
            identifier to be confirmed */
        Confirm-Value: = get the value field of the Confirm-Pair;
        /* value field of the Confirm-Pair contains the
            value to be set or confirmed for the Confirm-
            Node */
        Set the truth-value attribute of Confirm-Node to Confirm-
    Value;
        Return (Confirm-Node);
```

Block 897 then calls the Inference Engine with parameters Next-Node, New-Node and Goal. Otherwise, 898 determines whether Node is a COUNT node.

If block 898 determines that the node is a COUNT node, block 899 calls a routine, GET-COUNT-NODE-NEXT-NODE, to determine the next node of a COUNT node (called Next-Node). A pseudocode representation of this routine is as follows:

```
GET-COUNT-NODE-NEXT-NODE (Node, New-Node, Goal)
    IF (the value of count-value attribute of New Node <
    the value of
        count attribute of New-Node);
        /* count-value attribute of a COUNT node is always
        initialized to 0. This count-value is incremented
        by 1 every time this node is traversed, so long as
        this value remains less than that of count
        attribute which the expert had assigned */
    print conlusion-if-true attribute of New-Node;
    set truth-value attribute of New Node to "yes";
    increment the value of count-value attribute of New-Node
    by 1;
        Next-Node: = get the value of yes-node attribute
            of New-Node;
        Return (Next-Node);
    else
        /* The value of count-value attribute is equal to
        the value of count attribute which the expert
        had assigned. Now, it is time to break the
        loop; no need to increment the value of count-
        value attribute of New-Node. */
    print conclusion-if-false attribute of New-Node;
    set truth-value attribute of New-Node to "no";
    Next-Node: = get the value of no-node attribute
        of New-Node;
    Return (Next-Node);
```

Block 900 then calls Inference Engine with parameters Next-node, New-Node and Goal. Otherwise, 898 sends control to 910, which determines whether Node is a TEST node. If so, 912 calls a routine, GET-TEST-NODE-NEXT-NODE, to determine the next node of a TEST node (called Next-node). A pseudocode routine performing this function is shown below:

```
GET-TEST-NODE-NEXT-NODE (Node, New-Node, Goal)
    If (truth value attribute of New-Node = nil)
        print pre-description attribute of New-Node;
        Next-Node: = call Net-Test-Manager (New-node, Goal);
        Return (Next-Node);
    else If (forget = false) /* do not forget */
```

```
    if (truth-value attribute of New-Node = "yes")
        Next-Node:= get the value of yes-node attribute of
        New-Node;
    else
        Next-Node:= get the value of no-node attribute of
New-Node;
        Return (Next-Node);
    else /* forget = truth */
        print pre-description attribute of New-Node;
        Next-Node: = call Net-Test-Manager (New-Node, Goal);
        Return (Next-Node);
```

Block 914 then determines whether Next-Node is nil. If not, 916 calls the Inference Engine with parameters Next-node, New-Node and Goal. Otherwise, 917 determines the value of the KS-state attribute of Goal. The value can be Abort, Pause or Suspend. Block 918 then determines whether the KS-state is "Abort". This would in response to a query, the Operator instructed the Inference Engine not to continue processing the goal. If so, 920 returns control to the Controller 112.

If KS-state is not "abort" on the other hand, 922 determines whether the KS-state attribute of Goal is "Pause". This would indicate that in response to a query the Operator instructed the Inference Engine 122 to wait until the Operator informed it that he had the requested information, and then to resume processing of the goal by invoking the "Resume" command. If so, 924 sets the Return-node attribute of Goal to Node. Next, 926 sets the Suspended-node attribute of Goal to Parent. The latter two blocks enable the Controller to resume processing of Goal by calling Inference Engine 122 with parameters Return-node of Goal, Suspend-node of Goal and Goal. Block 928 then returns control to the Controller 112.

If block 922 found that the KS-state of Goal is not "Pause" on the other hand, it must be "Suspend". In that case, 930 sets the Return-node attribute of Goal to Next-node. Next, 932 sets the Suspend-node attribute of Goal to New-Node. The latter two blocks enable the Controller to resume processing of Goal by calling Inference Engine with parameters Return-node of Goal, Suspend-node of Goal and Goal. Block 934 then returns control to the Controller 112.

If 910 found that Node was not a TEST node, on the other hand, 936 determines whether the node is a CALL node. If so, 938 calls a routine, GET-CALL-NODE-NEXT-NODE, to determine the next node of a CALL node (called Next-node). A pseudocode routine to perform this function is shown below:

```
GET-CALL-NODE-NEXT-NODE (Node, New-Node, Goal)
    Function-Node: = get the node field of the first function-
value pair of the function-condition attribute of New-Node;
            /* Function-Node is the next to-be-called
            function node of the New-Node */
    Trace: = get the first node-value pair in the Due-To-Trace
attribute of New-Node;
        Trace-Node: = get the node field of Trace;
            /* Trace-Node is the currently traced or
            instantiated called node */
        Trace-Value: = get the value field of Trace;
            /* Trace-Value is the needed return value of Trace-
Node */
    if (truth-value attribute of New-Node = nil) /* if truth
value not initialized */
        if(Trace = nil)
            /* There are no entries on Due-To-Trace attribute of New-
Node. This is the first time this node is traversed */
            print pre-description attribute of New-Node;
            Next-Node: = Find-Hypo-Node(New-Node, Function-Node,
Goal);
            */ The Find-Hypo-Node routine is used to
            check whether the called node, Function-
            Node, has already been instantiated If
            it is already instantiated, the old node
            is returned; otherwise, the Function-Node
            is returned. */
            Return (Next-Node);
        else /* Trace-Node has already been processed */
            Called-Value: = get the Truth-Value attribute of the
Trace-Node;
            if (Called-Value = Trace-Value)
                /* The truth-value returned by the Called
                Node, Trace-Node, is the same as the Trace-
                Value */
                set Truth-Value attribute of New-Node to
                "yes";
                print message in Conclusion-if-true attribute
                of New-Node;
                Next-Node: = yes-node attribute of New-Node;
                Return (Next-Node);
            else
                /* The truth-value returned by the called
                node, Trace-Node, is not equal to the Truth-
                Value. */
                set Truth-Value attribute of New-Node to "no";
                print message in Conclusion-if-false attribute
of New-Node;
                Next-Node: = no-node attribute of New-Node;
                Return (Next-Node);
        else /* truth-value of New-Node already exists */
            if (forget = nil) /* do not forget */
                if (truth-value of New-Node = "yes")
                    Next-Node: = yes-node attribute of New-Node;
                    Return (Next-Node);
                else /* truth-value of New-Node = "no"*/
                    Next-Node: = No-Node attribute of New-Node;
                    Return (Next-Node);
            else /*yes! forget the current truth value of New-Node */
                print pre-description of New-Node;
                Next-Node: = Find-Hypo-Node (New-Node,
Function-Node, Goal);
                Return (Next-Node);
```

GET-CALL-NODE-Next-Node calls Find-Hypo-Node routine to find the hypothesis tree node.

```
FIND-HYPO-NODE (New-Node, Hypo-Node, Goal)
        /* This routine is called to check whether the
        Hypo-Node has already been instantiated. If
        so, it finds the node name, updates the
        appropriate parameters, and returns the node.
        Otherwise, it just returns the Hypo-Node to be
        instantiated. */
    hypo-list: = get all instances of Hypo-Node;
    /* Each Knowledge node has an Instances attribute which
    contains a list of all instances of it. */
    if (hypo-list = nil)
        /* if there are no instances of Hypo-Node */
        Return (Hypo-Node);
    else
        /* forget is turned on */
        if (forget attribute of Hypo-Node = "yes");
        Return (Hypo-Node);
        else
            Instance: = find from the node-stack attribute of
    Goal the entry which is an instance of Hypo-Node;
            if (Instance = nil
                Return (Hypo-Node);
            else
                add New-Node to reverse-Node attribute of
    Instance;
                case Node-Type of New-Node:
                    AND, OR or KS:
                        /* determine the next due-to-
                        condition node-value pair associated
                        with New-Node and update due-to-
                        Traces attribute of New-Node*/
                        Node-Value-Pair: = get next node-
                        value pair in due-to-condition
```

```
            attribute of New-Node;
        /* Remove the node-value pair from
            due-to-condition attribute of New-
            Node, and update due-to-traces
            attribute of New-Node*/;
            delete the Node-Value-Pair from due-
            to-conditions attribute of New-Node;
            New-Node-Value-Pair : =replace he
            Node field of the Node-Value-Pai
            with Instance node;
            Add the New-Node-Value-Pair to Due-
            To-Trace attribute of New-Node;
            Next-Node : = get instance-of
            attribute of Instance node;
            Return(Next-Node)
    CALL:
        /* determine the next function-
            condition pair associated with New-
            Node. Remove the pair from the
            function-conditions attribute of
            New-Node and update the due-to-
            traces attribute of New-Node with
            the new pair */
            Node-Value-Pair : = get next Node-
            Value-Pair in function-conditions
            attribute of New-Node;
            Delete Node-Value-Pair from
            function-conditions attribute of
            New-Node;
            New-Node-Value-Pair: = replace the
            Node field of the Node-Value-Pair
            with Instance node;
            Add the New-Node-Value-Pair to the
            due-to-traces attribute of New-Node
            New-Node : = get instances-of
            attribute of Instance node;
            Return (Next-Node);
```

Block 940 then calls the Inference Engine 122 with parameters Next-Node, New-Node and Goal. Otherwise, 942 determines whether Node is an AND node. If so, 944 calls a routine, GET-AND-NODE-NEXT-NODE, to get the next node of an AND node (called Next-Node). A pseudocode implementation of this routine is as follows:

```
GET-AND-NODE-NEXT-NODE (Node, New-Node, Goal)
    Condition-Node: = get the Node field of the first node-value
    pair in the due-to-condition attribute of New-Node;
        /* Condition-Node is the next to-be-traced child
            node of the New-Node */
    Trace: = get the first node-value pair in the Due-To-Trace
    attribute of New-Node;
    Trace-Node: = get the Node field of Trace;
        /* Trace-Node is the currently instantiated or
            traced child node of the New-Node */
    Trace-Value: = get the value field of Trace;
        /* Trace-Value is the needed return value of the
            current instantiated or traced child node */
    If (truth-value attribute of New-Node <> nil)
        /* If the truth-value of new-node already exists,
            there is no need to trace the children nodes.
            Return back to the reverse node */
        Reverse-Node: = get the reverse-node attribute of
            New-Node;
        Next-Node: = get the instance-of attribute of Reverse-
Node;
        Return (Next-Node)
    else
        /* truth-value attribute of New-Node is nil */
        If ((Condition-Node <> nil) and (Trace = nil))
        /* Trace is nil inicates that this is the first
            time the new-node is traversed, and no child
            nodes yet traced */.
        print pre-description attribute of New-Node;
        Next-Node: = Find-Hypo-Node (New-Node, Condition-
        Node, Goal);
        /* Find-Hypo-Node routine is called to check if the
            Condition-Node has already been instantiated. */
        Return (Next-Node);
        else
            If (Trace <> nil)
            /* at least one condition has been Traced */
                if (truth-value attribute of Trace-Node
                Trace-Value)
                /* The truth-value of this New-Node is false, if
                    one of its children is false, which is indicated by
                    the truth-value attribute of Trace-Node.
                                                There is no
                                                need to trace
                                                the next child.
                                                Set the truth-
                                                value to "no",
                                                and return back
                                                to the reverse-
                                                        node */
                    truth-value attribute of New-Node:
                    "no";
                    print conclusion-if-false attribute of
                    New-Node;
                        Reverse-Node: = get the Reverse-Node
                        attribute of New-Node;
                        Next-Node: = get the instance-of
                        attribute of Reverse-Node;
                        Return (Next-Node);
                    else if (Condition-Node = nil)
                    /* condition-node = nil indicates that all
                        the children nodes have been traced, and
                        there has not been one that is false;
                        therefore, this New-Node should be true.
                        Set the truth-value to "yes"and return
                        back to the Reverse Node */
                        truth-value attribute of New-Node: =
                        "yes";
                        print conclusion-if-true attribute of
                        New-Node;
                        Reverse-Node: = get the reverse-Node
                        attribute of
                        New-Node;
                        Next-Node: = get the instance-of
                        attribute
                        of Reverse-Node;
                        Return (Next-Node);
                    else
                    /* we have not yet exhausted all the
                        Children nodes. Let's continue to trace
                        the next Child, Condition-Node. */
                        Next-Node: = Find-Hypo-Node
                        (New-Node, Condition-Node, Goal);
                        Return (Next-Node);
```

Block 946 then calls the Inference Engine 122 with parameters Next-Node, New-Node and Goal. Otherwise, 948 determines whether Node is a Knowledge Source node. If so, 950 calls a routine GET-KS-NODE-NEXT-NODE, to get the next code of a Knowledge Source node (called Next-Node). A pseudocode routine to perform this function is as follows:

```
GET-KS-NODE-NEXT-NODE (Node, New-Node, Goal)
    Condition-Node: = get the node field of the first node-value
    pair in the due-to-condition attribute of New-Node;
        /* Condition-Node is the next to-be-traced child
            node of the New-Node */
    Trace: = get the first node-value pair in the Due-To-Trace
    attribute of New-Node;
    Trace-Node: = get the Node field of Trace;
        /* Trace-Node is the currently instantiated or
            traced child node of the New-Node */
    Trace-Value: = get the value field of Trace;
        /* Trace-Value is the needed value of the
            currently instantiated or traced child node,
            Trace-Node */
        if ((Condition-Node <> nil) and (Trace = nil))
        /* first time this New-Node is traversed; no children yet traced */
            print pre-description attribute of New-Node;
```

```
    Next-Node: = Find-Hypo-Node(New-Node, Condition-Node,
      Goal);
    Return (Next-Node);
  else if (Trace <> nil) /* at least one child has been traced
*/
    if (truth-value attribute of Trace-Node = Truth-Value)
    /* Current child traced returned true. Knowledge Source
      node must be true. There is no need to trace or
      instantiate the next child. Inferencing on this goal now
      complete. */
        print conclusion-if-true attribute of New-Node;
        truth-value attribute of New-Node: = "yes";
        return (nil); /* Controller will then delete the
      entire trace associated
      with the goal */
    else /* truth-value attribute of Trace-Node <> Truth-
      Value */
        /* if last one processed returned false, goal is
      false */
        if (Condition-Node = nil)
        /* Condition-Node = nil indicates that there are
            no children left to be traced and there has
            not been one child found to be true.
            Therefore, New-Node must be false. */
            print conclusion-if-false attribute of New-
              Node;
            truth-value attribute of New-Node: = "no";
            Return (nil)
            /* Controller will later delete the entire trace
      associated with the Goal */
        /* Otherwise, process next child pointed to by
      Knowledge Source node */
        else
        /* We have not yet exhausted all the children
            nodes! Continue to find the next child to be
            trace or instantiated */
            Next-Node: = Find-Hypo-Node(New-Node,
              Condition-Node, Goal)
            Return (Next-Node)
```

Next, 952 determines whether Next-Node is nil. If not, 954 calls the Inference Engine 122 with parameters Next-Node, New-Node and Goal. If Next-Node is nil, 956 returns control to the routine that called the Inference Engine 122. If 948 found that Node is not a Knowledge Source node, it must be an OR node. In this case, 958 calls a routine, GET-OR-NODE-NEXT-NODE, to get the next node of an OR node (called Next-Node). A pseudocode routine for this operation is shown below:

```
GET-OR-NODE-NEXT-NODE(Node, New-Node, Goal)
  Condition-Node: = get the node field of the first node-value
pair in the due-to-condition attribute of New-Node;
        /* Condition-Node is the next to-be-traced child
          node of the New-Node */
  Trace: = get the first node-value pair in the Due-To-Trace
attribute of New-Node;
  Trace-Node: = get the node field of Trace;
        /* Trace-Node is the currently traced child node
          of the New-Node */
  Trace-Value: = get the value field of Trace;
        /* Trace-Value is the needed value for the
          currently traced child node, Trace-Node. */
  if (truth-value attribute of New-Node <> nil)
        /* The truth-value of New-Node already exists,
          return back to reverse node */
    Reverse-Node: = get the reverse-Node attribute of New-
Node;
    Next-Node: = get the instance-of attribute of Reverse-
Node;
    Return (Next-Node);
  else if ((Condition-Node = nil) and (Trace = nil) and (Yes-
Node attribute of New-Node = nil))
        /* This node must be a terminal node that needs
          either a user response or a network test
          result */
        print pre-description attribute of New-Node;
    Next-Node: = call Net-Test-Manager (New-Node, Goal);
    Return (Next-Node);
  else if ((Condition-Node = nil) and (Trace = nil) and (yes-
Node attribute of New-Node <> nil))
        /* This node is a leaf node which points to a
          flow-chart knowledge with the first node
          contained in the yes-node attribute of the
          New-Node */
        print pre-description attribute of New-Node;
    Next-Node: = get the next-node attribute of New-Node;
    Return (Next-Node);
  else if ((Condition-Node <> nil) and (Trace = nil))
        /* no child nodes yet traced, this is the first
          time */
        print pre-description attribute of New-Node;
    Next-Node: = Find-Hypo-Node (New-Node, Condition-Node,
Goal);
        /* Continue to find the next child to be traced */
    Return (Next-Node);
  else if (Trace <> nil) /* at least one child has been traced
*/
    if (truth-value attribute of Trace-Node = Truth-Value
      /* Current child traced returned true. This New-Node
        must be true. There is no need to trace the next child
        of New-Node, and it can be returned to the Reverse Node
      */
        print conclusion-if-true attribute of New-Node;
        truth-value attribute of New-Node: = "yes";
        Reverse-Node: = get the reverse-node attribute of
      New-Node;
        Next-Node: = get the instance-of attribute of
      reverse-Node;
        Return (Nex-Node);
    else /* truth-value attribute of Trace-Node <> Truth-
      Value */
        if (Condition-Node = nil)
        /* Condition-Node = nil indicates that there are
            no children left to be traced and there has
            not been one child
            found to be true. Therefore, this new-node
            must be false, and it's time to return back to
            the Reverse-Node */
            print conclusion-if-false attribute of New-
              Node;
            truth-value attribute of New-Node: = "no";
            Reverse-Node : = get the reverse-Node
              attribute of New-Node;
            Next-Node: = get the instance-of
              attribute of Reverse-
              Node;
            Return (Next-Node);
        /* Otherwise, trace next child node pointed to by New-
      Node */
        else
            Next-Node : = Find-Hypo-Node(New-Node,
              Condition-Node, Goal);
            /* continue to find the next child node to be
              traced */
            Return (Next-Node);
```

960 then transfers control to 914.

Earlier, those skilled in the art will note, a Delay node was also discussed. This node's function is trivial to implement and is therefore not discussed further either in pseudocode or flow-chart. Those skilled in the art will understand how to implement such function.

Figure 36:
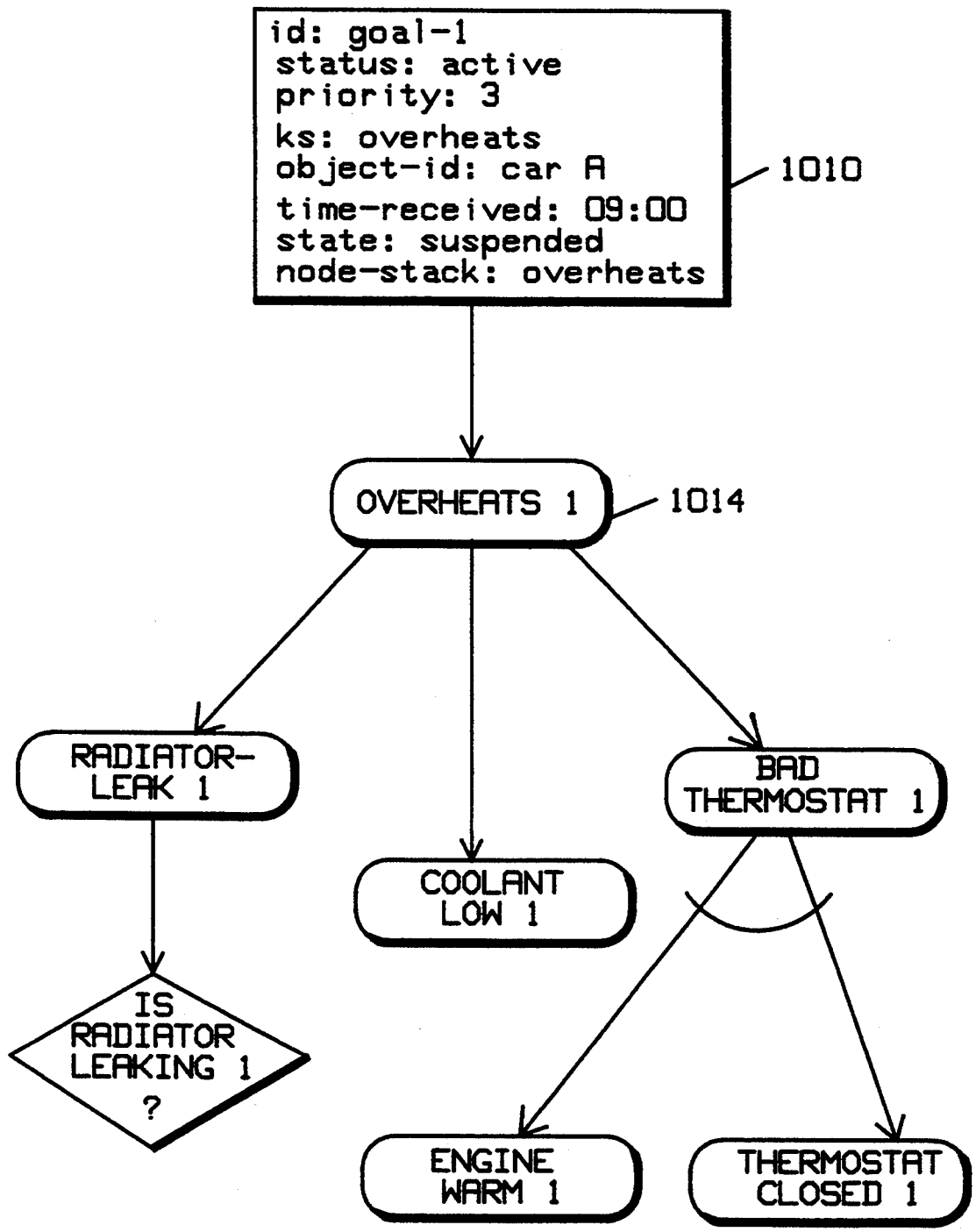
FIG. 36 shows an overview of the Bulletin Board 120 as constructed by the Inference Engine using the example automobile diagnostic system.

The operation of the Inference Engine 122 is more easily understood in the context of a more familiar domain such as the Expert Auto Diagnostic System of FIG. 23. FIG. 36 shows an example of a Bulletin Board 120 for an Expert Auto Diagnostic System.

As explained, the Alarm Filter 118 posts goal nodes associated with non-redundant alarms to the Bulletin Board 120. The Inference Engine 122 attempts to determine the problems which caused the alarms associated with these goal nodes and to remedy the problems. It allows the user or Domain Expert 101 to trace its reasoning by instantiating goal trees for each alarm node on the Bulletin Board. Another advantage of the Bulleting Board 120 is that it provides for suspendible inferencing.

In FIG. 36, there is one goal on the Bulletin Board 120. Goal-1 1010 represents the Overheat alarm from FIG. 24. The attributes of the Goal nodes in the example are NODE-ID, STATUS, PRIORITY, Knowledge Source, OBJECT-ID, TIME-RECEIVED and STATE. Other attributes could also be used. NODE-ID is a unique name of the node. STATUS indicates whether the node is running ("active"), ready to run ("Posted"), waiting for results from the Network Manager 24 ("Suspended") or Paused by the user until he can determine the information requested ("Paused"). The Knowledge Source attribute (KS) contains the name of the knowledge source used upon receiving the alarm associated with the goal. OBJECT-ID contains the name of the object which sent the alarm. TIME-RECEIVED contains the time the alarm was received by the Network Manager 24. STATE contains either "Suspended", to indicate that inferencing of the goal was suspended, or "new", to indicate that the Inference Engine 122 has not yet begun to process the goal.

Upon being invoked with Overheats, Goal-1 and Goal-1 as the Node, Parent of the Node and Goal parameters, the Inference Engine processes Goal-1 as follows. First, it uses the Expert Information Structure of FIG. 24 to instantiate an instance of the Overheats node 546 called Overheats-1 1014. Overheats-1 1014 has the following attributes: IS-A, INSTANCE-OF, DUE-TO-CONDITIONS, Due-To-Trace, TRUTH-VALUE and PARENT. IS-A contains the node type (in this case "KS-NODE"). INSTANCE-OF contains the name of the node of which this is an instance (in this case "Overheats"). DUE-TO-CONDITIONS initially contains the same values as DUE-TO-CONDITIONS in the node of which this is an instance, in this case "(Radiator-leaks yes) (Coolant-low yes) (Bad-thermostat yes)". Node names are deleted as the nodes are processed. DUE-TO-CONDITIONS is used to determine the next child node to process.

DUE-TO-TRACE initially contains nil. It is used to keep track of which of the nodes named in DUE-TO-CONDITIONS is currently being processed. TRUTH-VALUE contains the truth value of the node. It initially contains "nil" and then is set to "yes" or "no" once the truth value is determined. PARENT contains a pointer to the node which points to this node. In the case of the alarm node, such as Overheats 546, PARENT contains a pointer to the goal node Goal-1.

The Inference Engine 122 then must determine the truth of Overheats using the Structured Flow Graph or Expert Information Structure discussed previously in connection with FIG. 24.

Network Test Manager

Figure 37:
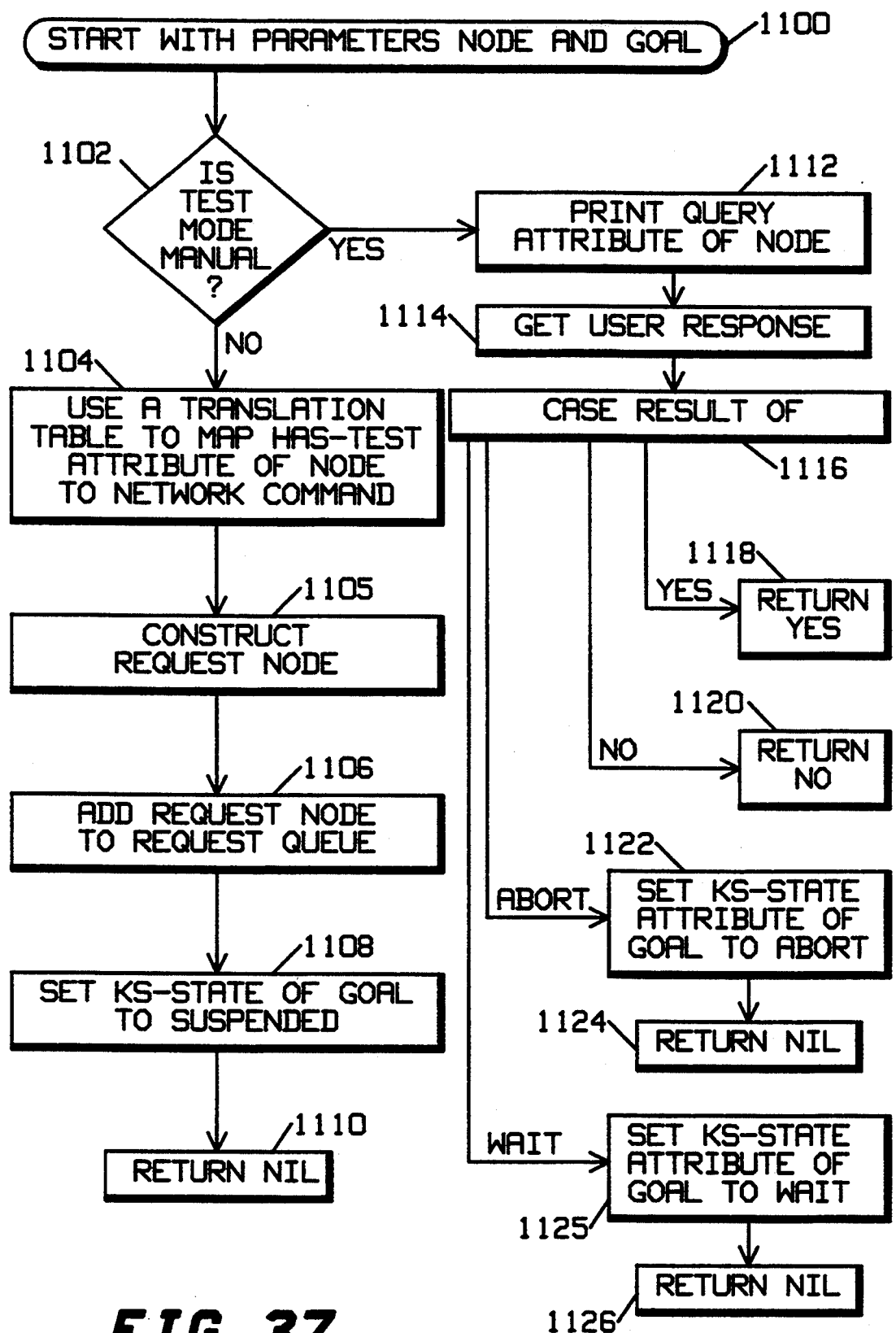
FIG. 37 shows a flow-chart of the operation of the Network Test Manager 124 in queuing requests for information from the Network Manager 24.

FIG. 37 is a flow-chart of the operation of the Network Test Manager 124 when the Inference Engine 122 calls it to request information from the user (in manual mode) or the Network Manager 24 (in automatic mode). The Inference Engine 122 calls it with the parameters New-Node (the node with the QUERY or HAS-TEST attribute that is to be answered) and Goal (the goal with which Node is associated). After start node 1100, 1102 determines whether the ENDS 10 is operating in manual mode. If not, 1104 determines the command to send to the Network Manager 24 which will produce the information requested. It could do so by, for example, mapping the value of Node.Has-test (i.e. the Has-test attribute of node) to the appropriate network command by use of a table set up for such purpose. Block 1105 then constructs a Request Node such as node 812 in FIG. 32, setting "request" to the network command and object to the Object-id attribute of Goal. Block 1106 adds the request node to the Request Queue 115. Block 1108 sets KS-state attribute of Goal to 'suspended' to inform the Controller 112 not to invoke the Inference Engine 122 on this Goal because the Goal is waiting for information.

If on the other hand 1102 determined that the test mode was manual, 1112 prints query attribute. 1114 retrieves the response typed by the user. The allowed responses are "yes", "no", "abort" and "wait". If the use typed "yes", 1118 returns control to the Inference Engine 122 with a value of yes. If the user typed "no", 1120 returns control to the Inference Engine with a value of no. If the user typed abort, 1122 sets KS-state attribute of Goal to "Abort". 1124 then returns control to the Inference Engine 122 with a value of nil. If the user typed "wait", 1125 sets KS-state attribute of Goal to "wait". 1126 then returns nil.

Figure 38:
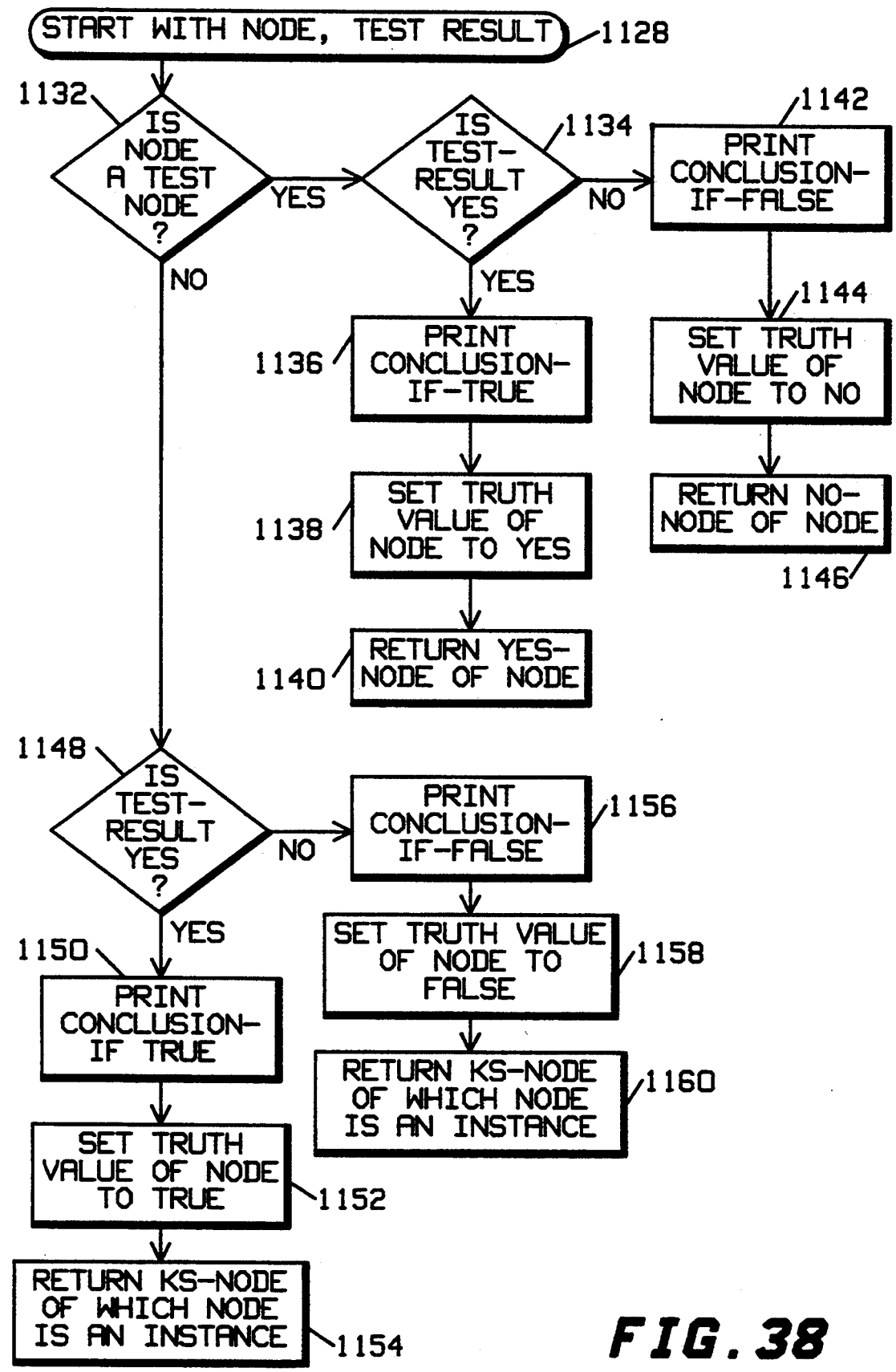
FIG. 38 shows a flow-chart of the operation of the Network Test Manager 124 in retrieving responses from the Event Manager 117.

FIG. 38 is a flow-chart of the operation of the Network Test Manager 124 routine which the Controller 112 calls to retrieve responses from the Response Queue 116. The controller 112 calls the routine with parameters Node (the suspended-node attribute of the goal waiting for this information) and test-result ("yes" or "no") at 1128. The routine prints an appropriate message to the user, sets the truth-value attribute of Node and returns the node which should be processed next. After Start block 1128, 1132 determines whether the node type of Node is TEST node. If so, 1134 determines whether Test-result is "yes". If so, 1136 prints conclusion-if-true attribute of New-Node. 1138 sets truth-value attribute of New-Node to "yes". 1140 returns yes-Node attribute of New-Node.

If 1134 was no, Node must be an OR node (only TEST nodes and OR nodes can request information). 1142 prints conclusion-if-false, attribute of Node. 1144 sets truth-value attribute of New-Node to "no". 1146 returns No-Node attribute of New-Node.

If 1132 was "no" 1148 determines whether Test result is "yes" If so, 1150 prints conclusion-if-true attribute of New-Node. 1152 sets truth-value attribute of New-Node to "yes". 154 returns the node on the Expert Information Structure of which Node is an instance. The name of that node is contained in Inverse Node attribute of New-Node.

If 1148 was no, 1156 prints conclusion-if-false attribute of New-Node. 1158 sets truth-value attribute of New-Node to "false". 1160 returns the node on the Expert Information Structure of which Node is an instance. The name of that node is contained in Inverse Node attribute of New-Node.

Network Configuration Module

The Network Configuration Module 108 serves two purposes. First, before ENDS 10 can be operated, the Network Configuration Module 108 uses information in the Network Manager 24 Database Manager 30 to initialize the Network Structural Knowledge Base 110. The Network Structural Knowledge Base 110 contains information about the interconnection of the network components which is needed in order to perform diagnostics.

Second, the Controller 112 invokes the Network Configuration Module 108 while ENDS 10 is operating to update the Network Structural Knowledge Base 110 if the network configuration has been changed since the last time the Network Configuration Module 108 ran.

Figure 39:
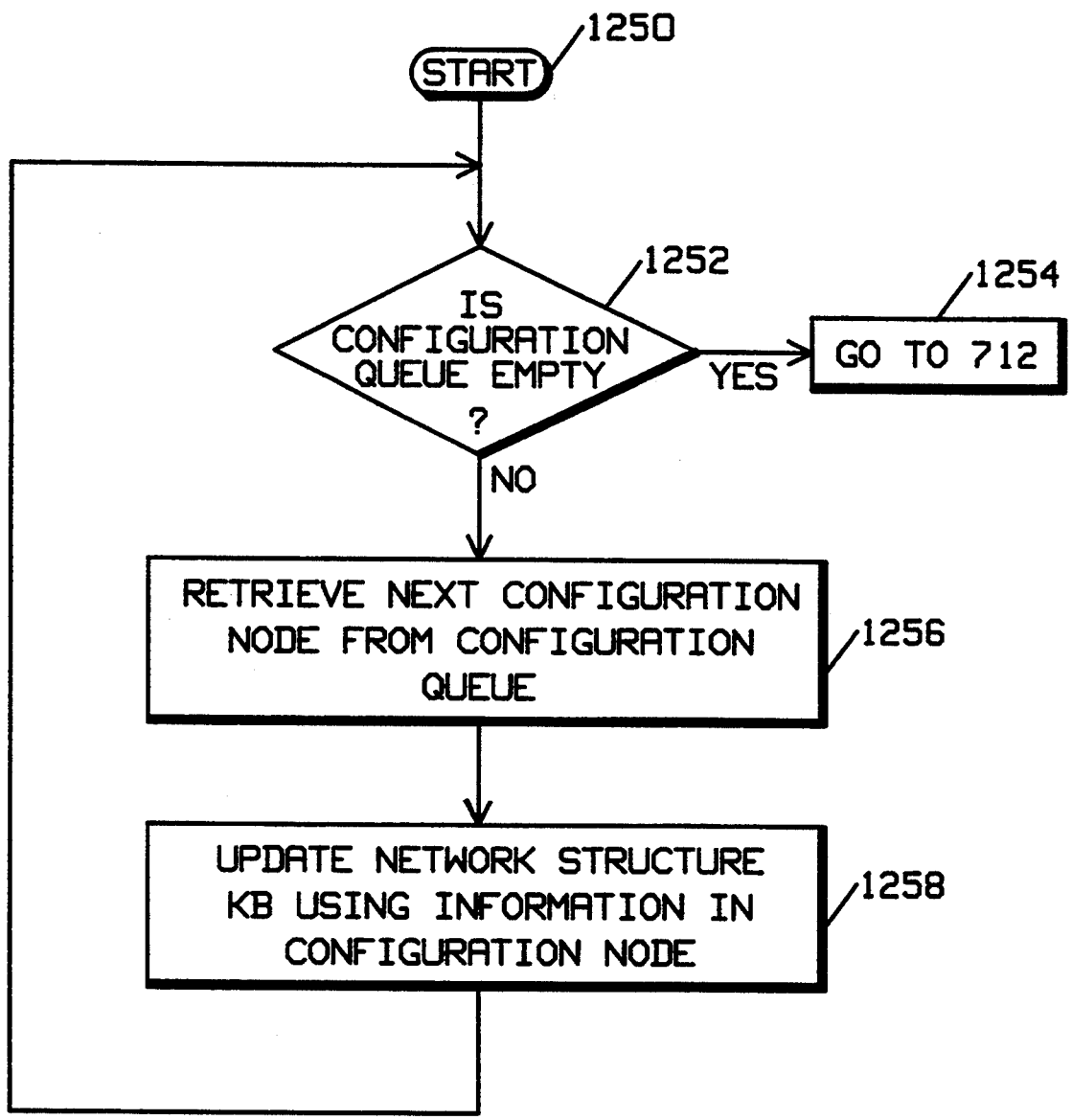
FIG. 39 shows a flow-chart of the operation of the Network Configuration Module 108.

FIG. 39 is a flow-chart showing how this is done in the preferred embodiment. After the Start block 1250, block 1252 determines whether the Configuration Queue 113 is empty. If so, 1254 transfers control to 712 of the Controller 112. Otherwise, 1256 retrieves the next configuration node from the Configuration Queue 113 constructed by the Event Manager 117. Finally, 1258 then uses the information in the node to update the Network Structure Knowledge Base 110. Control then returns to 1252.

Expert/Operator Interface to Terminal

Figure 40:
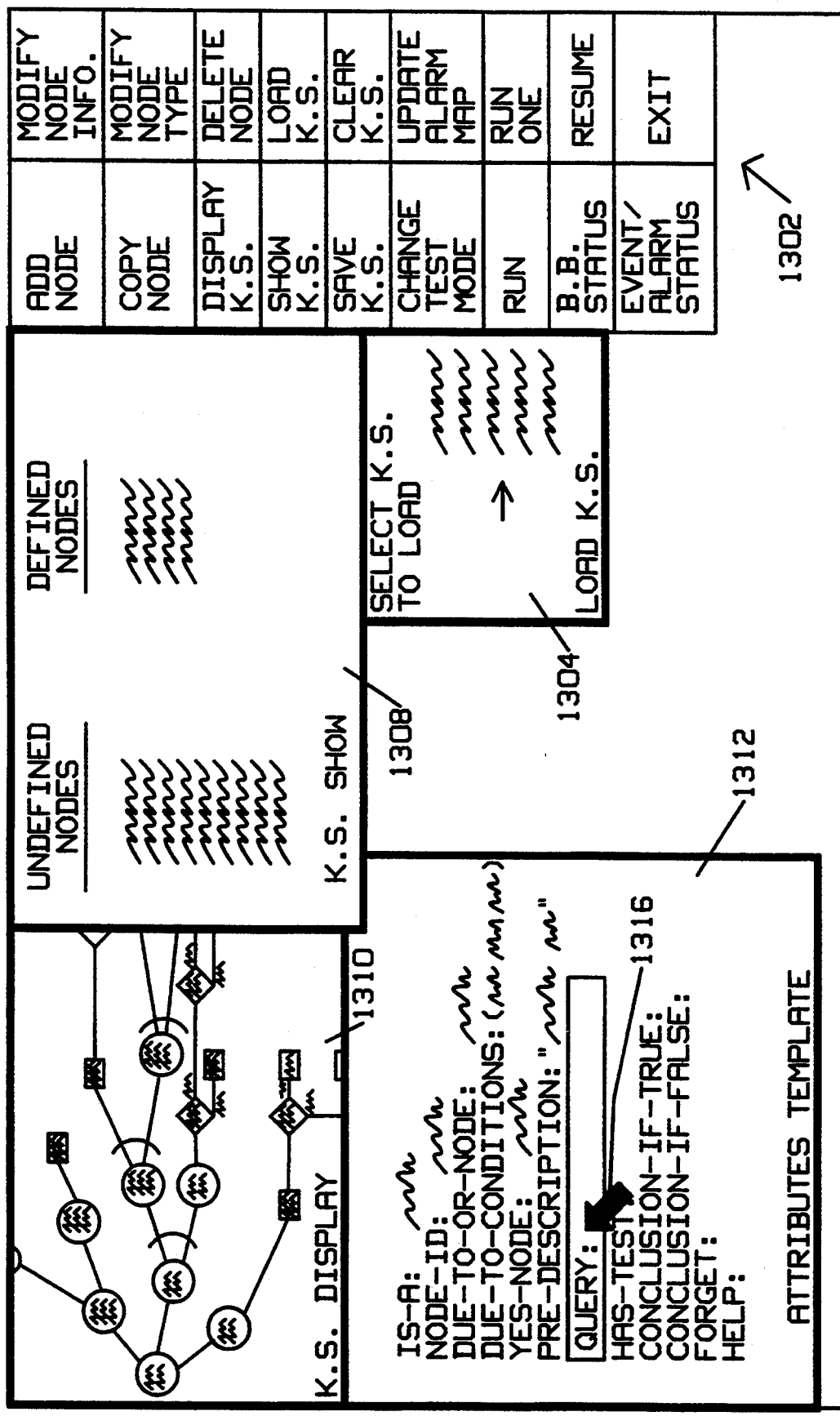
FIG. 40 shows an example screen display for the Knowledge Acquisition process of the present invention.

An example screen display 1300 from the Operator Interface Terminal 18 is shown in FIG. 40. In the preferred embodiment, several windows are used to present the various functions as shown. In FIG. 40, the display 1300 is illustrated in the Knowledge Acquisition process. A menu 1302 is presented as a pair of vertically stacked menu selections at the right side of the display 1300. Of course, other menu arrangements are possible. Each menu selection corresponds with one of the menu selection presented in conjunction with FIG. 5. The remainder of the screen can be used to display the various features and functions of the Expert System 10 in the individual windows.

In the example shown, the Domain Expert 101 has loaded an existing Knowledge Source as shown in window 1304 by moving a pointer to the desired Knowledge Source in a conventional manner. The Show Knowledge Source procedure has been activated and is shown in window 1308 with its associated lists of defined and undefined knowledge nodes. The Display Knowledge Source procedure has also been activated as shown in window 1310 in which a horizontally oriented graphic representation of the Knowledge Source is displayed. As seen, the graphic representation is too large to fully see within the window. Panning techniques as well as changing of window size and zooming techniques may be used to get other views of the graphic representation. In window 1312, a template is shown as for use in the Add Node and Modify Node procedures. A cursor such as cursor 1316 may be used to point to a desired operation, menu selection or item to add or modify in the template. A conventional keyboard is used to type attributes into the template.

Figure 41:
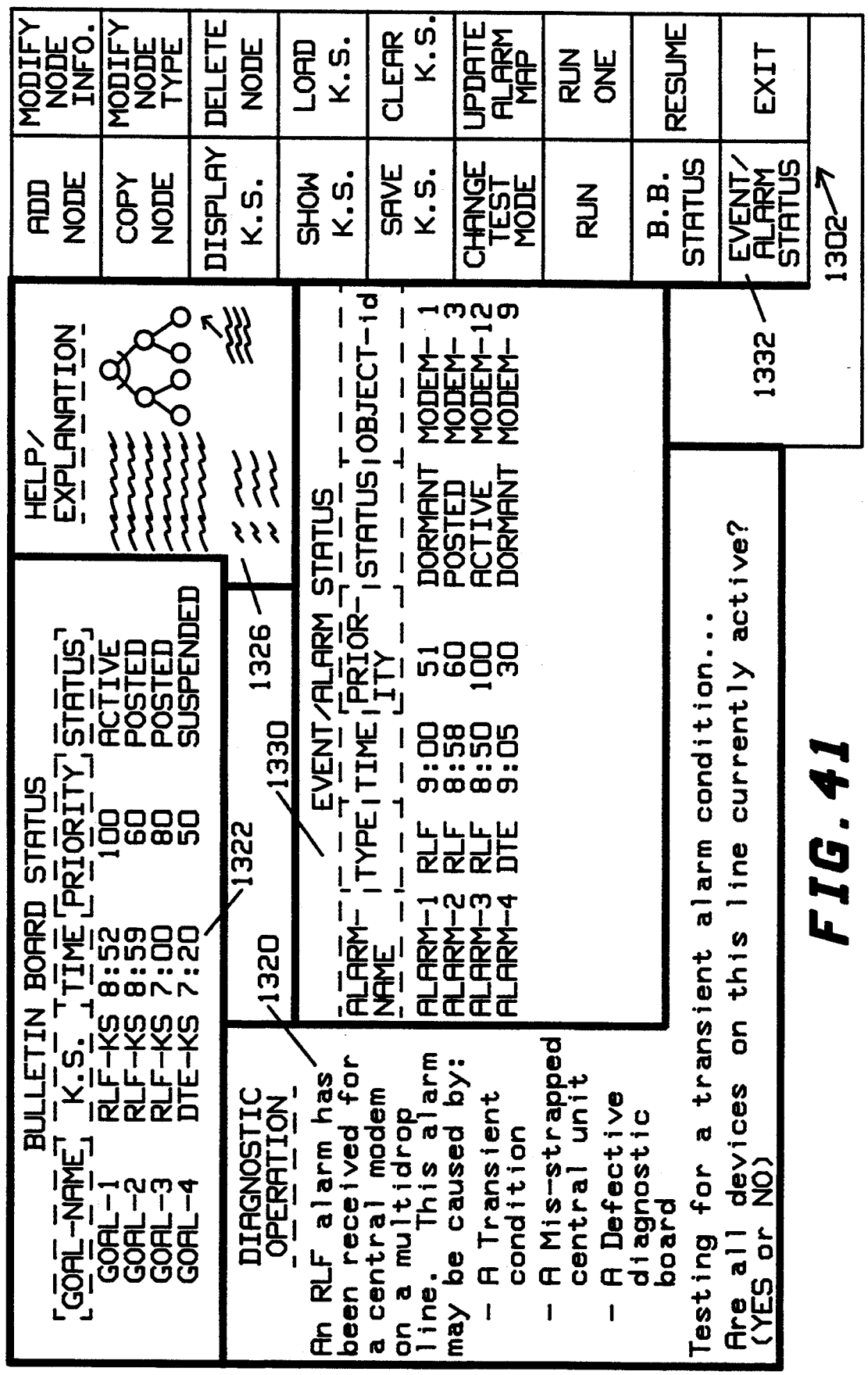
FIG. 41 shows an example screen display for the System Operation process of the present invention.

In FIG. 41, a similar example screen display is shown for the system in the System Operations mode as see by the Operator. In the example shown, diagnostics operations are shown in a Diagnostics Operations Window 1320 in which the session (similar to the sample session of Table 1) takes place The Bulletin Board Status is shown in window 1322. Help and explanation from the menu help selection is shown in window 1326 and the status of events and alarms is shown in window 1330. The information in window 1330 is obtained by making menu selection 1332 and may be accomplished in a manner similar to that of window 1322. Those skilled in the art will understand how to implement this feature which has not been discussed in detail.

Those skilled in the art will appreciate that object-oriented programming techniques are well suited to use in implementing the present inventions, and such is the case in the preferred embodiment. Similarly, those skilled in the art will appreciate that there are numerous methods which could be utilized for implementation of the user interface such as menu windows, bar menus, and the like.

Thus it is apparent that in accordance with the present invention, a method that fully satisfies the aims, advantages and objectives is set forth above. While the invention has been described in conjunction with specific embodiments, it is evident that many alternatives, modifications and variations will become apparent to those skilled in the art upon consideration of the forgoing description. Accordingly, it is intended that the present invention embrace all such alternatives, modifications and variations as fall within the spirit and broad scope of the appended claims.

What is claimed is:

1. An expert network diagnostic system for diagnosing problems in a communication network in a semi-automatic mode, comprising in combination:

means for performing diagnostic tests on said network, said diagnostic tests including non-interruptive tests which do not significantly impact operation of said network and interruptive tests which require interfering with function a device in said network while said interruptive test is performed;

means for determining an appropriate one of said diagnostic tests to be performed to diagnose a problem with said network;

means for determining whether said appropriate test is an interruptive or non-interruptive test;

means for invoking said appropriate test if said appropriate test is non-interruptive; and means for obtaining consent of an operator to perform said appropriate test if said appropriate test is interruptive.

2. An expert diagnostic system for providing diagnostics to a diagnostic target in a semi-automatic mode, comprising in combination:

means for performing diagnostic tests;

means for determining an appropriate one of said diagnostic tests to perform to diagnose a problem;

means for determining if said appropriate test meets a predetermined criteria;

means for invoking said appropriate test if said appropriate test meets said criteria; and means for obtaining consent of an operator to invoke said appropriate test if said appropriate test does not meet said predetermined criteria.

3. The apparatus of claim 2, wherein meeting said predetermined criteria includes not disrupting operation of said diagnostic target in order to perform said appropriate test.

* * * * *